(12) United States Patent
Li et al.

(10) Patent No.: US 8,952,113 B2
(45) Date of Patent: *Feb. 10, 2015

(54) SUPPORTED NONMETALLOCENE CATALYST, PREPARATION AND USE THEREOF

(75) Inventors: Chuanfeng Li, Nanjing (CN); Hongping Ren, Nanjing (CN); Xiaoli Yao, Nanjing (CN); Lin Kan, Nanjing (CN); Bo Liu, Nanjing (CN); Zhonglin Ma, Nanjing (CN); Feng Guo, Nanjing (CN); Kaixiu Wang, Nanjing (CN); Yaming Wang, Nanjing (CN); Lijuan Yang, Nanjing (CN)

(73) Assignees: China Petroleum & Chemical Corp., Beijing (CN); Sinopec Yangzi Petrochemical Company Ltd., Nanjing (CN)

( * ) Notice: Subject to any disclaimer, the term of this patent is extended or adjusted under 35 U.S.C. 154(b) by 88 days.

This patent is subject to a terminal disclaimer.

(21) Appl. No.: 13/509,555

(22) PCT Filed: Oct. 13, 2010

(86) PCT No.: PCT/CN2010/001606
§ 371 (c)(1),
(2), (4) Date: May 24, 2012

(87) PCT Pub. No.: WO2011/057469
PCT Pub. Date: May 19, 2011

(65) Prior Publication Data
US 2012/0232236 A1    Sep. 13, 2012

(30) Foreign Application Priority Data

Nov. 13, 2009  (CN) .......................... 2009 1 0210985
Nov. 13, 2009  (CN) .......................... 2009 1 0210987
Nov. 13, 2009  (CN) .......................... 2009 1 0210990
Nov. 13, 2009  (CN) .......................... 2009 1 0210991

(51) Int. Cl.
C08F 4/50    (2006.01)
C08F 4/52    (2006.01)
C08F 4/64    (2006.01)
C08F 4/76    (2006.01)
B01J 31/38   (2006.01)

(52) U.S. Cl.
USPC ........... 526/161; 526/160; 526/172; 526/129; 526/127; 526/130; 526/123.1; 526/124.2; 526/124.5; 526/348; 502/103; 502/104; 502/118; 502/133; 502/134

(58) Field of Classification Search
USPC .......... 502/104, 103, 118; 526/160, 170, 138, 526/161, 172
See application file for complete search history.

(56) References Cited

U.S. PATENT DOCUMENTS

| 3,642,667 | A | 2/1972 | Steller |
| 4,391,736 | A | 7/1983 | Capshew |
| 4,440,869 | A | 4/1984 | Shannon et al. |
| 4,511,669 | A | 4/1985 | Gessell |
| 4,808,561 | A | 2/1989 | Welborn, Jr. |
| 4,871,705 | A | 10/1989 | Hoel |
| 5,240,894 | A | 8/1993 | Burkhardt et al. |
| 5,719,095 | A | 2/1998 | Brekner et al. |
| 5,739,226 | A | 4/1998 | Spitz et al. |
| 5,834,572 | A | 11/1998 | Derleth et al. |
| 5,910,463 | A | 6/1999 | Ernst et al. |
| 5,936,046 | A | 8/1999 | Ghosh |
| 5,936,049 | A | 8/1999 | Kojoh et al. |
| 6,410,474 | B1 | 6/2002 | Nowlin et al. |
| 6,444,604 | B1 | 9/2002 | Albizzati et al. |
| 6,486,274 | B1 * | 11/2002 | Gray et al. .................. 526/119 |
| 6,590,046 | B2 | 7/2003 | Kong et al. |
| 6,720,394 | B1 | 4/2004 | Kallio et al. |
| 6,800,580 | B1 | 10/2004 | Yang et al. |
| 7,875,568 | B2 * | 1/2011 | Dai et al. ..................... 502/167 |
| 8,193,288 | B2 * | 6/2012 | Gu et al. ..................... 526/90 |
| 2002/0019309 | A1 | 2/2002 | Lapidus et al. |
| 2005/0004331 | A1 | 1/2005 | Sun et al. |
| 2009/0137383 | A1 | 5/2009 | Tang et al. |

(Continued)

FOREIGN PATENT DOCUMENTS

| CN | 1096517 A | 12/1994 |
| CN | 1103069 A | 5/1995 |
| CN | 1126480 A | 7/1996 |

(Continued)

OTHER PUBLICATIONS

Ochędzan-Slodłak et al., "Heterogeneous Zirconocene Catalyst on Magnesium Support $MgCl_2(THF)_2$ Modified by $AlEt_2cl$ for Ethylene Polymerisation," *European Polymer J.* 41:941-947 (2005).

Sun et al., "In Situ Synthesis of $CpTi(dbrn)Cl_2/MgCl_2$ Catalyst and its Catalysis for Ethylene Polymerization," *ACTA Polymerica Sinica* 1:137-139 (2004).

Xiao et al., "Studies on $TiCl4/Ni(acac)_2$/L Supported Complex Catalysts for Ethylene Polymerization to Produce Branched Polyethylene," *ACTA Scientiarum Naturalium Universitaties Sunyatsen* 42(3):26-32 (2003).

(Continued)

*Primary Examiner* — Rip A. Lee
(74) *Attorney, Agent, or Firm* — Finnegan, Henderson, Farabow, Garrett & Dunner LLP

(57) ABSTRACT

This invention relates to a supported nonmetallocene catalyst and preparation thereof. The supported nonmetallocene catalyst can be produced with a simple and feasible process and is characterized by an easily controllable polymerization activity. This invention further relates to use of the supported nonmetallocene catalyst in olefin homopolymerization/copolymerization, which is characterized by a lowered assumption of the co-catalyst as compared with the prior art.

22 Claims, No Drawings

(56) References Cited

U.S. PATENT DOCUMENTS

| | | | |
|---|---|---|---|
| 2011/0237764 A1* | 9/2011 | Gu et al. ................. 526/185 |
| 2012/0214955 A1 | 8/2012 | Ren et al. | |

FOREIGN PATENT DOCUMENTS

| | | | |
|---|---|---|---|
| CN | 1307594 A | 8/2001 | |
| CN | 1332182 A | 1/2002 | |
| CN | 1344749 A | 4/2002 | |
| CN | 1363537 A | 8/2002 | |
| CN | 1364818 A | 8/2002 | |
| CN | 1403487 A | 3/2003 | |
| CN | 1422874 A | 6/2003 | |
| CN | 1461756 A | 12/2003 | |
| CN | 1539855 A | 10/2004 | |
| CN | 1789290 A | 6/2006 | |
| CN | 1789291 A | 6/2006 | |
| CN | 1789292 A | 6/2006 | |
| CN | 1884253 A | 12/2006 | |
| CN | 1884311 A | 12/2006 | |
| CN | 1887919 A | 1/2007 | |
| CN | 1962702 A | 5/2007 | |
| CN | 1539856 A | 10/2007 | |
| CN | 101412765 A | 4/2009 | |
| CN | 101412766 A | 4/2009 | |
| CN | 101412767 A | 4/2009 | |
| CN | 101412768 A | 4/2009 | |
| EP | 0206794 A1 | 12/1986 | |
| EP | 0685494 A1 | 12/1995 | |
| EP | 0708116 A1 | 4/1996 | |
| EP | 1426385 B1 | 8/2012 | |
| JP | 2008524344 | 7/2008 | |
| JP | 2009-537573 A | 10/2009 | |
| JP | 2013-506038 A | 2/2013 | |
| WO | WO 03/010207 A1 | 2/2003 | |
| WO | WO 2006/063501 A1 * | 6/2006 | ............... C08F 4/02 |
| WO | WO 2009/052700 A1 * | 4/2009 | ............... C08F 4/00 |
| WO | WO 2009/052701 A1 * | 4/2009 | ............. C08F 4/645 |

OTHER PUBLICATIONS

V. C. Gibson et al., "Advances in Non-Metallocene Olefin Polymerization Catalysis," Chem. Rev. (2003) 103, pp. 283-315.

G. J. P. Britovsek, "The Search for New-Generation Olefin Polymerization Catalysts: Life beyond Metallocenes," Angew. Chem., Int. Ed. (1999) 38, pp. 429-447.

Pages from the textbook of "Olefin Coordination Polymerization Catalyst and Polyolefin," edited by S. Xiao et al., Beijing Industry University Press, Dec. 2002 (9 pages).

Q. Huang et al., "Development in Olefin Polymerization Catalyst and Our Strategy in this Regard," Petrochemical Technology (2001), vol. 30 supplement, pp. 454-459.

* cited by examiner

SUPPORTED NONMETALLOCENE CATALYST, PREPARATION AND USE THEREOF

CROSS REFERENCE TO RELATED APPLICATIONS

This application is a U.S. national phase application based on PCT/CN2010/001606, filed Oct. 13, 2010, which claims the priority of Chinese Application Nos. 200910210985.X, filed Nov. 13, 2009; 200910210990.0, filed Nov. 13, 2009; 200910210987.9, filed Nov. 13, 2009; and 200910210991.5, filed Nov. 13, 2009, the contents of all of which are incorporated by reference herein in their entirety.

TECHNICAL FIELD

The present invention relates to a nonmetallocene catalyst. Specifically, this invention relates to a supported nonmetallocene catalyst, preparation thereof and use thereof in olefin homopolymerization/copolymerization.

BACKGROUND ART

The nonmetallocene catalyst, also called as the post-metallocene catalyst, was discovered in middle and late 1990's, whose central atom involves nearly all of the transition metal elements. The nonmetallocene catalyst is comparative to, or exceeds, the metallocene catalyst in some aspects of the performance, and has been classified as the fourth generation catalyst for olefin polymerization, following the Ziegler catalyst, the Ziegler-Natta catalyst and the metallocene catalyst. Polyolefin products produced with such catalysts exhibit favorable properties and boast low production cost. The coordination atom of the nonmetallocene catalyst comprises oxygen, nitrogen, sulfur and phosphor, without containing a cyclopentadiene group or a derivative thereof (for example, an indene group or a fluorene group). The nonmetallocene catalyst is characterized in that its central atom shows comparatively strong electrophilicity and has a cis alkyl metal type or a metal halide type central structure, which facilitates olefin insertion and σ-bond transfer. Therefore, the central atom is easily subject to alkylation, and therefore facilitates formation of a cationic active center. The thus formed complex has a restricted geometrical configuration, and is stereoselective, electronegative and chiral adjustable. Further, the formed metal-carbon bond is easy to be polarized, which further facilitates homopolymerization and copolymerization of an olefin. For these reasons, it is possible to obtain an olefin polymer having a comparatively high molecular weight, even under a comparatively high polymerization temperature.

However, it is known that in the olefin polymerization, the homogeneous phase catalyst suffers from such problems as short service life, fouling, high consumption of methyl aluminoxane, and undesirably low or high molecular weight in the polymer product, and thus only finds limited use in the solution polymerization process or the high-pressure polymerization process, which hinders its wider application in industry.

Chinese patent Nos. 01126323.7, 02151294.9 and 02110844.7, and WO03/010207 disclose a catalyst or catalyst system finding a broad application in olefin polymerization. However, the catalyst or catalyst system should be accompanied by a comparatively high amount of co-catalysts, to achieve an acceptable olefin polymerization activity. Further, the catalyst or catalyst system suffers from such problem as fouling of the reactor during polymerization.

It is normal to support the nonmetallocene catalyst by a certain process, so as to improve the performance of the catalyst in the polymerization and the particle morphology of the polymer products. This is reflected by, moderate reduction of the initial activity of the catalyst, elongation of the serve life of the catalyst, alleviation or elimination of caking or flash reaction during the polymerization, improvement of the polymer morphology, and increase of the apparent density of the polymer, thus extending its use to other polymerization processes, for example, the gas phase polymerization or the slurry polymerization.

Aiming at the catalysts of the Chinese patent Nos. 01126323.7, 02151294.9 and 02110844.7, and WO03/010207, Chinese patent application Laid-Open Nos. CN1539855A, CN1539856A, CN1789291A, CN1789292A and CN1789290A, and WO2006/063501, and Chinese application patent No. 200510119401.x provide several ways to support same catalyst on a carrier so as to obtain a supported nonmetallocene catalyst. However, each of these applications relates to the technology of supporting a transition metal-containing nonmetallocene organic metallic compound (also referred to as a nonmetallocene catalyst) on a treated carrier, which suffers from such problems as low load of the nonmetallocene catalyst or less strong bonding with the carrier.

Chinese patent application Laid-Open No. CN1539856A discloses a process for supporting a nonmetallocene catalyst on a composite carrier, comprising the steps of (1) drying or baking a porous carrier (as the carrier) at 100 to 1000° C., under an inert atmosphere or under a reduced pressure for 1 to 24 hours to thermally activate same; (2) dissolving a magnesium compound in a tetrahydrofuran-alcohol mixing system to obtain a solution, and then adding the thermally activated porous carrier to the solution, to sufficiently react with each other at 0 to 60° C. under stirring to obtain a transparent system, upon filtration, washing, drying and suction drying, to obtain a composite carrier; or introducing into the transparent solution a non-polar organic solvent to sufficiently precipitate same, and then upon filtration, washing, drying and suction drying to obtain a composite carrier; (3) dissolving a nonmetallocene catalyst for olefin polymerization in a solvent, and then contacting same with the composite carrier or the modified carrier for 12 to 72 hours, upon filtration, washing, drying and suction drying, to obtain the supported nonmetallocene catalyst. According to this process, it is necessary to prepare the composite carrier at the first place and then contacting same with the catalyst solution.

Most of the prior art olefin polymerization catalysts are metallocene catalyst-based, for example, those according to U.S. Pat. No. 4,808,561 and U.S. Pat. No. 5,240,894, Chinese patent application Laid-Open Nos. CN1344749A, CN1126480A, CN1307594A, CN1103069A, and CN1363537A, and U.S. Pat. No. 6,444,604, EP 0685494, U.S. Pat. No. 4,871,705 and EP0206794, and Chinese patent No. 94101358.8. Again, all of these applications relate to the technology of supporting a transition metal-containing metallocene catalyst on a treated carrier.

EP708116 discloses a process comprising contacting gasified ZrCl4 with a carrier at a temperature ranging from 160□ to 450□ to support thereon, then reacting the supported ZrCl4 with the Li-salt of a ligand to obtain a supported metallocene catalyst, which is finally used for olefin polymerization in combination with a co-catalyst. The process is rather undesirable for industrial production since the supporting procedure should be conducted at a high reaction temperature and under a high vacuum.

By using a supported nonmetallocene catalyst comprising silica gel as the carrier or as a component of the carrier, a polymer product having desirable particle morphology and controlled polymer particle size distribution can be obtained. However, the thus obtained catalyst suffers from comparatively low polymerization activity. Further, since the ash contains silica gel, the polymer thus obtained finds only restricted application in practice.

According to EUROPEAN POLYMER JOURNAL, 2005, 41, 941 to 947, a supported metallocene catalyst can be obtained by treating MgCl2(THF)2 with chloro ethyl aluminum, and supporting zirconocene dichloride thereon. Specifically, MgCl2 is dissolved in tetrahydrofuran, after precipitated by hexane and washed, the thus obtained solid is treated by chloro ethyl aluminum, and then supported with zirconocene dichloride.

According to Sun's article "Study of an in-situ process for preparing CpTi(dbma)Cl2/MgCl2 type catalyst and its use for catalyzing ethylene polymerization" (Gaofenzi Xuebao, 2004, (1):138), magnesium chloride (as the carrier) is prepared by the Grignard reagent process, and at the same time, CpTi(dbma)Cl2 is added thereto, so as to produce said CpTi(dbma)Cl2/MgCl2 type catalyst. According to said article, alkylation and supporting of the catalyst is conducted in one single step, and therefore the number of the steps for preparing the catalyst can be significantly reduced.

Chinese patent No. ZL200510080210.7 discloses a process for in-situ producing a supported vanadium-based nonmetallocene catalyst for olefin polymerization and use thereof, which comprises reacting dialkyl magnesium with acyl naphthol or a β-dione to form magnesium acyl naphthol or magnesium β-dione compound, then reacting with a chloride of vanadium (IV), so as to form the carrier and the active catalytic component simultaneously.

Chinese patent No. 200610026765.8 discloses a single site Zeigler-Natta catalyst for olefin polymerization. In this catalyst, a coordination group-containing salicylaldehyde or substituted salicylaldehyde derivative is used as the electron donor. The catalyst is produced by introducing a pre-treated carrier (for example, silica), a metallic compound (for example, TiCl4) and the electron donor into a magnesium compound (for example, MgCl2)/tetrahydrofuran solution and then post-treating the resultant.

Chinese patent No. 200610026766.2 is similar to this patent, and relates to an organic compound containing a hetero atom and use thereof for producing a Zeigler-Natty catalyst.

Chinese patent No. CN200710162676.0 discloses a supported nonmetallocene catalyst and preparation thereof, wherein a magnesium compound containing a catalytically active metal directly contacts with a nonmetallocene ligand by an in-situ supporting process. The magnesium compound containing a catalytically active metal has been prepared by introducing a Group IVB metal compound into a formed magnesium compound solid (for example, a magnesium compound solid or a modified magnesium compound solid), under which circumstance, it is impossible for the catalytically active metal and the magnesium compound to conduct a sufficient reaction with each other (contacting and reacting with each other at the molecular level), and for this reason, the resultant magnesium compound containing the catalytically active metal necessarily presents as a heterogeneous matter, which is unfavorable for the nonmetallocene ligand added afterward to bring its function into full play.

Similarly, Chinese patent No. 200710162667.1 discloses a supported nonmetallocene catalyst and preparation thereof, wherein a magnesium compound containing a nonmetallocene ligand directly contacts with a compound containing a catalytically active metal by an in-situ supporting process. The magnesium compound containing a nonmetallocene ligand has been prepared by introducing a solution of the nonmetallocene ligand into a formed magnesium compound solid (for example, a magnesium compound solid or a modified magnesium compound solid), under which circumstance, it is impossible for the nonmetallocene ligand and the magnesium compound to conduct a sufficient reaction with each other (contacting and reacting with each other at the molecular level), and for this reason, the resultant magnesium compound containing a nonmetallocene ligand necessarily presents as a heterogeneous matter, which is unfavorable for the nonmetallocene ligand to bring its function into full play.

International application No. PCT/CN2008/001739 is based on these two applications, and suffers from the above-identified problems.

The catalyst prepared using anhydrous magnesium chloride as a carrier exhibits a high catalytic activity in the olefin polymerization, but this kind of catalyst is very brittle, prone to crush in the polymerization reactor, resulting in a poor polymer morphology. The catalyst supported on silica has an excellent flowability, useful to a fluidized-bed gas-phase polymerization, but the silica-supported metallocene and nonmetallocene catalyst shows a lowered catalytic activity. If magnesium chloride could be appropriately combined with silica, a catalyst with high catalytic activity, controllable granule size and good abrasion resistance may be obtained.

Chinese application patent No. ZL01131136.3 discloses a process for producing a supported metallocene catalyst, which comprises mixing a carrier with a Group IVB transition metal halide in a solvent under the normal pressure, then directly reacting with the cation ion of a ligand, so as to integrate synthesis and supporting of the metallocene catalyst in one step. However, according to this process, the transition metal and the ligand is used at a molar ratio of 1:1, and a proton acceptor (for example, butyl lithium) is required. Further, the ligand to be used is a bridged or non-bridged metallocene ligand containing a cyclopentadiene group.

According to Xiao's article "Study on a novel Ni(acac)2/TiCl4/L ligand composite catalyst in ethylene polymerization to produce branched polyethylene" (Zhongshan Daxue Xuebao: Natural Science Edition, 2003, 42(3):28), anhydrous MgCl2, Ni(acac)2 and L are dissolved in a mixed solvent of tetrahydrofuran and ethanol, then silica gel is added thereto under stirring. Further, a determined amount of TiCl4 is added thereto to react for a predetermined duration. Then, a predetermined amount of Et2AlCl is added thereto to react for another predetermined duration. Finally, the resultant is dried by suction to obtain a composite catalyst comprising MgCl2-silica as the carrier and an α-diimine ligand L-modified Ni(acac)2/TiCl4 supported thereon. By using said catalyst in ethylene homopolymerization, branched polyethylene can be obtained. Specifically, in case of the ligand L2, branched polyethylene having a branch degree of 4 to 12 branched chains/1000 C can be obtained.

As can be seen from the aforesaid, the prior art supported nonmetallocene catalyst suffers from low olefin polymerization activity. If one tries to increase the activity, he has to significantly increase the amount of the co-catalyst to be used. Further, the prior art catalyst contains such carrier as silica gel for supporting, and therefore the polymer obtained from polymerization contains a relatively higher amount of ash, which is unfavorable for use of the polymer in practice. Further, the magnesium compound supported catalyst is characterized by the heterogeneous composition and distribution formed during its preparation, which is unfavorable for significant improvement of its catalyst activity.

Further, the prior art supported nonmetallocene catalyst suffers from the problem that due to the heterogeneous composition and distribution formed during preparation of the catalyst, the performances and particle morphology of the polymer product are restricted.

Therefore, there still exists a need for a supported nonmetallocene catalyst, which can be produced in a simple way and in an industrial scale, free of the problems associated with the prior art supported nonmetallocene catalyst.

SUMMARY OF THE INVENTION

Upon in-depth study of the prior art, the present inventors found that a supported nonmetallocene catalyst produced by using a specific process can solve the problems identified as aforesaid, whereby achieving this invention.

According to this invention, the present process for producing a supported nonmetallocene catalyst can be conducted in the absence of any proton donor or any electron donor (for example, di-ether compounds conventionally used in this field for this purpose), without the need of severe reaction requirements and reaction conditions. For these reasons, the present process is simple and suitable for industrial application.

Specifically, this invention generally relates to the first to fourth embodiments as follows.

The first embodiment relates to a process for producing a supported nonmetallocene catalyst, which comprises the steps of: dissolving a magnesium compound and a nonmetallocene ligand in the presence of an alcohol in a solvent, to obtain a magnesium compound solution; drying the magnesium compound solution to obtain a modified carrier; and treating the modified carrier with a chemical treating agent selected from the group consisting of Group IVB metal compounds to obtain the supported nonmetallocene catalyst.

The second embodiment relates to a process for producing a supported nonmetallocene catalyst, which comprises the steps of: dissolving a magnesium compound and a nonmetallocene ligand in the presence of an alcohol in a solvent, to obtain a magnesium compound solution; introducing into the magnesium compound solution a precipitating agent to obtain a modified carrier; and treating the modified carrier with a chemical treating agent selected from the group consisting of Group IVB metal compounds to obtain the supported nonmetallocene catalyst.

The third embodiment relates to a process for producing a supported nonmetallocene catalyst, which comprises the steps of: dissolving a magnesium compound and a nonmetallocene ligand in the presence of an alcohol in a solvent, to obtain a magnesium compound solution; mixing a porous carrier or a thermally activated porous carrier with the magnesium compound solution to obtain a slurry; drying the slurry to obtain a composite carrier; and treating the composite carrier with a chemical treating agent selected from the group consisting of Group IVB metal compounds to obtain the supported nonmetallocene catalyst.

The fourth embodiment relates to a process for producing a supported nonmetallocene catalyst, which comprises the steps of: dissolving a magnesium compound and a nonmetallocene ligand in the presence of an alcohol in a solvent, to obtain a magnesium compound solution; mixing a porous carrier or a thermally activated porous carrier with the magnesium compound solution to obtain a slurry; introducing into the slurry a precipitating agent to obtain a composite carrier; and treating the composite carrier with a chemical treating agent selected from the group consisting of Group IVB metal compounds to obtain the supported nonmetallocene catalyst.

More specifically, this invention relates to the following aspects.

1. A process for producing a supported nonmetallocene catalyst, comprising the steps of: dissolving a magnesium compound and a nonmetallocene ligand in the presence of an alcohol in a solvent, to obtain a magnesium compound solution; drying the magnesium compound solution, or introducing into the magnesium compound solution a precipitating agent, to obtain a modified carrier; and treating the modified carrier with a chemical treating agent selected from the group consisting of a Group IVB metal compound to obtain the supported nonmetallocene catalyst.

2. A process for producing a supported nonmetallocene catalyst, comprising the steps of: dissolving a magnesium compound and a nonmetallocene ligand in the presence of an alcohol in a solvent, to obtain a magnesium compound solution; mixing a porous carrier or a thermally activated porous carrier with the magnesium compound solution to obtain a slurry; drying the slurry, or introducing into the slurry a precipitating agent, to obtain a composite carrier; and treating the composite carrier with a chemical treating agent selected from the group consisting of a Group IVB metal compound to obtain the supported nonmetallocene catalyst.

3. The process according to any of the aforesaid aspects, further comprising the step of pre-treating the composite carrier or the modified carrier with an assistant chemical treating agent selected from the group consisting of an aluminoxane, an alkylaluminum and any combination thereof before treating the composite carrier or the modified carrier with the chemical treating agent.

4. The process according to any of the aforesaid aspects, wherein the porous carrier is one or more selected from the group consisting of olefin homopolymers or copolymers, vinyl alcohol homopolymers or copolymers, cyclodextrins, polyesters or co-polyesters, polyamides or co-polyamides, vinyl chloride homopolymers or copolymers, acrylic ester homopolymers or copolymers, methacrylic ester homopolymers or copolymers, styrene homopolymers or copolymers, partly crosslinked products of these homopolymers or copolymers, refractory oxides or refractory composite oxides of a Group IIA, IIIA, IVA or IVB metal in the Periodic Table of Elements, clay, molecular sieve, mica, montmorillonite, bentonite and kieselguhr, preferably one or more selected from the group consisting of partly crosslinked styrene polymers, silica, alumina, magnesia, silica-alumina, magnesia-alumina, titanium oxide, molecular sieve and montmorillonite, more preferably silica.

5. The process according to any of the aforesaid aspects, wherein the magnesium compound is one or more selected from the group consisting of a magnesium halide, an alkoxy magnesium halide, an alkoxy magnesium, an alkyl magnesium, an alkyl magnesium halide and an alkyl alkoxy magnesium, preferably one or more selected from the group consisting of a magnesium halide, more preferably magnesium chloride.

6. The process according to any of the aforesaid aspects, wherein the solvent is one or more selected from the group consisting of a $C_{6-12}$ aromatic hydrocarbon, a halogenated $C_{6-12}$ aromatic hydrocarbon, an ester and an ether, preferably one or more selected from the group consisting of a $C_{6-12}$ aromatic hydrocarbon and tetrahydrofuran, more preferably tetrahydrofuran, and the alcohol is one or more selected from the group consisting of an aliphatic alcohol, an aromatic alcohol and an alicyclic alcohol, wherein the alcohol is optionally substituted by a substituent selected from the group consisting of a halogen atom and a $C_{1-6}$ alkoxy group, preferably one or more selected from the group consisting of an aliphatic alcohol, more preferable one or more selected from the group consisting of ethanol and butanol.

7. The process according to any of the aforesaid aspects, wherein the nonmetallocene ligand is one or more selected from the group consisting of the compounds having the following structure,

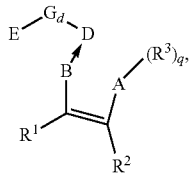

preferably one or more selected from the group consisting of the following compound (A) and the following compound (B),

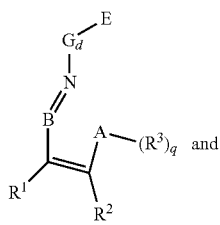
(A)

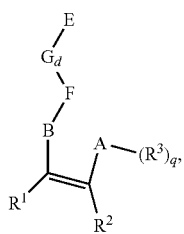
(B)

more preferably one or more selected from the group consisting of the following compound (A-1), the following compound (A-2), the following compound (A-3), the following compound (A-4), the following compound (B-1), the following compound (B-2), the following compound (B-3), and the following compound (B-4),

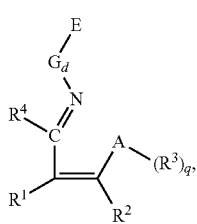
(A-1)

-continued

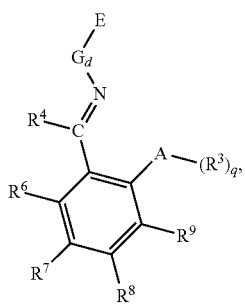
(A-2)

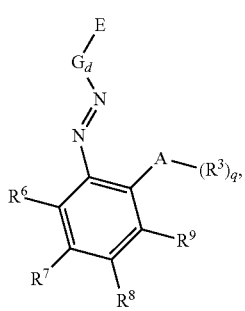
(A-3)

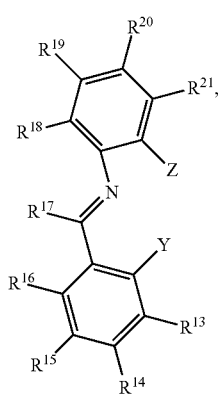
(A-4)

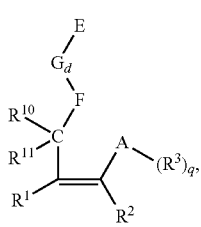
(B-1)

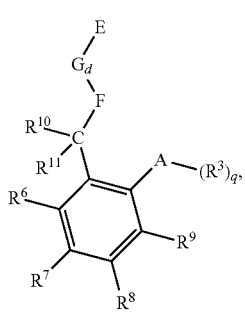
(B-2)

-continued

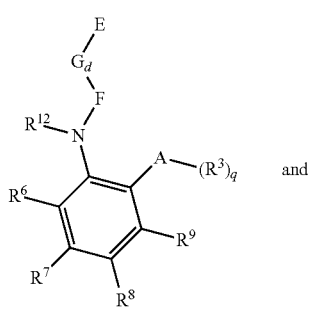
(B-3)

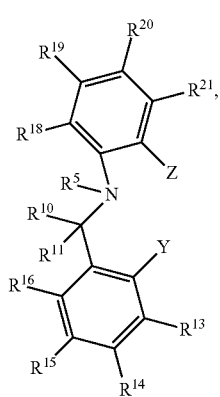
(B-4)

in all of the aforesaid formulae,
q is 0 or 1;
d is 0 or 1;
A is selected from the group consisting of an oxygen atom, a sulfur atom, a selenium atom,

—NR$^{23}$R$^{24}$, —N(O)R$^{25}$R$^{26}$,

—PR$^{28}$R$^{29}$, —P(O)R$^{30}$OR$^{31}$, a sulfone group, a sulfoxide group and —Se(O)R$^{39}$, wherein N, O, S, Se and P each represents a coordination atom;

B is selected from the group consisting of a nitrogen atom, a nitrogen-containing group, a phosphor-containing group and a C$_1$-C$_{30}$ hydrocarbyl;

D is selected from the group consisting of a nitrogen atom, an oxygen atom, a sulfur atom, a selenium atom, a phosphor atom, a nitrogen-containing group, a phosphor-containing group, a C$_1$-C$_{30}$ hydrocarbyl, a sulfone group, a sulfoxide group,

—N(O)R$^{25}$R$^{26}$,

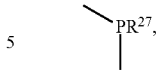

and —P(O)R$^{32}$(OR$^{33}$), wherein N, O, S, Se and P each represents a coordination atom;

E is selected from the group consisting of a nitrogen-containing group, an oxygen-containing group, a sulfur-containing group, a selenium-containing group, a phosphor-containing group and a cyano group, wherein N, O, S, Se and P each represents a coordination atom;

F is selected from the group consisting of a nitrogen atom, a nitrogen-containing group, an oxygen-containing group, a sulfur-containing group, a selenium-containing group and a phosphor-containing group, wherein N, O, S, Se and P each represents a coordination atom;

G is selected from the group consisting of a C$_1$-C$_{30}$ hydrocarbyl, a substituted C$_1$-C$_{30}$ hydrocarbyl and an inert functional group;

Y is selected from the group consisting of a nitrogen-containing group, an oxygen-containing group, a sulfur-containing group, a selenium-containing group and a phosphor-containing group, wherein N, O, S, Se and P each represents a coordination atom;

Z is selected from the group consisting of a nitrogen-containing group, an oxygen-containing group, a sulfur-containing group, a selenium-containing group, a phosphor-containing group and a cyano group, wherein N, O, S, Se and P each represents a coordination atom;

→ represents a single bond or a double bond;
— represents a covalent bond or an ionic bond;
R$^1$ to R$^4$, R$^6$ to R$^{36}$, R$^{38}$ and R$^{39}$ are each independently selected from the group consisting of a hydrogen atom, a C$_1$-C$_{30}$ hydrocarbyl, a substituted C$_1$-C$_{30}$ hydrocarbyl and an inert functional group, wherein these groups may be identical to or different from one another, and any adjacent groups may form a bond or a ring (preferably an aromatic ring) with one another; and R$^5$ is selected from the group consisting of the lone pair electron on the nitrogen atom, a hydrogen atom, a C$_1$-C$_{30}$ hydrocarbyl, a substituted C$_1$-C$_{30}$ hydrocarbyl, an oxygen-containing group, a sulfur-containing group, a nitrogen-containing group, a selenium-containing group, and a phosphor-containing group, with the proviso that when R$^5$ is the oxygen-containing group, the sulfur-containing group, the nitrogen-containing group, the selenium-containing group or the phosphor-containing group, N, O, S, P and Se in the group R$^5$ each can act as a coordination atom to coordinate with the central metal atom (the Group IVB metal atom), more preferably one or more selected from the group consisting of the following compounds,

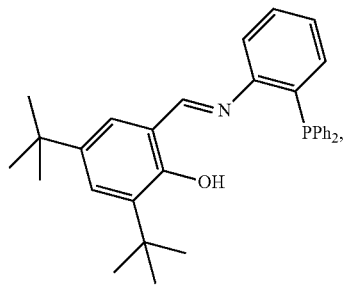

-continued

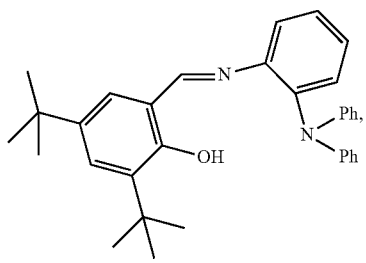

more preferably one or more selected from the group consisting of the following compounds,

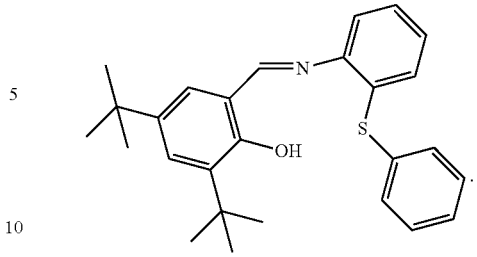

-continued

8. The process according to any of the aforesaid aspects, wherein,
the halogen atom is selected from the group consisting of F, Cl, Br and I,
the nitrogen-containing group is selected from the group consisting of

$-NR^{23}R^{24}$, $-T-NR^{23}R^{24}$ and $-N(O)R^{25}R^{26}$,
the phosphor-containing group is selected from the group consisting of

$-PR^{28}R^{29}$, $-P(O)R^{30}R^{31}$ and $-P(O)R^{32}(OR^{33})$,
the oxygen-containing group is selected from the group consisting of hydroxy, $-OR^{34}$ and $-T-OR^{34}$,
the sulfur-containing group is selected from the group consisting of $-SR^{35}$, $-T-SR^{35}$, $-S(O)R^{36}$ and $-T-SO_2R^{37}$,
the selenium-containing group is selected from the group consisting of $-SeR^{38}$, $-T-SeR^{38}$, $-Se(O)R^{39}$ and $-T-Se(O)R^{39}$,
the group T is selected from the group consisting of a $C_1$-$C_{30}$ hydrocarbyl, a substituted $C_1$-$C_{30}$ hydrocarbyl and an inert functional group,
$R^{37}$ is selected from the group consisting of a hydrogen atom, a $C_1$-$C_{30}$ hydrocarbyl, a substituted $C_1$-$C_{30}$ hydrocarbyl and an inert functional group,
the $C_1$-$C_{30}$ hydrocarbyl is selected from the group consisting of a $C_1$-$C_{30}$ alkyl group, a $C_7$-$C_{50}$ alkylaryl group, a $C_7$-$C_{50}$ aralkyl group, a $C_3$-$C_{30}$ cyclic alkyl group, a $C_2$-$C_{30}$ alkenyl group, a $C_2$-$C_{30}$ alkynyl group, a $C_6$-$C_{30}$ aryl group, a $C_8$-$C_{30}$ fused-ring group and a $C_4$-$C_{30}$ heterocycle group, wherein the heterocycle group contains 1 to 3 hetero atom(s) selected from the group consisting of a nitrogen atom, an oxygen atom and a sulfur atom,
the substituted $C_1$-$C_{30}$ hydrocarbyl is selected from the group consisting of the $C_1$-$C_{30}$ hydrocarbyl having one or more substituent(s) selected from the halogen atom and the $C_1$-$C_{30}$ alkyl group,
the inert functional group is selected from the group consisting of the halogen atom, the oxygen-containing group, the nitrogen-containing group, a silicon-containing group, a germanium-containing group, the sulfur-containing group, a tin-containing group, a $C_1$-$C_{10}$ ester group and a nitro group,
the silicon-containing group is selected from the group consisting of $-SiR^{42}R^{43}R^{44}$, and $-T-SiR^{45}$, the germanium-containing group is selected from the group consisting of —GeR$^{46}$R$^{47}$R$^{48}$, and -T-GeR$^{49}$, the tin-containing group is selected from the group consisting of —SnR$^{50}$R$^{61}$R$^{62}$, -T-SnR$^{53}$ and -T-Sn(O)R$^{54}$, R$^{42}$ to R$^{54}$ are each independently selected from the group consisting of a hydrogen atom, the C$_1$-C$_{30}$ hydrocarbyl, the substituted C$_1$-C$_{30}$ hydrocarbyl and the inert functional group, wherein these groups may be identical to or different from one another, and any adjacent groups may form a bond or a ring with one another, and the group T is defined as aforesaid.

9. The process according to any of the aforesaid aspects, wherein ratio by molar of the magnesium compound (based on Mg) to the nonmetallocene ligand is 1:0.0001-1, preferably 1:0.0002-0.4, more preferably 1:0.0008-0.2, more preferably 1:0.001-0.1, ratio of the magnesium compound to the solvent is 1 mol:75~400 ml, preferably 1 mol:150~300 ml, more preferably 1 mol:200~250 ml, ratio by molar of the magnesium compound (based on Mg) to the alcohol is 1:0.02~4.00, preferably 1:0.05~3.00, more preferably 1:0.10~2.50, ratio by weight of the magnesium compound (on a solid basis) to the porous carrier is 1:0.1-20, preferably 1:0.5-10, more preferably 1:1-5, ratio by volume of the precipitating agent to the solvent is 1:0.2~5, preferably 1:0.5~2, more preferably 1:0.8~1.5, and ratio by molar of the magnesium compound (based on Mg) to the chemical treating agent (based on the Group IVB metal) is 1:0.01-1, preferably 1:0.01-0.50, more preferably 1:0.10-0.30.

10. The process according to any of the aforesaid aspects, wherein the precipitating agent is one or more selected from the group consisting of an alkane, a cyclic alkane, a halogenated alkane and a halogenated cyclic alkane, preferably one or more selected from the group consisting of pentane, hexane, heptane, octane, nonane, decane, cyclohexane, cyclopentane, cycloheptane, cyclodecane, cyclononane, dichloromethane, dichloro hexane, dichloro heptane, trichloro methane, trichloro ethane, trichloro butane, dibromo methane, dibromo ethane, dibromo heptane, tribromo methane, tribromo ethane, tribromo butane, chlorinated cyclopentane, chlorinated cyclohexane, chlorinated cycloheptane, chlorinated cyclooctane, chlorinated cyclononane, chlorinated cyclodecane, brominated cyclopentane, brominated cyclohexane, brominated cycloheptane, brominated cyclooctane, brominated cyclononane and brominated cyclodecane, more preferably one or more selected from the group consisting of hexane, heptane, decane and cyclohexane, most preferably hexane.

11. The process according to any of the aforesaid aspects, wherein the Group IVB metal compound is one or more selected from the group consisting of a Group IVB metal halide, a Group IVB metal alkylate, a Group IVB metal alkoxylate, a Group IVB metal alkyl halide, and a Group IVB metal alkoxy halide, preferably one or more selected from the group consisting of a Group IVB metal halide, more preferably one or more selected from the group consisting of TiCl$_4$, TiBr$_4$, ZrCl$_4$, ZrBr$_4$, HfCl$_4$ and HfBr$_4$, more preferably one or more selected from the group consisting of TiCl$_4$ and ZrCl$_4$.

12. The process according to any of the aforesaid aspects, wherein the aluminoxane is one or more selected from the group consisting of methyl aluminoxane, ethyl aluminoxane, isobutyl aluminoxane and n-butyl aluminoxane, preferably one or more selected from the group consisting of methyl aluminoxane and isobutyl aluminoxane, and the alkylaluminum is one or more selected from the group consisting of trimethyl aluminum, triethyl aluminum, tripropyl aluminum, triisobutyl aluminum, tri-n-butyl aluminum, triisoamyl aluminum, tri-n-amyl aluminum, trihexyl aluminum, tri-iso-hexyl aluminum, diethyl methyl aluminum and ethyl dimethyl aluminum, more preferably one or more selected from the group consisting of trimethyl aluminum, triethyl aluminum, tripropyl aluminum and triisobutyl aluminum, most preferably one or more selected from the group consisting of triethyl aluminum and triisobutyl aluminum.

13. The process according to any of the aforesaid aspects, wherein ratio by molar of the magnesium compound (based on Mg) to the assistant chemical treating agent (based on Al) is 1:0-1.0, preferably 1:0-0.5, more preferably 1:0.1-0.5.

14. A supported nonmetallocene catalyst, produced in line with the process according to any of the aspects 1 to 13.

15. An olefin homopolymerization/copolymerization process, wherein the supported nonmetallocene catalyst according to the aspect 14 is used as the main catalyst, in combination of one or more selected from the group consisting of an aluminoxane, an alkylaluminum, a halogenated alkyl aluminum, a fluoroborane, an alkylboron and an alkylboron ammonium salt as the co-catalyst, for homopolymerization or copolymerization of the olefin.

16. An olefin homopolymerization/copolymerization process, comprising the steps of: producing a supported nonmetallocene catalyst in line with the process according to any of the aspects 1 to 13; and using the supported nonmetallocene catalyst as the main catalyst, in combination of one or more selected from the group consisting of an aluminoxane, an alkylaluminum, a halogenated alkyl aluminum, a fluoroborane, an alkylboron and an alkylboron ammonium salt as the co-catalyst, for homopolymerization or copolymerization of the olefin.

Effect of the Invention

According to the first and fourth embodiments of this invention, the following effects can be obtained.

The in-situ process for producing the supported nonmetallocene catalyst according to this invention is simple and feasible. The nonmetallocene ligand uniformly distributes throughout the magnesium compound or the composite carrier. It is easy to adjust the load of the nonmetallocene ligand. By increasing or reducing the ratio by molar of the nonmetallocene ligand to the magnesium compound, it is possible to increase or decrease the activity for ethylene polymerization of the catalyst and the content of the comonomer in the polymer, and somewhat broaden or narrow the molecular weight distribution of the resultant polymer. Further, it is possible to adjust the viscosity averaged molecular weight of the ultra high molecular weight polyethylene by altering the amount of the nonmetallocene ligand to be introduced.

The supported nonmetallocene catalyst produced in line with the process according to this invention shows a significant comonomer effect, i.e. the activity in copolymerization is higher than that in homopolymerization. Further, by the copolymerization, the bulk density of the polymer can be increased, i.e. the polymer morphology can be improved, while using MAO as the co-catalyst will enhance the comonomer effect.

According to the process of this invention (concerning the second embodiment), the magnesium compound solution is sufficiently precipitated in the presence of a precipitating agent and then filtered, washed and dried, and therefore the bonding between the essential materials in the catalyst is relatively strong, whereby increasing the polymer bulk density.

According to the process of this invention (concerning the third embodiment), the composite carrier has been produced by directly drying the slurry, and therefore it is easy to adjust the composition and amount of the essential materials in the catalyst, and the resultant catalyst shows increased activity over that obtained by filtering and washing the slurry.

According to the process of this invention (concerning the fourth embodiment), the slurry is sufficiently precipitated in the presence of a precipitating agent and then filtered, washed and dried, and therefore the bonding between the essential materials in the catalyst is relatively strong, whereby increasing the polymer bulk density.

According to this invention, the supported nonmetallocene catalyst obtained by a process wherein the composite carrier or the modified carrier is firstly subject to the treatment with an assistant chemical treating agent and then to that with a chemical treating agent shows increased catalyst activity and polymer bulk density, somewhat increased comonomer content, narrowed polymer molecular weight distribution, and increased viscosity averaged molecular weight for the ultra high molecular weight polyethylene, as compared with the supported nonmetallocene catalyst obtained by a process wherein the composite carrier or the modified carrier is subject only to the treatment with a chemical treating agent.

Further, the supported nonmetallocene catalyst produced in line with this invention exhibits significantly high activity in polymerization of ethylene or ethylene with other alpha-olefins.

Still further, the supported nonmetallocene catalyst produced in line with this invention can be used to obtain an ultra high molecular weight polyethylene having a relatively higher molecular weight through a homopolymerization process in the absence of hydrogen gas.

DETAILED DESCRIPTION OF THE INVENTION

This invention will be described in details hereinafter with reference to the following specific embodiments. However, it is known that the protection scope of this invention should not be construed as limited to these specific embodiments, but rather determined by the attached claims.

According to this invention, generally disclosed are the following first to fourth embodiments.

The first embodiment relates to a process for producing a supported nonmetallocene catalyst, which comprises the steps of: dissolving a magnesium compound and a nonmetallocene ligand in the presence of an alcohol in a solvent, to obtain a magnesium compound solution; drying the magnesium compound solution to obtain a modified carrier; and treating the modified carrier with a chemical treating agent selected from the group consisting of Group IVB metal compounds to obtain the supported nonmetallocene catalyst.

The second embodiment relates to a process for producing a supported nonmetallocene catalyst, which comprises the steps of: dissolving a magnesium compound and a nonmetallocene ligand in the presence of an alcohol in a solvent, to obtain a magnesium compound solution; introducing into the magnesium compound solution a precipitating agent to obtain a modified carrier; and treating the modified carrier with a chemical treating agent selected from the group consisting of Group IVB metal compounds to obtain the supported nonmetallocene catalyst.

The third embodiment relates to a process for producing a supported nonmetallocene catalyst, which comprises the steps of: dissolving a magnesium compound and a nonmetallocene ligand in the presence of an alcohol in a solvent, to obtain a magnesium compound solution; mixing a porous carrier or a thermally activated porous carrier with the magnesium compound solution to obtain a slurry; drying the slurry to obtain a composite carrier; and treating the composite carrier with a chemical treating agent selected from the group consisting of Group IVB metal compounds to obtain the supported nonmetallocene catalyst.

The fourth embodiment relates to a process for producing a supported nonmetallocene catalyst, which comprises the steps of: dissolving a magnesium compound and a nonmetallocene ligand in the presence of an alcohol in a solvent, to obtain a magnesium compound solution; mixing a porous carrier or a thermally activated porous carrier with the magnesium compound solution to obtain a slurry; introducing into the slurry a precipitating agent to obtain a composite carrier; and treating the composite carrier with a chemical treating agent selected from the group consisting of Group IVB metal compounds to obtain the supported nonmetallocene catalyst.

First of all, the step of obtaining the magnesium compound solution according to the first to fourth embodiments of this invention is detailedly described as follows.

Specifically, the magnesium compound and the nonmetallocene ligand are dissolved in the presence of an alcohol in a suitable solvent (hereinafter referred to as a solvent for dissolving the magnesium compound) to obtain the magnesium compound solution.

As the solvent, a $C_{6-12}$ aromatic hydrocarbon, a halogenated $C_{6-12}$ aromatic hydrocarbon, an ester and an ether can be exemplified. Specifically, toluene, xylene, trimethyl benzene, ethyl benzene, diethyl benzene, chlorinated toluene, chlorinated ethyl benzene, brominated toluene, brominated ethyl benzene, ethyl acetate and tetrahydrofuran can be exemplified. Preference is given to the $C_{6-12}$ aromatic hydrocarbon or tetrahydrofuran, more preferably tetrahydrofuran.

The solvents could be used with one kind or as a mixture of two or more kinds at any ratio therebetween.

According to this invention, the term "alcohol" is explained in a normal sense as known in this field, and refers to a $C_{1-10}$ monobasic alcohol.

As the alcohol, exemplified is an aliphatic alcohol, an aromatic alcohol and an alicyclic alcohol, preferably the aliphatic alcohol, more preferable ethanol and butanol. Further, the alcohol is optionally substituted by a substituent selected from the group consisting of a halogen atom and an alkoxy group.

For example, the aliphatic alcohol could be selected from the group consisting of methanol, ethanol, propanol, 2-propanol, butanol, pentanol, 2-methyl pentanol, 2-ethyl pentanol, 2-hexyl butanol, hexanol, 2-ethyl hexanol and the like, preferably ethanol, butanol and 2-ethyl hexanol.

The aromatic alcohol could be selected from the group consisting of benzyl alcohol, benzene ethanol and methyl benzyl alcohol and the like, preferably phenyl ethanol.

The alicyclic alcohol could be selected from the group consisting of cyclohexanol, cyclopentanol, cyclooctanol, methyl cyclopentanol, ethyl cyclopentanol, propyl cyclopentanol, methyl cyclohexanol, ethyl cyclohexanol, propyl cyclohexanol, methyl cyclooctanol, ethyl cyclooctanol and propyl cyclooctanol and the like, preferably cyclohexanol and methyl cyclohexanol.

The alcohol substituted by the halogen atom could be for example, trichloro methanol, trichloro ethanol and trichloro hexanol and the like, preferably trichloro methanol.

The alcohol substituted by the alkoxy group could be for example, ethylene glycol ethyl ether, ethylene glycol n-butyl ether and 1-butoxy-2-propanol and the like, preferably ethylene glycol ethyl ether.

The alcohols could be used with one kind or as a mixture of two or more kinds. If more than one alcohols are used as a mixture, the ratio of one alcohol to another alcohol in the mixture could be arbitrarily determined, without any limitation thereto.

For preparation of the magnesium compound solution, it is possible to meter the magnesium compound and the nonmetallocene ligand into a mixture solvent consisting of the solvent and the alcohol, and dissolve same therein, or meter the magnesium compound and the nonmetallocene ligand into the solvent, and at the same time or thereafter, to add the alcohol, and dissolve same therein, without any limitation thereto.

During preparation of the magnesium compound solution, it is desirable that the ratio by molar of the magnesium compound (based on Mg and on a solid basis) to the alcohol is 1:0.02~4.00, preferably 1:0.05~3.00, more preferably 1:0.10~2.50, while the ratio of the magnesium compound (based on Mg and on a solid basis) to the solvent for dissolving the magnesium compound is generally 1 mol:75~400 ml, preferably 1 mol:150~300 ml, more preferably 1 mol:200~250 ml.

According to this invention, as the amount of the nonmetallocene ligand to be used, it is desirable that the ratio by molar of the magnesium compound (based on Mg and on a solid basis) to the nonmetallocene ligand is 1:0.0001-1, preferably 1:0.0002-0.4, more preferably 1:0.0008-0.2, more preferably 1:0.001-0.1.

The duration for preparing the magnesium compound solution (i.e. the duration for dissolving the magnesium compound and the nonmetallocene ligand) is not specifically limited, usually 0.5 to 24 hours, preferably 4 to 24 hours. During preparation of the magnesium compound solution, any stirring means for example, a stirring paddle (whose rotational speed could be 10 to 1000 r/min), could be used to facilitate dissolution of the magnesium compound and the nonmetallocene ligand. If needed, heat can be suitably applied to facilitate the dissolution.

The magnesium compound is further described as follows.

According to this invention, the term "magnesium compound" is explained in a normal sense as known in this field, and refers to an organic or inorganic solid anhydrous Mg-containing compound conventionally used as a carrier for a supported catalyst for olefin polymerization.

According to this invention, as the magnesium compound, a magnesium halide, an alkoxy magnesium halide, an alkoxy magnesium, an alkyl magnesium, an alkyl magnesium halide and an alkyl alkoxy magnesium can be exemplified.

Specifically, the magnesium halide for example, could be selected from the group consisting of magnesium chloride ($MgCl_2$), magnesium bromide ($MgBr_2$), magnesium iodide ($MgI_2$) and magnesium fluoride ($MgF_2$), etc., such as magnesium chloride.

The alkoxy magnesium halide for example, could be selected from the group consisting of methoxy magnesium chloride ($Mg(OCH_3)Cl$), ethoxy magnesium chloride ($Mg(OC_2H_5)Cl$), propoxy magnesium chloride ($Mg(OC_3H_7)Cl$), n-butoxy magnesium chloride ($Mg(OC_4H_9)Cl$), isobutoxy magnesium chloride ($Mg(i-OC_4H_9)Cl$), methoxy magnesium bromide ($Mg(OCH_3)Br$), ethoxy magnesium bromide ($Mg(OC_2H_5)Br$), propoxy magnesium bromide ($Mg(OC_3H_7)Br$), n-butoxy magnesium bromide ($Mg(OC_4H_9)Br$), isobutoxy magnesium bromide ($Mg(i-OC_4H_9)Br$), methoxy magnesium iodide ($Mg(OCH_3)I$), ethoxy magnesium iodide ($Mg(OC_2H_5)I$), propoxy magnesium iodide ($Mg(OC_3H_7)I$), n-butoxy magnesium iodide ($Mg(OC_4H_9)I$) and isobutoxy magnesium iodide ($Mg(i-OC_4H_9)I$), etc., such as methoxy magnesium chloride, ethoxy magnesium chloride and isobutoxy magnesium chloride.

The alkoxy magnesium for example, could be selected from the group consisting of methoxy magnesium ($Mg(OCH_3)_2$), ethoxy magnesium ($Mg(OC_2H_5)_2$), propoxy magnesium ($Mg(OC_3H_7)_2$), butoxy magnesium ($Mg(OC_4H_9)_2$), isobutoxy magnesium ($Mg(i-OC_4H_9)_2$) and 2-ethyl hexyloxy magnesium ($Mg(OCH_2CH(C_2H_5)C_4H_9)_2$), etc., such as ethoxy magnesium and isobutoxy magnesium.

The alkyl magnesium for example, could be selected from the group consisting of methyl magnesium ($Mg(CH_3)_2$), ethyl magnesium ($Mg(C_2H_5)_2$), propyl magnesium ($Mg(C_3H_7)_2$), n-butyl magnesium ($Mg(C_4H_9)_2$) and isobutyl magnesium ($Mg(i-C_4H_9)_2$), etc., such as ethyl magnesium and n-butyl magnesium.

The alkyl magnesium halide for example, could be selected from the group consisting of methyl magnesium chloride ($Mg(CH_3)Cl$), ethyl magnesium chloride ($Mg(C_2H_5)Cl$), propyl magnesium chloride ($Mg(C_3H_7)Cl$), n-butyl magnesium chloride ($Mg(C_4H_9)Cl$), isobutyl magnesium chloride ($Mg(i-C_4H_9)Cl$), methyl magnesium bromide ($Mg(CH_3)Br$), ethyl magnesium bromide ($Mg(C_2H_5)Br$), propyl magnesium bromide ($Mg(C_3H_7)Br$), n-butyl magnesium bromide ($Mg(C_4H_9)Br$), isobutyl magnesium bromide ($Mg(i-C_4H_9)Br$), methyl magnesium iodide ($Mg(CH_3)I$), ethyl magnesium iodide ($Mg(C_2H_5)I$), propyl magnesium iodide ($Mg(C_3H_7)I$), n-butyl magnesium iodide ($Mg(C_4H_9)I$) and isobutyl magnesium iodide ($Mg(i-C_4H_9)I$), etc., such as methyl magnesium chloride, ethyl magnesium chloride and isobutyl magnesium chloride.

The alkyl alkoxy magnesium for example, could be selected from the group consisting of methyl methoxy magnesium ($Mg(OCH_3)(CH_3)$), methyl ethoxy magnesium ($Mg(OC_2H_5)(CH_3)$), methyl propoxy magnesium ($Mg(OC_3H_7)(CH_3)$), methyl n-butoxy magnesium ($Mg(OC_4H_9)(CH_3)$), methyl isobutoxy magnesium ($Mg(i—OC_4H_9)(CH_3)$), ethyl methoxy magnesium ($Mg(OCH_3)(C_2H_5)$), ethyl ethoxy magnesium ($Mg(OC_2H_5)(C_2H_5)$), ethyl propoxy magnesium ($Mg(OC_3H_7)(C_2H_5)$), ethyl n-butoxy magnesium ($Mg(OC_4H_9)(C_2H_5)$), ethyl isobutoxy magnesium ($Mg(i-OC_4H_9)(C_2H_5)$), propyl methoxy magnesium ($Mg(OCH_3)(C_3H_7)$), propyl ethoxy magnesium ($Mg(OC_2H_5)(C_3H_7)$), propyl propoxy magnesium ($Mg(OC_3H_7)(C_3H_7)$), propyl n-butoxy magnesium ($Mg(OC_4H_9)(C_3H_7)$), propyl isobutoxy magnesium ($Mg(i—OC_4H_9)(C_3H_7)$), n-butyl methoxy magnesium ($Mg(OCH_3)(C_4H_9)$), n-butyl ethoxy magnesium ($Mg(OC_2H_5)(C_4H_9)$), n-butyl propoxy magnesium ($Mg(OC_3H_7)(C_4H_9)$), n-butyl n-butoxy magnesium ($Mg(OC_4H_9)(C_4H_9)$), n-butyl isobutoxy magnesium ($Mg(i-OC_4H_9)(C_4H_9)$), isobutyl methoxy magnesium ($Mg(OCH_3)(i-C_4H_9)$), isobutyl ethoxy magnesium ($Mg(OC_2H_5)(i-C_4H_9)$), isobutyl propoxy magnesium ($Mg(OC_3H_7)(i-C_4H_9)$), isobutyl n-butoxy magnesium ($Mg(OC_4H_9)(i-C_4H_9)$) and isobutyl isobutoxy magnesium ($Mg(i-OC_4H_9)(i-C_4H_9)$), etc., such as butyl ethoxy magnesium.

The magnesium compounds could be used with one kind or as a mixture of two or more kinds, but without any limitation thereto.

For example, if more than one magnesium compounds are used as a mixture, the ratio by molar of one magnesium compound to another magnesium compound in the mixture could be, for example, 0.25 to 4:1, such as 0.5 to 3:1, such as 1 to 2:1.

According to this invention, the term "nonmetallocene complex" refers to an organic metallic compound capable of exhibiting a catalysis activity in olefin polymerization when combined with an aluminoxane (sometimes hereinafter referred to as a nonmetallocene complex for olefin polymerization). The compound contains a central metal atom and at least one multi-dentate ligand (preferably a tri or more-dentate ligand) bonding to the central metal atom by a coordination bond. The term "nonmetallocene ligand" corresponds to the multi-dentate ligand.

According to this invention, the nonmetallocene ligand is selected from the compounds having the following structure,

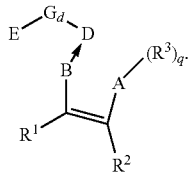

According to this invention, the groups A, D and E (the coordination groups) in the compound form a coordination bond by a coordination reaction with the Group IVB metal atom contained in the Group IVB metal compound used as the chemical treating agent herein through the coordination atoms (for example, hetero atoms like N, O, S, Se and P) contained in these groups, whereby forming a complex (i.e. the nonmetallocene complex according to this invention) having said Group IVB metal atom as the central atom.

According to a further embodiment of this invention, the nonmetallocene ligand is selected from the following compound (A) and the following compound (B),

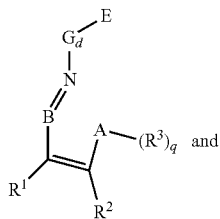
(A)

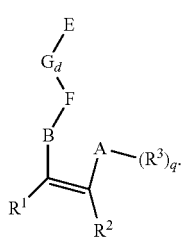
(B)

According to a further embodiment of this invention, the nonmetallocene ligand is selected from the following compound (A-1), the following compound (A-2), the following compound (A-3), the following compound (A-4), the following compound (B-1), the following compound (B-2), the following compound (B-3), and the following compound (B-4),

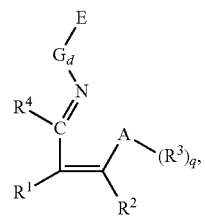
(A-1)

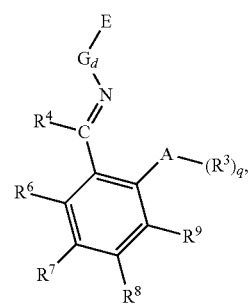
(A-2)

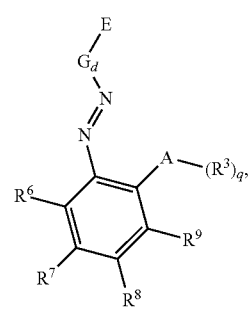
(A-3)

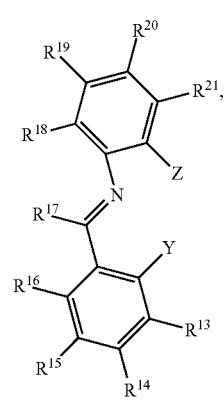
(A-4)

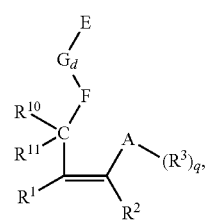
(B-1)

-continued

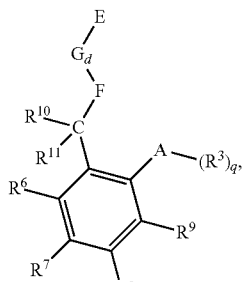
(B-2)

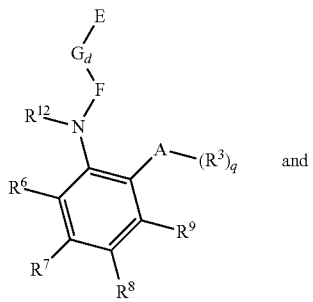
and
(B-3)

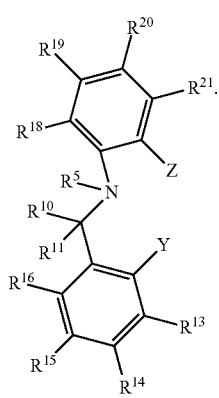
(B-4)

In all of the aforesaid formulae,
q is 0 or 1;
d is 0 or 1;
A is selected from the group consisting of an oxygen atom, a sulfur atom, a selenium atom,

—NR$^{23}$R$^{24}$, —N(O)R$^{25}$R$^{26}$,

—PR$^{28}$R$^{29}$, —P(O)R$^{30}$OR$^{31}$, a sulfone group, a sulfoxide group and —Se(O)R$^{39}$, wherein N, O, S, Se and P each represents a coordination atom;

B is selected from the group consisting of a nitrogen atom, a nitrogen-containing group, a phosphor-containing group and a C$_1$-C$_{30}$ hydrocarbyl;

D is selected from the group consisting of a nitrogen atom, an oxygen atom, a sulfur atom, a selenium atom, a phosphor atom, a nitrogen-containing group, a phosphor-containing group, a C$_1$-C$_{30}$ hydrocarbyl, a sulfone group, a sulfoxide group,

—N(O)R$^{25}$R$^{26}$,

and —P(O)R$^{32}$(OR$^{33}$), wherein N, O, S, Se and P each represents a coordination atom;

E is selected from the group consisting of a nitrogen-containing group, an oxygen-containing group, a sulfur-containing group, a selenium-containing group, a phosphor-containing group and a cyano group (—CN), wherein N, O, S, Se and P each represents a coordination atom;

F is selected from the group consisting of a nitrogen atom, a nitrogen-containing group, an oxygen-containing group, a sulfur-containing group, a selenium-containing group and a phosphor-containing group, wherein N, O, S, Se and P each represents a coordination atom;

G is selected from the group consisting of a C$_1$-C$_{30}$ hydrocarbyl, a substituted C$_1$-C$_{30}$ hydrocarbyl and an inert functional group;

Y is selected from the group consisting of a nitrogen-containing group, an oxygen-containing group, a sulfur-containing group, a selenium-containing group and a phosphor-containing group, wherein N, O, S, Se and P each represents a coordination atom;

Z is selected from the group consisting of a nitrogen-containing group, an oxygen-containing group, a sulfur-containing group, a selenium-containing group, a phosphor-containing group and a cyano group (—CN), for example, —NR$^{23}$R$^{24}$, —N(O)R$^{25}$R$^{26}$, —PR$^{28}$R$^{29}$, —P(O)R$^{30}$R$^{31}$, —OR$^{34}$, —SR$^{35}$, —S(O)R$^{36}$, —SeR$^{38}$ or —Se(O)R$^{39}$, wherein N, O, S, Se and P each represents a coordination atom;

→ represents a single bond or a double bond;

— represents a covalent bond or an ionic bond;

R$^1$ to R$^4$, R$^6$ to R$^{36}$, R$^{38}$ and R$^{39}$ are each independently selected from the group consisting of a hydrogen atom, a C$_1$-C$_{30}$ hydrocarbyl, a substituted C$_1$-C$_{30}$ hydrocarbyl (preferably a halogenated hydrocarbyl, for example —CH$_2$Cl and —CH$_2$CH$_2$Cl) and an inert functional group, wherein these groups may be identical to or different from one another, and any adjacent groups (for example R$^1$ and R$^2$, R$^6$ and R$^7$, R$^7$ and R$^8$, R$^8$ and R$^9$, R$^{13}$ and R$^{14}$R$^{14}$, and R$^{15}$, R$^{15}$ and R$^{16}$, R$^{18}$ and R$^{19}$, R$^{19}$ and R$^{20}$, R$^{20}$ and R$^{21}$, R$^{23}$ and R$^{24}$, or R$^{25}$ and R$^{26}$) may form a bond or a ring (preferably an aromatic ring, for example a unsubstituted benzene ring or a benzene ring substituted by one to four of a C$_1$-C$_{30}$ hydrocarbyl, a substituted C$_1$-C$_{30}$ hydrocarbyl (preferably a halogenated hydrocarbyl, for example —CH$_2$Cl and —CH$_2$CH$_2$Cl) or an inert functional group) with one another; and R$^5$ is selected from the group consisting of the lone pair electron on the nitrogen atom, a hydrogen atom, a C$_1$-C$_{30}$ hydrocarbyl, a substituted C$_1$-C$_{30}$ hydrocarbyl, an oxygen-containing group, a sulfur-containing group, a nitrogen-containing group, a selenium-containing group, and a phosphor-containing group, with the proviso that when $R^5$ is the oxygen-containing group, the sulfur-containing group, the nitrogen-containing group, the selenium-containing group or the phosphor-containing group, N, O, S, P and Se in the group $R^5$ each can act as a coordination atom to coordinate with the central metal atom (the Group IVB metal atom).

According to this invention, in all of the aforesaid formulae, if necessary, any two or more adjacent groups (for example $R^{21}$ and the group Z, or $R^{13}$ and the group Y) may form a ring with one another, preferably a $C_6$-$C_{30}$ aromatic heteroatomic ring containing the hetero atom originated from the group Z or Y, for example a pyridine ring, wherein the aromatic heteroatomic ring is optionally substituted by one or more substituent(s) selected from the group consisting of a $C_1$-$C_{30}$ hydrocarbyl, a substituted $C_1$-$C_{30}$ hydrocarbyl and an inert functional group.

In the context of this invention, the halogen atom is selected from the group consisting of F, Cl, Br and I the nitrogen-containing group is selected from the group consisting of

—$NR^{23}R^{24}$, -T-$NR^{23}R^{24}$ and —$N(O)R^{25}R^{26}$, the phosphor-containing group is selected from the group consisting of

—$PR^{28}R^{29}$, —$P(O)R^{30}R^{31}$ and —$P(O)R^{32}(OR^{33})$, the oxygen-containing group is selected from the group consisting of hydroxy, —$OR^{34}$ and -T-$OR^{34}$, the sulfur-containing group is selected from the group consisting of —$SR^{35}$, -T-$SR^{35}$, —$S(O)R^{36}$ and -T-$SO_2R^{37}$, the selenium-containing group is selected from the group consisting of —$SeR^{38}$, -T-$SeR^{38}$, —$Se(O)R^{39}$ and -T-$Se(O)R^{39}$, the group T is selected from the group consisting of a $C_1$-$C_{30}$ hydrocarbyl, a substituted $C_1$-$C_{30}$ hydrocarbyl and an inert functional group, and $R^{37}$ is selected from the group consisting of a hydrogen atom, a $C_1$-$C_{30}$ hydrocarbyl, a substituted $C_1$-$C_{30}$ hydrocarbyl and an inert functional group.

In the context of this invention, the $C_1$-$C_{30}$ hydrocarbyl is selected from the group consisting of a $C_1$-$C_{30}$ alkyl group (for example a $C_1$-$C_6$ alkyl group, for example isobutyl group), a $C_7$-$C_{50}$ alkylaryl group (for example tolyl, xylyl, diisobutyl phenyl), a $C_7$-$C_{50}$ aralkyl group (for example benzyl), a $C_3$-$C_{30}$ cyclic alkyl group, a $C_2$-$C_{30}$ alkenyl group, a $C_2$-$C_{30}$ alkynyl group, a $C_6$-$C_{30}$ aryl group (for example phenyl, naphthyl, anthracyl), a $C_8$-$C_{30}$ fused-ring group and a $C_4$-$C_{30}$ heterocyclic group, wherein the heterocyclic group contains 1 to 3 hetero atom(s) selected from the group consisting of a nitrogen atom, an oxygen atom and a sulfur atom, including for example a pyridyl group, a pyrrolyl group, a furanyl group and a thienyl group.

In the context of this invention, depending on the nature of the relevant groups to which the $C_1$-$C_{30}$ hydrocarbyl bond, it is obvious to a person skilled in the art that the $C_1$-$C_{30}$ hydrocarbyl may intend a $C_1$-$C_{30}$ hydrocarbon-diyl (a bivalent group, or referred to as a $C_1$-$C_{30}$ hydrocarbylene group) or a $C_1$-$C_{30}$ hydrocarbon-triyl (a trivalent group).

In the context of this invention, the substituted $C_1$-$C_{30}$ hydrocarbyl intends the aforesaid $C_1$-$C_{30}$ hydrocarbyl having one or more inert substituent(s). By inert, it means that these inert substituents will not substantially interfere with the coordination process between the aforesaid coordination groups (i.e. the aforesaid groups A, D, E, F, Y and Z, or further, if applicable, the group $R^5$) and the central metal atom (i.e. the aforesaid Group IVB metal atom). In other words, restricted by the specific chemical structure of the present nonmetallocene ligand, these substituents are incapable of or have no chance (due to for example steric hindrance) to coordinate with the Group IVB metal atom to form a coordination bond therewith. Generally, the inert substituent refers to the aforesaid halogen atom or $C_1$-$C_{30}$ alkyl group (for example a $C_1$-$C_6$ alkyl group, for example isobutyl group).

In the context of this invention, the term "inert functional group" does not comprise the aforesaid $C_1$-$C_{30}$ hydrocarbyl or substituted $C_1$-$C_{30}$ hydrocarbyl in its concept. As the inert functional group, the halogen atom, the oxygen-containing group, the nitrogen-containing group, a silicon-containing group, a germanium-containing group, the sulfur-containing group, a tin-containing group, a $C_1$-$C_{10}$ ester group or a nitro group (—$NO_2$) can be exemplified.

In the context of this invention, restricted by the specific structure of the present nonmetallocene ligand, the inert functional group is characterized that:

(1) it will not interfere with the coordination process between the aforesaid group A, D, E, F, Y or Z and the Group IVB metal atom, and (2) its capability to form a coordination bond with the Group IVB metal atom is inferior to the capability of the aforesaid group A, D, E, F, Y or Z to form a coordination bond with the Group IVB metal atom and will not displace the formed coordination between the Group IVB metal atom and these groups.

In the context of this invention, the silicon-containing group is selected from the group consisting of —$SiR^{42}R^{43}R^{44}$, and -T-$SiR^{45}$, the germanium-containing group is selected from the group consisting of —$GeR^{46}R^{47}R^{48}$, and -T-$GeR^{49}$, the tin-containing group is selected from the group consisting of —$SnR^{50}R^{51}R^{52}$, -T-$SnR^{53}$ and -T-$Sn(O)R^{54}$, $R^{42}$ to $R^{54}$ are each independently selected from the group consisting of a hydrogen atom, the $C_1$-$C_{30}$ hydrocarbyl, the substituted $C_1$-$C_{30}$ hydrocarbyl and the inert functional group, wherein these groups may be identical to or different from one another, and any adjacent groups may form a bond or a ring with one another, and the group T is defined as aforesaid.

As the nonmetallocene ligand, the following compounds can be further exemplified.

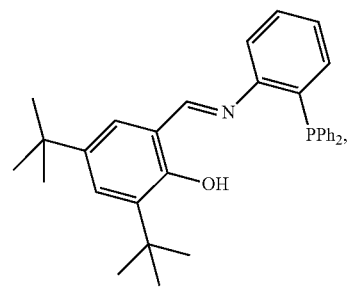

-continued
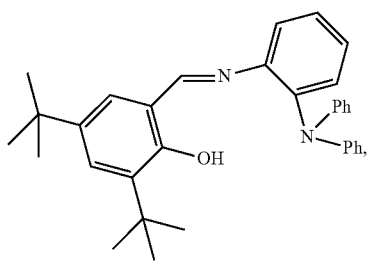
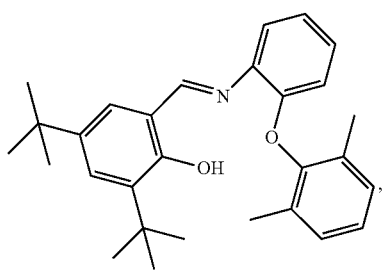
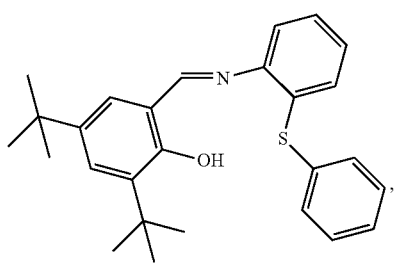
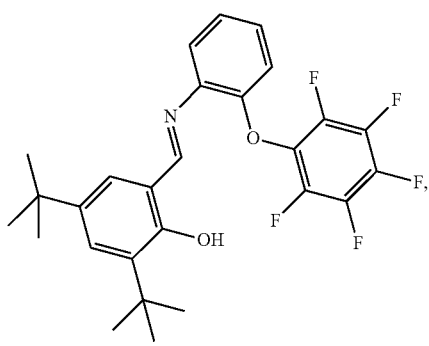
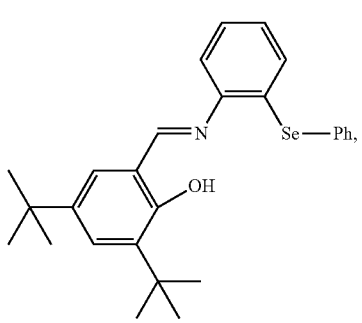
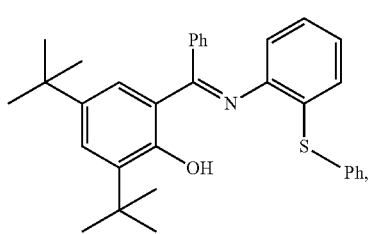
-continued
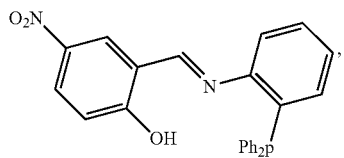
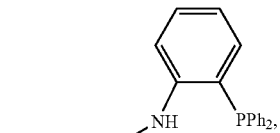
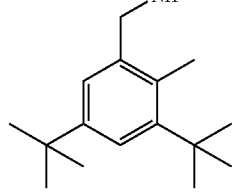
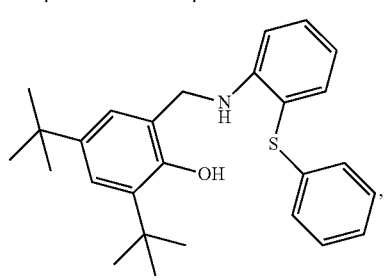
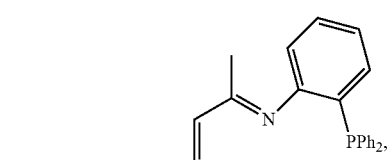
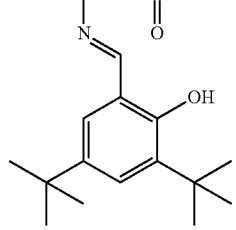
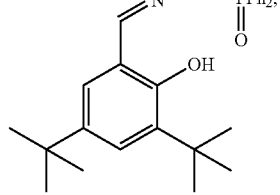

-continued
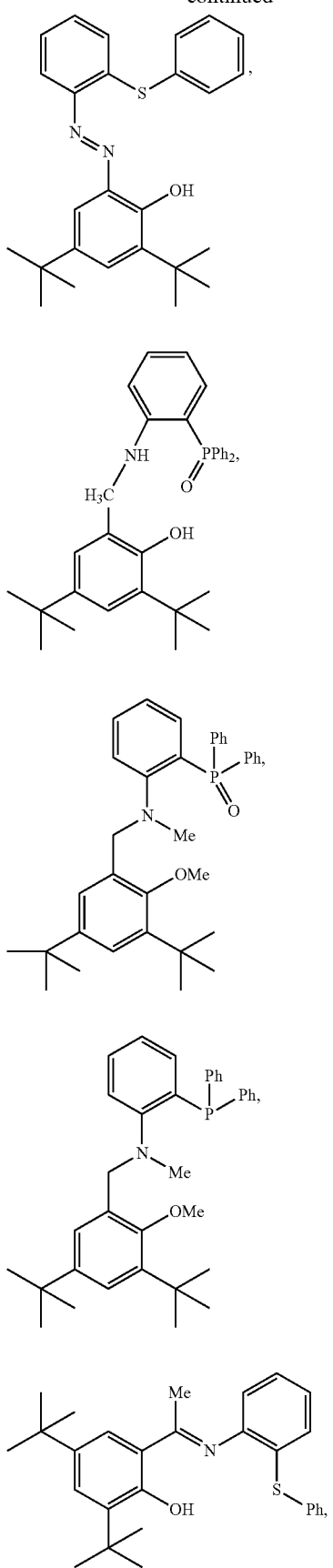
-continued
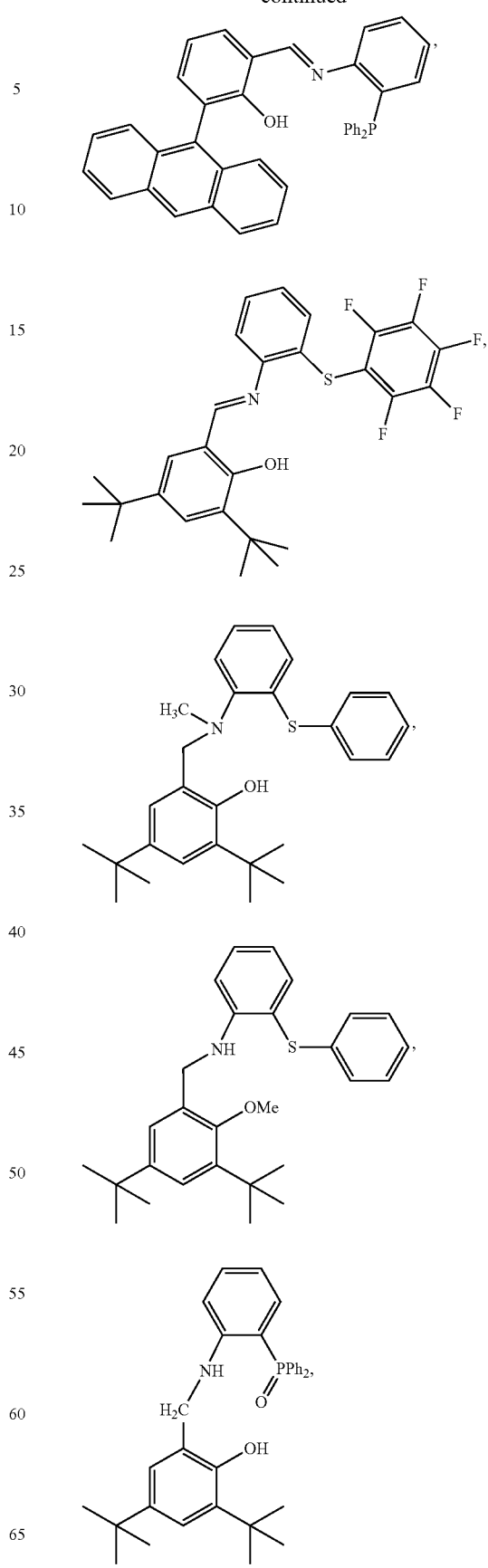

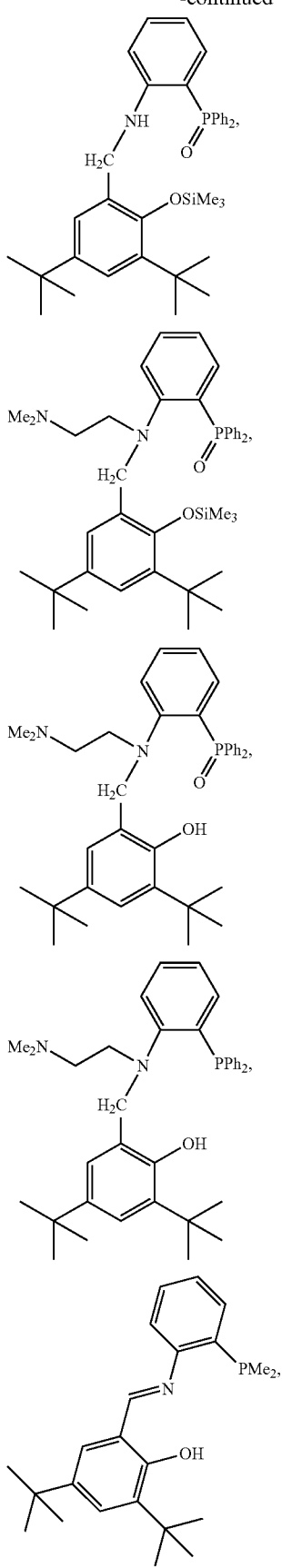
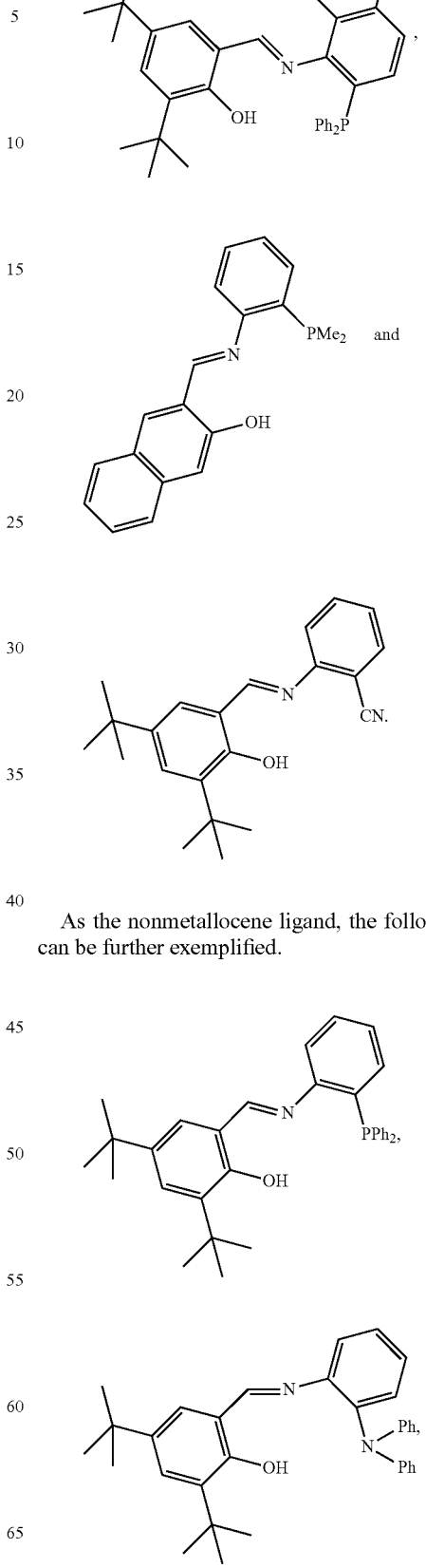
As the nonmetallocene ligand, the following compounds can be further exemplified.

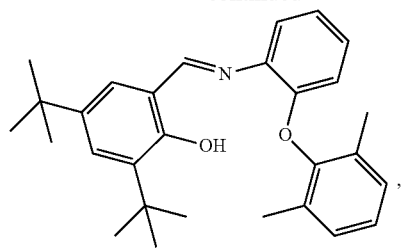
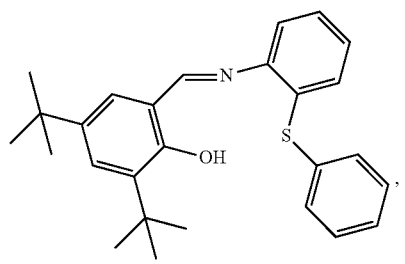
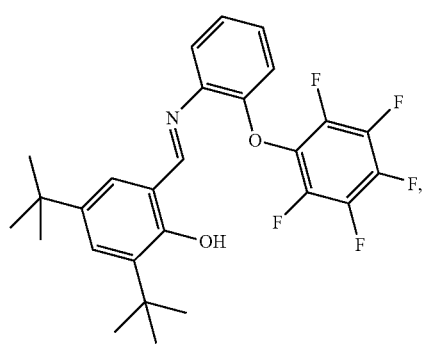
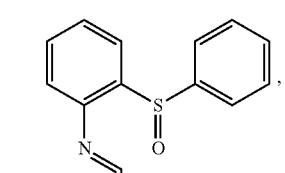
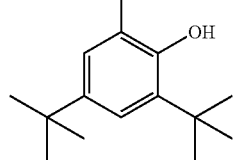
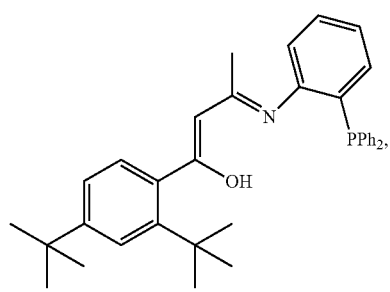
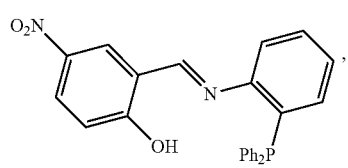
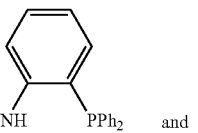
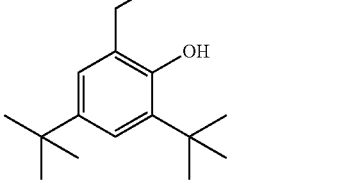
As the nonmetallocene ligand, the following compounds can be further exemplified.
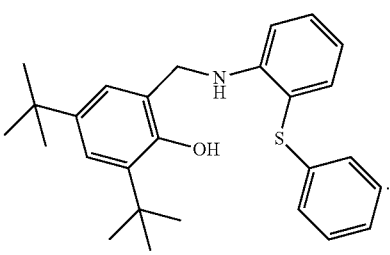
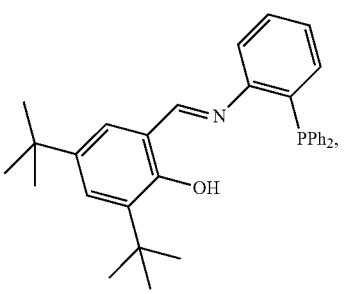
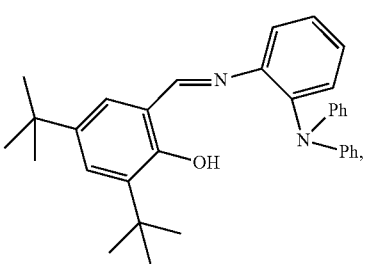
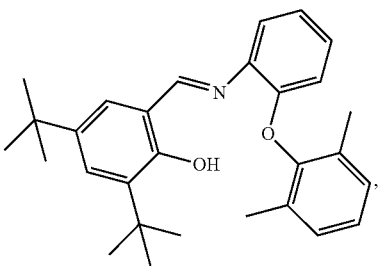

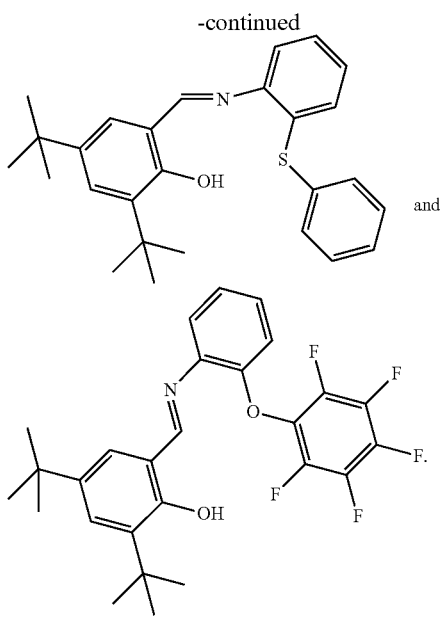

As the nonmetallocene ligand, the following compounds can be further exemplified.

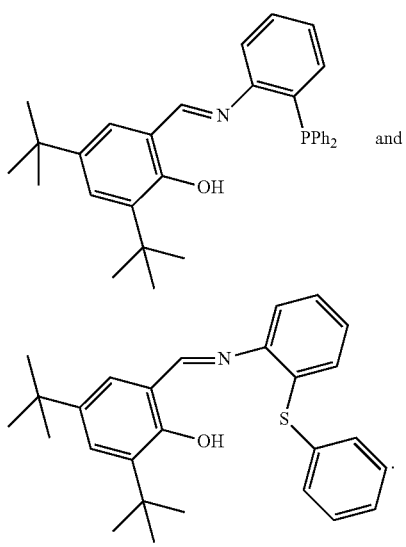

The nonmetallocene ligands could be used with one kind or as a mixture of two or more kinds at any ratio therebetween.

According to this invention, the nonmetallocene ligand does not correspond to the di-ether compound conventionally used in this field as an electron donor compound.

According to this invention, the nonmetallocene ligand can be produced in line with any process known in this field by a person skilled in the art. For the details of the process, one can refer to for example WO03/010207 or the Chinese Patent Nos. ZL01126323.7 and ZL02110844.7. All the references cited herein are incorporated by reference in their entireties.

According to the first embodiment of this invention, by directly drying the magnesium compound solution, a freely flowable solid product can be obtained, which corresponds to the modified carrier of this invention.

According to the first embodiment of this invention, in order to directly dry the magnesium compound solution, any conventional process, for example, drying under an inert gas atmosphere, vacuum drying or vacuum drying under heat, can be used, preferably vacuum drying under heat. The drying is generally conducted at a temperature 5 to 15° C. lower than the boiling point of any solvent in the magnesium compound solution, which would be a temperature of 30 to 160° C. or 60 to 130° C., while the duration for the drying is generally, not limiting to, 2 to 24 hours.

According to the third or fourth embodiment of this invention, the porous carrier is mixed with the magnesium compound solution, whereby obtaining the slurry.

According to this invention, mixing of the porous carrier with the magnesium compound solution could be conducted by using any conventional process, without any specific limitation. For example, the mixing could be conducted by for example at a temperature ranging from the normal temperature to the temperature at which the magnesium compound solution is prepared, metering the porous carrier into the magnesium compound solution, or metering the magnesium compound solution into the porous carrier, and then mixing with each other for 0.1 to 8 hours, such as 0.5 to 4 hours, such as 1 to 2 hours, if necessary, under stirring.

According to this invention, as the amount of the porous carrier to be used, it is desirable that the ratio by weight of the magnesium compound (based on the magnesium compound solid contained in the magnesium compound solution) to the porous carrier is 1:0.1-20, preferably 1:0.5-10, more preferably 1:1-5.

The resultant slurry is a slurry system. Though it is not always necessary, it is preferably for the slurry to stand in a sealed state for a determined duration after preparation, so as to secure uniformity of the system, wherein the duration could be 2 to 48 hours, such as 4 to 24 hours, such as 6 to 18 hours.

The porous carrier is further described as follows.

According to this invention, as the porous carrier, the organic or inorganic porous solid conventionally used in this field as the carrier for producing a supported catalyst can be exemplified.

Specifically, as the organic porous solid, olefin homopolymers or copolymers, vinyl alcohol homopolymers or copolymers, cyclodextrins, polyesters or co-polyesters, polyamides or co-polyamides, vinyl chloride homopolymers or copolymers, acrylic ester homopolymers or copolymers, methacrylic ester homopolymers or copolymers, styrene homopolymers or copolymers, and partly crosslinked products of these homopolymers or copolymers can be exemplified, preferably partly crosslinked styrene polymers (for example one having a crosslinking degree of from 2% to less than 100%).

According to a further embodiment of this invention, the organic porous solid has one or more active functional group(s) for example selected from the group consisting of a hydroxyl group, a primary amino group, a secondary amino group, a sulfonic acid group, a carboxyl group, an amido group, a N-mono substituted amido group, a sulfonamido group, a N-mono substituted sulfonamido group, a mercapto group, an imido group and a hydrazide group, on its surface, wherein the carboxyl group or the hydroxyl group is preferred.

According to a further embodiment of this invention, the organic porous solid is subjected to a thermal activation before use. The thermal activation can be conducted in a normal way. For example, the organic porous solid is treated by heat under a reduced pressure or under an inert gas atmosphere. By an inert gas atmosphere herein, it means that there exists no component capable of reacting with the organic porous solid in the gas atmosphere, or if does exist, only at a rather minor amount. As the inert gas atmosphere, a nitrogen gas or rare gas atmosphere can be exemplified, preferably a nitrogen gas atmosphere. In view of the poor heat resistance, the thermal activation in connection with the organic porous solid should be conducted with the proviso that the inherent structure and composition of the organic porous solid will not be destroyed. Generally, the temperature at which the thermal activation is conducted is from 50 to 400° C., preferably 100-250° C., while the duration for the thermal activation is from 1 to 24 hours, preferably 2 to 12 hours. After thermal activation, the organic porous solid should be stored under a positive pressure under an inert gas atmosphere before use.

As the inorganic porous solid, a refractory oxide of a Group IIA, IIIA, IVA or IVB metal in the Periodic Table of Elements (for example silica (also known as silicon dioxide or silica gel), alumina, magnesia, titania, zirconia, or thorium oxide), or a refractory composite oxide of any of these metals (for example, silica-alumina, magnesia-alumina, titania-silica, titania-magnesia, or titania-alumina), and clay, molecular sieve (for example ZSM-5 or MCM-41), mica, montmorillonite, bentonite or kieselguhr can be exemplified. As the inorganic porous solid, the oxide produced by high temperature hydrolysis of a gaseous metal halide or a gaseous silicon compound, for example silica produced by high temperature hydrolysis of silicon tetrachloride, or alumina produced by high temperature hydrolysis of AlCl3 can be further exemplified.

As the inorganic porous solid, preference is given to silica, alumina, magnesia, silica-alumina, magnesia-alumina, titania-silica, titanium oxide, molecular sieve and montmorillonite, more preferably silica.

According to this invention, suitable silica can be produced by any conventional process, or is any commercially available one. For example, Grace 955, Grace 948, Grace SP9-351, Grace SP9-485, Grace SP9-10046, Davsion Syloid 245 and Aerosil 812 from the Grace company, ES70, ES70X, ES70Y, ES70W, ES757, EP10X and EP11 from the Ineos company, or CS-2133 and MS-3040 from the PQ company can be exemplified.

According to a further embodiment of this invention, the inorganic porous solid has an active functional group on its surface, for example a hydroxyl group.

According to a further embodiment of this invention, the inorganic porous solid is subjected to a thermal activation before use. The thermal activation can be conducted in a normal way. For example, the inorganic porous solid is treated by heat under a reduced pressure or under an inert gas atmosphere. By an inert gas atmosphere herein, it means that there exists no component capable of reacting with the inorganic porous solid in the gas atmosphere, or if does exist, only at a rather minor amount. As the inert gas atmosphere, a nitrogen gas or rare gas atmosphere can be exemplified, preferably a nitrogen gas atmosphere. Generally, the temperature at which the thermal activation is conducted is from 200 to 800° C., preferably 400-700° C., preferably 400-650° C., while the duration for the thermal activation is from 0.5 to 24 hours, preferably 2 to 12 hours, preferably 4 to 8 hours. After thermal activation, the inorganic porous solid should be stored under a positive pressure under an inert gas atmosphere before use.

According to this invention, the surface area (measured by the BET method) of the porous carrier is generally, but not limiting to, 10 to 1000 m²/g, or 100 to 600 m²/g. The pore volume (measured by the nitrogen adsorption method) of the porous carrier is generally 0.1 to 4 cm³/g, or 0.2 to 2 cm³/g.

The average particle size (measured by a laser particle size analyzer) of the porous carrier is generally 1 to 500 µm, or 1 to 100 µm.

According to this invention, the porous carrier can present in any form, for example, fine powder, particulate, sphere, aggregate, or other form.

According to the third embodiment of this invention, by directly drying the slurry, or by filtering, washing and drying the slurry, preferably directly drying, a freely flowable solid product can be obtained, which corresponds to the composite carrier of this invention.

According to the third embodiment of this invention, in the case of directly drying the slurry, any conventional process, for example, drying under an inert gas atmosphere, vacuum drying or vacuum drying under heat, can be used, preferably vacuum drying under heat. The drying is generally conducted at a temperature 5 to 15° C. lower than the boiling point of any solvent in the slurry, which would be a temperature of 30 to 160° C. or 60 to 130° C., while the duration for the drying is generally, not limiting to, 2 to 24 hours.

According to the third embodiment of this invention, in case of filtering, washing and drying of the slurry, there is no limitation to the process for filtering, washing or drying, and any conventional process conventionally used in this field can be used as needed. According to this invention, the washing can be generally conducted for 1 to 6 times, preferable 2 to 3 times. Herein, the solvent for washing can be the same as or different from that contained in the slurry. The drying can be conducted in a conventional way, preferably as described in connection with the case of directly drying the slurry.

According to the second embodiment of this invention, by metering into the magnesium compound solution a precipitating agent, solid matter (solid product) is precipitated out of the magnesium compound solution, whereby obtaining the modified carrier.

Further, according to the fourth embodiment of this invention, by metering into the slurry a precipitating agent, solid matter (solid product) is precipitated out of the slurry, whereby obtaining the composite carrier of this invention.

The precipitating agent is further described as follows.

According to this invention, the term "precipitating agent" is explained in a normal sense as known in this field, and refers to a chemically inert liquid capable of lowering the solubility of a solute (for example the magnesium compound) in its solution to the degree that said solute precipitates from the solution as solid matter.

According to this invention, as the precipitating agent, a solvent that represents as a poor solvent for the magnesium compound while as a good solvent for the solvent for dissolving the magnesium compound can be exemplified. For example, an alkane, a cyclic alkane, a halogenated alkane and a halogenated cyclic alkane can be further exemplified.

As the alkane, exemplified is pentane, hexane, heptane, octane, nonane and decane, and the like, such as hexane, heptane and decane, such as hexane.

As the cyclic alkane, exemplified is cyclohexane, cyclo pentane, cyclo heptane, cyclo decane, cyclo nonane, and the like, such as cyclo hexane.

As the halogenated alkane, exemplified is dichloro methane, dichloro hexane, dichloro heptane, trichloro methane, trichloro ethane, trichloro butane, dibromo methane, dibromo ethane, dibromo heptane, tribromo methane, tribromo ethane, tribromo butane, and the like.

As the halogenated cyclic alkane, exemplified is chlorinated cyclo pentane, chlorinated cyclo hexane, chlorinated cyclo heptane, chlorinated cyclo octane, chlorinated cyclo nonane, chlorinated cyclo decane, brominated cyclo pentane, brominated cyclo hexane, brominated cyclo heptane, brominated cyclo octane, brominated cyclo nonane, brominated cyclo decane, and the like.

The precipitating agent can be used with one kind or as a mixture of two or more kinds at any ratio therebetween.

The precipitating agent could be added all at once or dropwise, such as all at once. During the precipitation, any stirring means could be used to facilitate uniform dispersion of the precipitating agent throughout the slurry or the magnesium compound solution, and eventually facilitate precipitation of the solid product. The stirring means could be in any form, for example, as a stirring paddle, whose rotational speed could be 10 to 1000 r/min.

There is no limitation as to the amount of the precipitating agent to be used, generally, the ratio by volume of the precipitating agent to the solvent for dissolving the magnesium compound is 1:0.2~5, preferably 1:0.5~2, more preferably 1:0.8~1.5.

There is no limitation as to the temperature at which the precipitating agent is, such as the normal temperature. Further, the precipitation process can be generally conducted at the normal temperature as well.

After completely precipitated, the thus obtained solid product is filtered, washed and dried. There is no limitation to the process for filtering, washing or drying, and any conventional process conventionally used in this field can be used as needed.

If needed, the washing can be generally conducted for 1 to 6 times, preferable 2 to 3 times. Herein, the solvent for washing can be the same as or different from the precipitating agent.

The drying can be conducted in line with a conventional process, for example, drying under an inert gas atmosphere, vacuum drying or vacuum drying under heat, preferably drying under an inert gas atmosphere or vacuum drying under heat, most preferably vacuum drying under heat.

The drying is generally conducted at a temperature ranging from the normal temperature to 100° C. for a duration by which the mass in drying will not loss weight any further. For example, in the case wherein tetrahydrofuran is used as the solvent for dissolving the magnesium compound, the drying is generally conducted at about 80° C. under vacuum for a duration of 2 to 12 hours, while toluene is used as the solvent for dissolving the magnesium compound, the drying is generally conducted at about 100° C. under vacuum for a duration of 4 to 24 hours.

Then, according to the first to fourth embodiments of this invention, the composite carrier or the modified carrier is treated with a chemical treating agent selected from the group consisting of Group IVB metal compounds (referred to as the chemical treating step hereinafter) so as to obtain the supported nonmetallocene catalyst of this invention.

According to this invention, by subjecting the composite carrier or the modified carrier to a chemical treatment with the chemical treating agent, reaction occurs between the nonmetallocene ligand contained in the composite carrier or the modified carrier with the chemical treating agent, so as to in-situ form a nonmetallocene complex on the carrier (hereinafter referred to as the in-situ supporting reaction), whereby obtaining the supported nonmetallocene catalyst according to this invention.

The chemical treating agent is further described as follows.

According to this invention, a Group IVB metal compound is used as the chemical treating agent.

As the Group IVB metal compound, exemplified is a Group IVB metal halide, a Group IVB metal alkylate, a Group IVB metal alkoxylate, a Group IVB metal alkyl halide, and a Group IVB metal alkoxy halide.

As the Group IVB metal halide, the Group IVB metal alkylate, the Group IVB metal alkoxylate, the Group IVB metal alkyl halide and the Group IVB metal alkoxy halide, exemplified is a compound having the following general formula (IV).

$$M(OR^1)_m X_n R^2_{4-m-n} \qquad (IV)$$

wherein, m is 0, 1, 2, 3, or 4, n is 0, 1, 2, 3, or 4,

M is a Group IVB metal in the Periodic Table of Elements, for example, titanium, zirconium, hafnium and the like, X is a halogen atom, for example, F, Cl, Br, and I, and $R^1$ and $R^2$ each independently is selected from the group consisting of a $C_1$-$C_{10}$ alkyl, for example, methyl, ethyl, propyl, n-butyl, isobutyl and the like, $R^1$ and $R^2$ could be identical to or different from each other.

Specifically, the Group IVB metal halide could be exemplified as for example, titanium tetrafluoride ($TiF_4$), titanium tetrachloride ($TiCl_4$), titanium tetrabromide ($TiBr_4$), titanium tetraiodide ($TiI_4$), zirconium tetrafluoride ($ZrF_4$), zirconium tetrachloride ($ZrCl_4$), zirconium tetrabromide ($ZrBr_4$), zirconium tetraiodide ($ZrI_4$), hafnium tetrafluoride ($HfF_4$), hafnium tetrachloride ($HfCl_4$), hafnium tetrabromide ($HfBr_4$), hafnium tetraiodide ($HfI_4$).

As the Group IVB metal alkylate, exemplified is tetramethyl titanium (Ti(CH$_3$)$_4$), tetraethyl titanium (Ti(CH$_3$CH$_2$)$_4$), tetraisobutyl titanium (Ti(i-C$_4$H$_9$)$_4$), tetran-butyl titanium (Ti(C$_4$H$_9$)$_4$), triethyl methyl titanium (Ti(CH$_3$)(CH$_3$CH$_2$)$_3$), diethyl dimethyl titanium (Ti(CH$_3$)$_2$(CH$_3$CH$_2$)$_2$), trimethyl ethyl titanium (Ti(CH$_3$)$_3$(CH$_3$CH$_2$)), triisobutyl methyl titanium (Ti(CH$_3$)(i-C$_4$H$_9$)$_3$), diisobutyl dimethyl titanium (Ti(CH$_3$)$_2$(i-C$_4$H$_9$)$_2$), trimethyl isobutyl titanium (Ti(CH$_3$)$_3$(i-C$_4$H$_9$)), triisobutyl ethyl titanium (Ti(CH$_3$CH$_2$)(i-C$_4$H$_9$)$_3$), diisobutyl diethyl titanium (Ti(CH$_3$CH$_2$)$_2$(i-C$_4$H$_9$)$_2$), triethyl isobutyl titanium (Ti(CH$_3$CH$_2$)$_3$(i-C$_4$H$_9$)), trin-butyl methyl titanium (Ti(CH$_3$)(C$_4$H$_9$)$_3$), din-butyl dimethyl titanium (Ti(CH$_3$)$_2$(C$_4$H$_9$)$_2$), trimethyl n-butyl titanium (Ti(CH$_3$)$_3$(C$_4$H$_9$)), trin-butyl methyl titanium (Ti(CH$_3$CH$_2$)(C$_4$H$_9$)$_3$), din-butyl diethyl titanium (Ti(CH$_3$CH$_2$)$_2$(C$_4$H$_9$)$_2$), triethyl n-butyl titanium (Ti(CH$_3$CH$_2$)$_3$(C$_4$H$_9$)), and so on, tetramethyl zirconium (Zr(CH$_3$)$_4$), tetraethyl zirconium (Zr(CH$_3$CH$_2$)$_4$), tetraisobutyl zirconium (Zr(i-C$_4$H$_9$)$_4$), tetran-butyl zirconium (Zr(C$_4$H$_9$)$_4$), triethyl methyl zirconium (Zr(CH$_3$)(CH$_3$CH$_2$)$_3$), diethyl dimethyl zirconium (Zr(CH$_3$)$_2$(CH$_3$CH$_2$)$_2$), trimethyl ethyl zirconium (Zr(CH$_3$)$_3$(CH$_3$CH$_2$)), triisobutyl methyl zirconium (Zr(CH$_3$)(i-C$_4$H$_9$)$_3$), diisobutyl dimethyl zirconium (Zr(CH$_3$)$_2$(i-C$_4$H$_9$)$_2$), trimethyl isobutyl zirconium (Zr(CH$_3$)$_3$(i-C$_4$H$_9$)), triisobutyl ethyl zirconium (Zr(CH$_3$CH$_2$)(i-C$_4$H$_9$)$_3$), diisobutyl diethyl zirconium (Zr(CH$_3$CH$_2$)$_2$(i-C$_4$H$_9$)$_2$), triethyl isobutyl zirconium (Zr(CH$_3$CH$_2$)$_3$(i-C$_4$H$_9$)), trin-butyl methyl zirconium (Zr(CH$_3$)(C$_4$H$_9$)$_3$), din-butyl dimethyl zirconium (Zr(CH$_3$)$_2$(C$_4$H$_9$)$_2$), trimethyl n-butyl zirconium (Zr(CH$_3$)$_3$(C$_4$H$_9$)), trin-butyl methyl zirconium (Zr(CH$_3$CH$_2$)(C$_4$H$_9$)$_3$), din-butyl diethyl zirconium (Zr(CH$_3$CH$_2$)$_2$(C$_4$H$_9$)$_2$), triethyl n-butyl zirconium (Zr(CH$_3$CH$_2$)$_3$(C$_4$H$_9$)), and so on, tetramethyl hafnium (Hf(CH$_3$)$_4$), tetraethyl hafnium (Hf(CH$_3$CH$_2$)$_4$), tetraisobutyl hafnium (Hf(i-C$_4$H$_9$)$_4$), tetran-butyl hafnium (Hf(C$_4$H$_9$)$_4$), triethyl methyl hafnium (Hf(CH$_3$)(CH$_3$CH$_2$)$_3$), diethyl dimethyl hafnium (Hf(CH$_3$)$_2$(CH$_3$CH$_2$)$_2$), trimethyl ethyl hafnium (Hf(CH$_3$)$_3$(CH$_3$CH$_2$)), triisobutyl methyl hafnium (Hf(CH$_3$)(i-C$_4$H$_9$)$_3$), diisobutyl dimethyl hafnium (Hf(CH$_3$)$_2$(i-C$_4$H$_9$)$_2$), trimethyl isobutyl hafnium (Hf(CH$_3$)$_3$(i-C$_4$H$_9$)), triisobutyl ethyl hafnium (Hf(CH$_3$CH$_2$)(i-C$_4$H$_9$)$_3$), diisobutyl diethyl hafnium (Hf(CH$_3$CH$_2$)$_2$(i-C$_4$H$_9$)$_2$), triethyl isobutyl hafnium (Hf(CH$_3$CH$_2$)$_3$(i-C$_4$H$_9$)), trin-butyl methyl hafnium (Hf(CH$_3$)(C$_4$H$_9$)$_3$), din-butyl dimethyl hafnium (Hf(CH$_3$)$_2$(C$_4$H$_9$)$_2$), trimethyl n-butyl hafnium (Hf(CH$_3$)$_3$(C$_4$H$_9$)), trin-butyl methyl hafnium (Hf(CH$_3$CH$_2$)(C$_4$H$_9$)$_3$), din-butyl diethyl hafnium (Hf(CH$_3$CH$_2$)$_2$(C$_4$H$_9$)$_2$), triethyl n-butyl hafnium (Hf(CH$_3$CH$_2$)$_3$(C$_4$H$_9$)), and so on.

As the Group IVB metal alkoxylate, exemplified is tetramethoxy titanium (Ti(OCH$_3$)$_4$), tetraethoxy titanium (Ti(OCH$_3$CH$_2$)$_4$), tetraisobutoxy titanium (Ti(i-OC$_4$H$_9$)$_4$), tetran-butoxy titanium (Ti(OC$_4$H$_9$)$_4$), triethoxy methoxy titanium (Ti(OCH$_3$)(OCH$_3$CH$_2$)$_3$), diethoxy dimethoxy titanium (Ti(OCH$_3$)$_2$(OCH$_3$CH$_2$)$_2$), trimethoxy ethoxy titanium (Ti(OCH$_3$)$_3$(OCH$_3$CH$_2$)), triisobutoxy methoxy titanium (Ti(OCH$_3$)(i-OC$_4$H$_9$)$_3$), diisobutoxy dimethoxy titanium (Ti(OCH$_3$)$_2$(i-OC$_4$H$_9$)$_2$), trimethoxy isobutoxy titanium (Ti(OCH$_3$)$_3$(i-OC$_4$H$_9$)), triisobutoxy ethoxy titanium (Ti(OCH$_3$CH$_2$)(i-OC$_4$H$_9$)$_3$), diisobutoxy diethoxy titanium (Ti(OCH$_3$CH$_2$)$_2$(i-OC$_4$H$_9$)$_2$), triethoxy isobutoxy titanium (Ti(OCH$_3$CH$_2$)$_3$(i-OC$_4$H$_9$)), tri-n-butoxy methoxy titanium (Ti(OCH$_3$)(OC$_4$H$_9$)$_3$), din-butoxy dimethoxy titanium (Ti(OCH$_3$)$_2$(OC$_4$H$_9$)$_2$), trimethoxy n-butoxy titanium (Ti(OCH$_3$)$_3$(OC$_4$H$_9$)), tri-n-butoxy methoxy titanium (Ti(OCH$_3$CH$_2$)(OC$_4$H$_9$)$_3$), din-butoxy diethoxy titanium (Ti(OCH$_3$CH$_2$)$_2$(OC$_4$H$_9$)$_2$), triethoxy n-butoxy titanium (Ti(OCH$_3$CH$_2$)$_3$(OC$_4$H$_9$)), and so on, tetramethoxy zirconium (Zr(OCH$_3$)$_4$), tetraethoxy zirconium (Zr(OCH$_3$CH$_2$)$_4$), tetraisobutoxy zirconium (Zr(i-OC$_4$H$_9$)$_4$), tetran-butoxy zirconium (Zr(OC$_4$H$_9$)$_4$), triethoxy methoxy zirconium (Zr(OCH$_3$)(OCH$_3$CH$_2$)$_3$), diethoxy dimethoxy zirconium (Zr(OCH$_3$)$_2$(OCH$_3$CH$_2$)$_2$), trimethoxy ethoxy zirconium (Zr(OCH$_3$)$_3$(OCH$_3$CH$_2$)), triisobutoxy methoxy zirconium (Zr(OCH$_3$)(i-OC$_4$H$_9$)$_3$), diisobutoxy dimethoxy zirconium (Zr(OCH$_3$)$_2$(i-OC$_4$H$_9$)$_2$), trimethoxy isobutoxy zirconium (Zr(OCH$_3$)$_3$(i-C$_4$H$_9$)), triisobutoxy ethoxy zirconium (Zr(OCH$_3$CH$_2$)(i-OC$_4$H$_9$)$_3$), diisobutoxy diethoxy zirconium (Zr(OCH$_3$CH$_2$)$_2$(i-OC$_4$H$_9$)$_2$), triethoxy isobutoxy zirconium (Zr(OCH$_3$CH$_2$)$_3$(i-OC$_4$H$_9$)), tri-n-butoxy methoxy zirconium (Zr(OCH$_3$)(OC$_4$H$_9$)$_3$), din-butoxy dimethoxy zirconium (Zr(OCH$_3$)$_2$(OC$_4$H$_9$)$_2$), trimethoxy n-butoxy zirconium (Zr(OCH$_3$)$_3$(OC$_4$H$_9$)), tri-n-butoxy methoxy zirconium (Zr(OCH$_3$CH$_2$)(OC$_4$H$_9$)$_3$), din-butoxy diethoxy zirconium (Zr(OCH$_3$CH$_2$)$_2$(OC$_4$H$_9$)$_2$), triethoxy n-butoxy zirconium (Zr(OCH$_3$CH$_2$)$_3$(OC$_4$H$_9$)), and so on, tetramethoxy hafnium (Hf(OCH$_3$)$_4$), tetraethoxy hafnium (Hf(OCH$_3$CH$_2$)$_4$), tetraisobutoxy hafnium (Hf(i-OC$_4$H$_9$)$_4$), tetran-butoxy hafnium (Hf(OC$_4$H$_9$)$_4$), triethoxy methoxy hafnium (Hf(OCH$_3$)(OCH$_3$CH$_2$)$_3$), diethoxy dimethoxy hafnium (Hf(OCH$_3$)$_2$(OCH$_3$CH$_2$)$_2$), trimethoxy ethoxy hafnium (Hf(OCH$_3$)$_3$(OCH$_3$CH$_2$)), triisobutoxy methoxy hafnium (Hf(OCH$_3$)(i-OC$_4$H$_9$)$_3$), diisobutoxy dimethoxy hafnium (Hf(OCH$_3$)$_2$(i-OC$_4$H$_9$)$_2$), trimethoxy isobutoxy hafnium (Hf(OCH$_3$)$_3$(i-OC$_4$H$_9$)), triisobutoxy ethoxy hafnium (Hf(OCH$_3$CH$_2$)(i-OC$_4$H$_9$)$_3$), diisobutoxy diethoxy hafnium (Hf(OCH$_3$CH$_2$)$_2$(i-OC$_4$H$_9$)$_2$), triethoxy isobutoxy hafnium (Hf(OCH$_3$CH$_2$)$_3$(i-C$_4$H$_9$)), tri-n-butoxy methoxy hafnium (Hf(OCH$_3$)(OC$_4$H$_9$)$_3$), din-butoxy dimethoxy hafnium (Hf(OCH$_3$)$_2$(OC$_4$H$_9$)$_2$), trimethoxy n-butoxy hafnium (Hf(OCH$_3$)$_3$(OC$_4$H$_9$)), tri-n-butoxy methoxy hafnium (Hf(OCH$_3$CH$_2$)(OC$_4$H$_9$)$_3$), din-butoxy diethoxy hafnium (Hf(OCH$_3$CH$_2$)$_2$(OC$_4$H$_9$)$_2$), triethoxy n-butoxy hafnium (Hf(OCH$_3$CH$_2$)$_3$(OC$_4$H$_9$)), and so on.

As the Group IVB metal alkyl halide, exemplified is trimethyl chloro titanium (TiCl(CH$_3$)$_3$), triethyl chloro titanium (TiCl(CH$_3$CH$_2$)$_3$), triisobutyl chloro titanium (TiCl(i-C$_4$H$_9$)$_3$), trin-butyl chloro titanium (TiCl(C$_4$H$_9$)$_3$), dimethyl dichloro titanium (TiCl$_2$(CH$_3$)$_2$), diethyl dichloro titanium (TiCl$_2$(CH$_3$CH$_2$)$_2$), diisobutyl dichloro titanium (TiCl$_2$(i-C$_4$H$_9$)$_2$), trin-butyl chloro titanium (TiCl(C$_4$H$_9$)$_3$), methyl trichloro titanium (Ti(CH$_3$)Cl$_3$), ethyl trichloro titanium (Ti(CH$_3$CH$_2$)Cl$_3$), isobutyl trichloro titanium (Ti(i-C$_4$H$_9$)Cl$_3$), n-butyl trichloro titanium (Ti(C$_4$H$_9$)Cl$_3$), trimethyl bromo titanium (TiBr(CH$_3$)$_3$), triethyl bromo titanium (TiBr(CH$_3$CH$_2$)$_3$), triisobutyl bromo titanium (TiBr(i-C$_4$H$_9$)$_3$), trin-butyl bromo titanium (TiBr(C$_4$H$_9$)$_3$), dimethyl dibromo titanium (TiBr$_2$(CH$_3$)$_2$), diethyl dibromo titanium (TiBr$_2$(CH$_3$CH$_2$)$_2$), diisobutyl dibromo titanium (TiBr$_2$(i-C$_4$H$_9$)$_2$), trin-butyl bromo titanium (TiBr(C$_4$H$_9$)$_3$), methyl tribromo titanium (Ti(CH$_3$)Br$_3$), ethyl tribromo titanium (Ti(CH$_3$CH$_2$)Br$_3$), isobutyl tribromo titanium (Ti(i-C$_4$H$_9$)Br$_3$), n-butyl tribromo titanium (Ti(C$_4$H$_9$)Br$_3$), trimethyl chloro zirconium (ZrCl(CH$_3$)$_3$), triethyl chloro zirconium (ZrCl(CH$_3$CH$_2$)$_3$), triisobutyl chloro zirconium (ZrCl(i-C$_4$H$_9$)$_3$), trin-butyl chloro zirconium (ZrCl(C$_4$H$_9$)$_3$), dimethyl dichloro zirconium (ZrCl$_2$(CH$_3$)$_2$), diethyl dichloro zirconium (ZrCl$_2$(CH$_3$CH$_2$)$_2$), diisobutyl dichloro zirconium (ZrCl$_2$(i-C$_4$H$_9$)$_2$), trin-butyl chloro zirconium (ZrCl(C$_4$H$_9$)$_3$), methyl trichloro zirconium (Zr(CH$_3$)Cl$_3$), ethyl trichloro zirconium (Zr(CH$_3$CH$_2$)Cl$_3$), isobutyl trichloro zirconium (Zr(i-C$_4$H$_9$)Cl$_3$), n-butyl trichloro zirconium (Zr(C$_4$H$_9$)Cl$_3$), trimethyl bromo zirconium (ZrBr(CH$_3$)$_3$), triethyl bromo zirconium (ZrBr(CH$_3$CH$_2$)$_3$), triisobutyl bromo zirconium (ZrBr(i-C$_4$H$_9$)$_3$), trin-butyl bromo zirconium (ZrBr(C$_4$H$_9$)$_3$), dimethyl dibromo zirconium (ZrBr$_2$(CH$_3$)$_2$), diethyl dibromo zirconium (ZrBr$_2$(CH$_3$CH$_2$)$_2$), diisobutyl dibromo zirconium (ZrBr$_2$(i-C$_4$H$_9$)$_2$), trin-butyl bromo zirconium (ZrBr(C$_4$H$_9$)$_3$), methyl tribromo zirconium (Zr(CH$_3$)Br$_3$), ethyl tribromo zirconium (Zr(CH$_3$CH$_2$)Br$_3$), isobutyl tribromo zirconium (Zr(i-C$_4$H$_9$)Br$_3$), n-butyl tribromo zirconium (Zr(C$_4$H$_9$)Br$_3$), trimethyl chloro hafnium (HfCl(CH$_3$)$_3$), triethyl chloro hafnium (HfCl(CH$_3$CH$_2$)$_3$), triisobutyl chloro hafnium (HfCl(i-C$_4$H$_9$)$_3$), trin-butyl chloro hafnium (HfCl(C$_4$H$_9$)$_3$), dimethyl dichloro hafnium (HfCl$_2$(CH$_3$)$_2$), diethyl dichloro hafnium (HfCl$_2$(CH$_3$CH$_2$)$_2$), diisobutyl dichloro hafnium (HfCl$_2$(i-C$_4$H$_9$)$_2$), trin-butyl chloro hafnium (HfCl(C$_4$H$_9$)$_3$), methyl trichloro hafnium (Hf(CH$_3$)Cl$_3$), ethyl trichloro hafnium (Hf(CH$_3$CH$_2$)Cl$_3$), isobutyl trichloro hafnium (Hf(i-C$_4$H$_9$)Cl$_3$), n-butyl trichloro hafnium (Hf(C$_4$H$_9$)Cl$_3$), trimethyl bromo hafnium (HfBr(CH$_3$)$_3$), triethyl bromo hafnium (HfBr(CH$_3$CH$_2$)$_3$), triisobutyl bromo hafnium (HfBr(i-C$_4$H$_9$)$_3$), trin-butyl bromo hafnium (HfBr(C$_4$H$_9$)$_3$), dimethyl dibromo hafnium (HfBr$_2$(CH$_3$)$_2$), diethyl dibromo hafnium (HfBr$_2$(CH$_3$CH$_2$)$_2$), diisobutyl dibromo hafnium (HfBr$_2$(i-C$_4$H$_9$)$_2$), trin-butyl bromo hafnium (HfBr(C$_4$H$_9$)$_3$), methyl tribromo hafnium (Hf(CH$_3$)Br$_3$), ethyl tribromo hafnium (Hf(CH$_3$CH$_2$)Br$_3$), isobutyl tribromo hafnium (Hf(i-C$_4$H$_9$)Br$_3$), n-butyl tribromo hafnium (Hf(C$_4$H$_9$)Br$_3$).

As the Group IVB metal alkoxy halide, exemplified is trimethoxy chloro titanium (TiCl(OCH$_3$)$_3$), triethoxy chloro titanium (TiCl(OCH$_3$CH$_2$)$_3$), triisobutoxy chloro titanium (TiCl(i-OC$_4$H$_9$)$_3$), tri-n-butoxy chloro titanium (TiCl(OC$_4$H$_9$)$_3$), dimethoxy dichloro titanium (TiCl$_2$(OCH$_3$)$_2$), diethoxy dichloro titanium (TiCl$_2$(OCH$_3$CH$_2$)$_2$), diisobutoxy dichloro titanium (TiCl$_2$(i-OC$_4$H$_9$)$_2$), tri-n-butoxy chloro titanium (TiCl(OC$_4$H$_9$)$_3$), methoxy trichloro titanium (Ti(OCH$_3$)Cl$_3$), ethoxy trichloro titanium (Ti(OCH$_3$CH$_2$)Cl$_3$), isobutoxy trichloro titanium (Ti(i-C$_4$H$_9$)Cl$_3$), n-butoxy trichloro titanium (Ti(OC$_4$H$_9$)Cl$_3$), trimethoxy bromo titanium (TiBr(OCH$_3$)$_3$), triethoxy bromo titanium (TiBr(OCH$_3$CH$_2$)$_3$), triisobutoxy bromo titanium (TiBr(i-OC$_4$H$_9$)$_3$), tri-n-butoxy bromo titanium (TiBr(OC$_4$H$_9$)$_3$), dimethoxy dibromo titanium (TiBr$_2$(OCH$_3$)$_2$), diethoxy dibromo titanium ($TiBr_2(OCH_3CH_2)_2$), diisobutoxy dibromo titanium ($TiBr_2(i\text{-}OC_4H_9)_2$), tri-n-butoxy bromo titanium ($TiBr(OC_4H_9)_3$), methoxy tribromo titanium ($Ti(OCH_3)Br_3$), ethoxy tribromo titanium ($Ti(OCH_3CH_2)Br_3$), isobutoxy tribromo titanium ($Ti(i\text{-}C_4H_9)Br_3$), n-butoxy tribromo titanium ($Ti(OC_4H_9)Br_3$), trimethoxy chloro zirconium ($ZrCl(OCH_3)_3$), triethoxy chloro zirconium ($ZrCl(OCH_3CH_2)_3$), triisobutoxy chloro zirconium ($ZrCl(i\text{-}OC_4H_9)_3$), tri-n-butoxy chloro zirconium ($ZrCl(OC_4H_9)_3$), dimethoxy dichloro zirconium ($ZrCl_2(OCH_3)_2$), diethoxy dichloro zirconium ($ZrCl_2(OCH_3CH_2)_2$), diisobutoxy dichloro zirconium ($ZrCl_2(i\text{-}OC_4H_9)_2$), tri-n-butoxy chloro zirconium ($ZrCl(OC_4H_9)_3$), methoxy trichloro zirconium ($Zr(OCH_3)Cl_3$), ethoxy trichloro zirconium ($Zr(OCH_3CH_2)Cl_3$), isobutoxy trichloro zirconium ($Zr(i\text{-}C_4H_9)Cl_3$), n-butoxy trichloro zirconium ($Zr(OC_4H_9)Cl_3$), trimethoxy bromo zirconium ($ZrBr(OCH_3)_3$), triethoxy bromo zirconium ($ZrBr(OCH_3CH_2)_3$), triisobutoxy bromo zirconium ($ZrBr(i\text{-}OC_4H_9)_3$), tri-n-butoxy bromo zirconium ($ZrBr(OC_4H_9)_3$), dimethoxy dibromo zirconium ($ZrBr_2(OCH_3)_2$), diethoxy dibromo zirconium ($ZrBr_2(OCH_3CH_2)_2$), diisobutoxy dibromo zirconium ($ZrBr_2(i\text{-}OC_4H_9)_2$), tri-n-butoxy bromo zirconium ($ZrBr(OC_4H_9)_3$), methoxy tribromo zirconium ($Zr(OCH_3)Br_3$), ethoxy tribromo zirconium ($Zr(OCH_3CH_2)Br_3$), isobutoxy tribromo zirconium ($Zr(i\text{-}C_4H_9)Br_3$), n-butoxy tribromo zirconium ($Zr(OC_4H_9)Br_3$), trimethoxy chloro hafnium ($HfCl(OCH_3)_3$), triethoxy chloro hafnium ($HfCl(OCH_3CH_2)_3$), triisobutoxy chloro hafnium ($HfCl(i\text{-}OC_4H_9)_3$), tri-n-butoxy chloro hafnium ($HfCl(OC_4H_9)_3$), dimethoxy dichloro hafnium ($HfCl_2(OCH_3)_2$), diethoxy dichloro hafnium ($HfCl_2(OCH_3CH_2)_2$), diisobutoxy dichloro hafnium ($HfCl_2(i\text{-}OC_4H_9)_2$), tri-n-butoxy chloro hafnium ($HfCl(OC_4H_9)_3$), methoxy trichloro hafnium ($Hf(OCH_3)Cl_3$), ethoxy trichloro hafnium ($Hf(OCH_3CH_2)Cl_3$), isobutoxy trichloro hafnium ($Hf(i\text{-}C_4H_9)Cl_3$), n-butoxy trichloro hafnium ($Hf(OC_4H_9)Cl_3$), trimethoxy bromo hafnium ($HfBr(OCH_3)_3$), triethoxy bromo hafnium ($HfBr(OCH_3CH_2)_3$), triisobutoxy bromo hafnium ($HfBr(i\text{-}OC_4H_9)_3$), tri-n-butoxy bromo hafnium ($HfBr(OC_4H_9)_3$), dimethoxy dibromo hafnium ($HfBr_2(OCH_3)_2$), diethoxy dibromo hafnium ($HfBr_2(OCH_3CH_2)_2$), diisobutoxy dibromo hafnium ($HfBr_2(i\text{-}OC_4H_9)_2$), tri-n-butoxy bromo hafnium ($HfBr(OC_4H_9)_3$), methoxy tribromo hafnium ($Hf(OCH_3)Br_3$), ethoxy tribromo hafnium ($Hf(OCH_3CH_2)Br_3$), isobutoxy tribromo hafnium ($Hf(i\text{-}C_4H_9)Br_3$), n-butoxy tribromo hafnium ($Hf(OC_4H_9)Br_3$).

As the Group IVB metal compound, preference is given to the Group IVB metal halide, such as $TiCl_4$, $TiBr_4$, $ZrCl_4$, $ZrBr_4$, $HfCl_4$ and $HfBr_4$, such as $TiCl_4$ and $ZrCl_4$.

The Group IVB metal compound could be used with one kind or as a mixture of two or more kinds at any ratio therebetween.

When the chemical treating agent presents as a liquid at the normal temperature, the chemical treating agent can be used by directly dropwise adding a predetermined amount of the chemical treating agent to a reaction subject to be treated with said chemical treating agent (i.e. the aforesaid composite carrier or modified carrier).

When the chemical treating agent presents a solid at the normal temperature, for ease of metering and handling, it is preferably to use said chemical treating agent in the form of a solution. Of course, when the chemical treating agent presents a liquid at the normal temperature, said chemical treating agent can be also used in the form of a solution if needed, without any specific limitation.

In preparation of the solution of the chemical treating agent, there is no limitation as to the solvent to be used herein, as long as the solvent is capable of dissolving the chemical treating agent.

Specifically, as the solvent, exemplified is a $C_{5-12}$ alkane or a halogenated $C_{5-12}$ alkane, for example pentane, hexane, heptane, octane, nonane, decane, undecane, dodecane, cyclohexane, chloro pentane, chloro hexane, chloro heptane, chloro octane, chloro nonane, chloro decane, chloro undecane, chloro dodecane, chloro cyclohexane and so on, preferably pentane, hexane, decane and cyclohexane, most preferably hexane.

The solvent could be used with one kind or as a mixture of two or more kinds at any ratio therebetween.

It is obvious that a solvent capable of extracting the magnesium compound is not used herein to dissolve the chemical treating agent, for example an ether based solvent, for example tetrahydrofuran.

Further, there is no limitation as to the concentration of the chemical treating agent in the solution, which could be determined as needed, as long as it is sufficient for the solution to deliver the predetermined amount of the chemical treating agent for the chemical treatment. As aforesaid, if the chemical treating agent presents as a liquid, it is convenient to use said chemical treating agent as such for the treatment, while it is also acceptable to convert it into a solution before use. Generally, the molar concentration of the chemical treating agent in its solution is, but not limiting to, 0.01 to 1.0 mol/L.

As a process for conducing the chemical treatment, exemplified is a process wherein, when a solid chemical treating agent (for example $ZrCl_4$) is used, first of all, a solution of the chemical treating agent is prepared, then the chemical treating agent is added (preferably dropwise) at a predetermined amount to the composite carrier or modified carrier to be treated, or when a liquid chemical treating agent (for example $TiCl_4$) is used, it is acceptable to add (preferably dropwise) a predetermined amount of the chemical treating agent as such (or after prepared into a solution) to the composite carrier or modified carrier to be treated. Then, the chemical treating reaction continues (facilitated by any stirring means, if necessary) at a reaction temperature ranging from −30° C. to 60° C. (preferably −20° C. to 30° C.) for 0.5 to 24 hours, preferably 1 to 8 hours, more preferably 2 to 6 hours. Then, the resultant is filtrated, washed and dried.

According to this invention, the filtrating, washing (generally for 1 to 8 times, preferably 2 to 6 times, most preferably 2 to 4 times) and drying can be conducted in a conventional manner, wherein the solvent for washing could be the same as that used for dissolving the chemical treating agent.

According to this invention, as the amount of the chemical treating agent to be used, it is preferably that the ratio by molar of the magnesium compound (based on Mg and on a solid basis) to the chemical treating agent (based on the Group IVB metal, for example Ti) is 1:0.01-1, preferably 1:0.01-0.50, more preferably 1:0.10-0.30.

According to a further embodiment of this invention, the present process for producing a supported nonmetallocene catalyst further comprises a step of pre-treating the composite carrier or modified carrier with an assistant chemical treating agent selected from the group consisting of an aluminoxane, an alkylaluminum and any combination thereof before treating the composite carrier or modified carrier with the chemical treating agent, referred to as the pre-treating step hereinafter. Then, the chemical treating step is conducted by using the chemical treating agent in the same way as aforesaid, with the only difference of replacing the composite carrier (or the modified carrier) with the thus pre-treated composite carrier (or the thus pre-treated modified carrier).

The assistant chemical treating agent is further described as follows.

According to this invention, as the assistant chemical treating agent, exemplified is aluminoxane and alkylaluminum.

As the aluminoxane, exemplified is a linear aluminoxane $((R)(R)Al-(Al(R)-O)_n-O-Al(R)(R))$ having the following formula (I), and a cyclic aluminoxane $(-(Al(R)-O-)_{n+2}-)$ having the following formula (II).

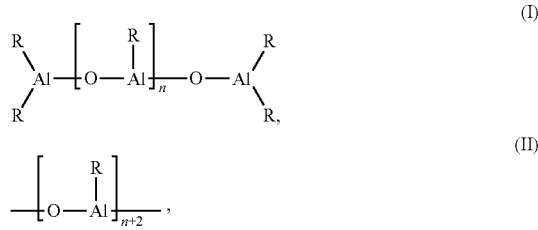

wherein the Rs are identical to or different from one another, preferably identical to one another, and each independently is selected from the group consisting of a $C_1$-$C_8$ alkyl, preferably methyl, ethyl, and iso-butyl, most preferably methyl, n is an integer of 1 to 50, preferably of 10 to 30.

Specifically, the aluminoxane could be preferably selected from the group consisting of methyl aluminoxane, ethyl aluminoxane, isobutyl aluminoxane and n-butyl aluminoxane, preferably methyl aluminoxane (MAO) and isobutyl aluminoxane (IBAO).

The aluminoxane could be used with one kind or as a mixture of two or more kinds at any ratio therebetween.

As the alkylaluminum, exemplified is a compound having a general formula (III) as follows:

wherein the Rs are identical to or different from one another, preferably identical to one another, and is each independently selected from the group consisting of a $C_1$-$C_8$ alkyl, preferably methyl, ethyl and iso-butyl, most preferably methyl.

Specifically, the alkylaluminum could be selected from the group consisting of trimethyl aluminum $(Al(CH_3)_3)$, triethyl aluminum $(Al(CH_3CH_2)_3)$, tripropyl aluminum $(Al(C_3H_7)_3)$, triisobutyl aluminum $(Al(i-C_4H_9)_3)$, tri-n-butyl aluminum $(Al(C_4H_9)_3)$, triisoamyl aluminum $(Al(i-C_5H_{11})_3)$, tri-n-amyl aluminum $(Al(C_5H_{11})_3)$, trihexyl aluminum $(Al(C_6H_{13})_3)$, tri-iso-hexyl aluminum $(Al(i-C_6H_{13})_3)$, diethyl methyl aluminum $(Al(CH_3)(CH_3CH_2)_2)$ and ethyl dimethyl aluminum $(Al(CH_3CH_2)(CH_3)_2)$, and the like, wherein preference is given to trimethyl aluminum, triethyl aluminum, triisobutyl aluminum and tripropyl aluminum, most preferably triethyl aluminum and triisobutyl aluminum.

The alkylaluminum could be used with one kind or as a mixture of two or more kinds at any ratio therebetween.

According to this invention, as the assistant chemical treating agent, used could be only the alkylaluminum or only the aluminoxane, or any mixture of the alkylaluminum and the aluminoxane. There is no limitation as to the ratio between any two or more components in the mixture, which could be determined as needed.

According to this invention, the assistant chemical treating agent is generally used in the form of a solution. In preparation of the solution of the assistant chemical treating agent, there is no limitation as to the solvent to be used herein, as long as the solvent can dissolve the assistant chemical treating agent.

Specifically, as the solvent, exemplified is a $C_{5-12}$ alkane or a halogenated $C_{5-12}$ alkane, for example pentane, hexane, heptane, octane, nonane, decane, undecane, dodecane, cyclohexane, chloro pentane, chloro hexane, chloro heptane, chloro octane, chloro nonane, chloro decane, chloro undecane, chloro dodecane, chloro cyclohexane and so on, preferably pentane, hexane, decane and cyclohexane, most preferably hexane.

It is obvious that a solvent capable of extracting the magnesium compound is not used herein to dissolve the assistant chemical treating agent, for example an ether based solvent, for example tetrahydrofuran.

The solvent could be used with one kind or as a mixture of two or more kinds at any ratio therebetween.

Further, there is no limitation as to the concentration of the assistant chemical treating agent in the solution, which could be determined as needed, as long as it is sufficient for the solution to deliver a predetermined amount of the assistant chemical treating agent for the pre-treatment.

As a process for conducting the pre-treatment, exemplified is a process wherein, first of all, a solution of the assistant chemical treating agent is prepared, then at a temperature ranging from $-30°$ C. to $60°$ C. (preferably $-20°$ C. to $30°$ C.), the assistant chemical treating agent solution (containing a predetermined amount of the assistant chemical treating agent) is metering (preferably dropwise) into the composite carrier or modified carrier to be pre-treated with said assistant chemical treating agent, or the composite carrier or modified carrier is metering into the assistant chemical treating agent solution, so as to form a reaction mixture. Then, the reaction continues (facilitated by any stirring means, if necessary) for 1 to 8 hours, preferably 2 to 6 hours, more preferably 3 to 4 hours. Then, the thus obtained product is separated from the reaction mixture by filtrating, washing (for 1 to 6 times, preferably 1 to 3 times) and optional drying. Or alternatively, the thus obtained product is directly used in the next step (i.e. the aforesaid chemical treating step) in the form of the reaction mixture without being subject to the separation beforehand. In this case, the reaction mixture contains a certain amount of solvent, and for this reason, the amount of the solvent involved in said next step could be reduced accordingly.

According to this invention, as the amount of the assistant chemical treating agent to be used, it is preferably that the ratio by molar of the magnesium compound (based on Mg, on a solid basis) to the assistant chemical treating agent (based on Al) is 1:0-1.0, preferably 1:0-0.5, more preferably 1:0.1-0.5.

It is known that any of the aforementioned processes and steps is preferably carried out under a substantial water-free and oxygen-free condition. By substantial water-free and oxygen-free condition, it means that water and oxygen in the system concerned is continuously controlled to be less than 10 ppm. Further, the support nonmetallocene catalyst according to this invention, after prepared, is usually stored under a sealed condition under a slightly positive pressure before use.

According to this invention, as the amount of the nonmetallocene ligand to be used, it is preferably that the ratio by molar of the magnesium compound (based on Mg, on a solid basis) to the nonmetallocene ligand is 1:0.0001-1, preferably 1:0.0002-0.4, more preferably 1:0.0008-0.2, more preferably 1:0.001-0.1.

According to this invention, as the amount of the solvent for dissolving the magnesium compound to be used, it is preferably that the ratio of the magnesium compound (on a solid basis) to the solvent is 1 mol:75~400 ml, preferably 1 mol:150~300 ml, more preferably 1 mol:200~250 ml.

According to this invention, as the amount of the chemical treating agent to be used, it is preferably that the ratio by molar of the magnesium compound (based on Mg, on a solid basis) to the chemical treating agent (based on the Group IVB metal, for example Ti) is 1:0.01-1, preferably 1:0.01-0.50, more preferably 1:0.10-0.30.

According to this invention, as the amount of the assistant chemical treating agent to be used, it is preferably that the ratio by molar of the magnesium compound (based on Mg, on a solid basis) to the assistant chemical treating agent (based on Al) is 1:0-1.0, preferably 1:0-0.5, more preferably 1:0.1-0.5.

According to this invention, as the amount of the alcohol to be used in combination with the solvent for dissolving the magnesium compound, it is preferably that the ratio by molar of the magnesium compound (based on Mg and on a solid basis) to the alcohol is 1:0.02~4.00, preferably 1:0.05~3.00, more preferably 1:0.10~2.50.

According to this invention, as the amount of the precipitating agent to be used, it is preferably that the ratio by volume of the precipitating agent to the solvent for dissolving the magnesium compound is 1:0.2~5, preferably 1:0.5~2, more preferably 1:0.8~1.5.

According to this invention, as the amount of the porous carrier to be used, it is preferably that the ratio by weight of the magnesium compound (on a solid basis) to the porous carrier is 1:0.1-20, preferably 1:0.5-10, more preferably 1:1-5.

In one embodiment, this invention relates to a supported nonmetallocene catalyst produced in line with the process according to any of the first to fourth embodiments of this invention, also referred to as a supported nonmetallocene catalyst for olefin polymerization.

In a further embodiment according to this invention, this invention relates to an olefin homopolymerization/copolymerization process, wherein the supported nonmetallocene catalyst of this invention is used as the catalyst for olefin polymerization, to homopolymerize or copolymerize olefin(s).

In the context of the olefin homopolymerization/copolymerization process of this invention, one can directly refer to the prior art for any content or information that has not been expressively and specifically described hereinafter, for example, the reactor for polymerization, the amount of olefin(s), the way by which the catalyst or olefin is introduced, unnecessiating the need of detailing same further herein.

According to the present olefin homopolymerization/copolymerization process, the supported nonmetallocene catalyst of this invention is used as the main catalyst, one or more selected from the group consisting of an aluminoxane, an alkylaluminum, a halogenated alkyl aluminum, a fluoroborane, an alkylboron and an alkylboron ammonium salt is used as the co-catalyst, to homopolymerize or copolymerize olefin.

As the way of adding the main catalyst and the co-catalyst to the polymerization system, exemplified is a way wherein the main catalyst is added prior to the co-catalyst, or vise versa, or the main catalyst and the co-catalyst contact with each other by mixing and then added altogether, or separately but simultaneously added. As the way of adding the main catalyst and the co-catalyst separately, exemplified is the case wherein the main catalyst and the co-catalyst are successively added to one feed line or multiple feed lines. When the main catalyst and the co-catalyst are to be added separately but simultaneously, multiple feed lines are required. For a continuous polymerization, the way of simultaneously and continuously adding to multiple feed lines is preferred, while for a batch polymerization, the way of mixing the main catalyst and the co-catalyst with each other and then adding to one feed line altogether, or adding to a feed line the co-catalyst and then adding the main catalyst to the same feed line, is preferred.

There is no limitation as to how to conduct the olefin homopolymerization/copolymerization, any conventional process known to a person skilled in the art can be used, for example, a slurry process, an emulsion process, a solution process, a bulk process or a gas phase process, preferably the slurry process or the gas phase process.

According to this invention, as the olefin to be used, exemplified is a $C_2$ to $C_{10}$ mono-olefin, a diolefin, a cyclic olefin and other ethylenic unsaturated compounds.

Specifically, as the $C_2$ to $C_{10}$ mono-olefin, exemplified is ethylene, propylene, 1-butene, 1-hexene, 1-heptene, 4-methyl-1-pentene, 1-octene, 1-decene, 1-undecene, 1-dodecene and styrene. As the cyclic olefin, exemplified is 1-cyclopentene and norbornene. As the diolefin, exemplified is 1,4-butadiene, 2,5-pentadiene, 1,6-hexadiene, norbornadiene and 1,7-octadiene. As the other ethylenic unsaturated compound, exemplified is vinyl acetate, and (meth)acrylate. This invention prefers the homopolymerization of ethylene, or the copolymerization of ethylene with propylene, 1-butene or 1-hexene.

According to this invention, by homopolymerization, it refers to the polymerization of a single kind of olefin, by copolymerization, it refers to the polymerization between two or more of the aforesaid olefins.

According to this invention, the co-catalyst is selected from the group consisting of an aluminoxane, an alkylaluminum, a halogenated alkyl aluminum, a fluoroborane, an alkylboron and an alkylboron ammonium salt, such as the aluminoxane and the alkylaluminum.

As the aluminoxane, exemplified is a linear aluminoxane $((R)(R)Al—(Al(R)—O)_n—O—Al(R)(R))$ having the following formula (I-1), and a cyclic aluminoxane $(—(Al(R)—O—)_{n+2}—)$ having the following formula (II-1).

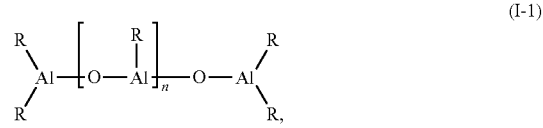

(I-1)

(II-1)

wherein the Rs are identical to or different from one another, preferably identical to one another, and each independently is selected from the group consisting of a $C_1$-$C_8$ alkyl, preferably methyl, ethyl, and iso-butyl, most preferably methyl, n is an integer of 1 to 50, preferably of 10 to 30.

Specifically, the aluminoxane could be preferably selected from the group consisting of methyl aluminoxane, ethyl aluminoxane, isobutyl aluminoxane and n-butyl aluminoxane, preferably methyl aluminoxane (MAO) and isobutyl aluminoxane (IBAO), most preferably methyl aluminoxane (MAO).

The aluminoxane could be used with one kind or as a mixture of two or more kinds at any ratio therebetween.

As the alkylaluminum, exemplified is a compound having a general formula (III-1) as follows:

$$Al(R)_3 \qquad (III-1)$$

wherein the Rs are identical to or different from one another, preferably identical to one another, and is each independently selected from the group consisting of a $C_1$-$C_8$ alkyl, preferably methyl, ethyl and iso-butyl, most preferably methyl.

Specifically, the alkylaluminum could be selected from the group consisting of trimethyl aluminum ($Al(CH_3)_3$), triethyl aluminum ($Al(CH_3CH_2)_3$), tripropyl aluminum ($Al(C_3H_7)_3$), triisobutyl aluminum ($Al(i$-$C_4H_9)_3$), tri-n-butyl aluminum ($Al(C_4H_9)_3$), triisoamyl aluminum ($Al(i$-$C_5H_{11})_3$), tri-n-amyl aluminum ($Al(C_5H_{11})_3$), tri-hexyl aluminum ($Al(C_8H_{13})_3$), tri-iso-hexyl aluminum ($Al(i$-$C_8H_{13})_3$), diethyl methyl aluminum ($Al(CH_3)(CH_3CH_2)_2$) and ethyl dimethyl aluminum ($Al(CH_3CH_2)(CH_3)_2$), and the like, wherein preference is given to trimethyl aluminum, triethyl aluminum, triisobutyl aluminum and tripropyl aluminum, more preferably triethyl aluminum and triisobutyl aluminum, most preferably triethyl aluminum.

The alkylaluminum could be used with one kind or as a mixture of two or more kinds at any ratio therebetween.

As the halogenated alkyl aluminum, the fluoroborane, the alkylboron and the alkylboron ammonium salt, exemplified is one conventionally used in this field, but without any limitation thereto.

Further, according to this invention, the co-catalyst could be used with one kind or as a mixture of two or more kinds of the aforesaid co-catalysts at any ratio therebetween as needed, but without any limitation thereto.

According to this invention, depending on how the olefin homopolymerization/copolymerization is conducted, a solvent for polymerization may be involved.

As the solvent for polymerization, one conventionally used in this field for olefin homopolymerization/copolymerization can be used, but without any limitation thereto.

As the solvent for polymerization, exemplified is a $C_{4-10}$ alkane (for example, butane, pentane, hexane, heptane, octane, nonane, or decane), a halogenated $C_{1-10}$ alkane (for example, dichloro methane), an aromatic hydrocarbon based solvent (for example toluene or xylene), and so on. Hexane is preferred for this purpose.

The solvent for polymerization could be used with one kind or as a mixture of two or more kinds at any ratio therebetween.

According to this invention, the polymerization pressure under which the olefin homopolymerization/copolymerization is conducted is generally between 0.1 to 10 MPa, preferably 0.1 to 4 MPa, most preferably 1 to 3 MPa, but without any limitation thereto. According to this invention, the polymerization temperature at which the olefin homopolymerization/copolymerization is conducted is generally from −40° C. to 200° C., preferably 10° C. to 100° C., more preferably 40° C. to 90° C., but without any limitation thereto.

Further, according to this invention, the olefin homopolymerization/copolymerization can be conduct in the presence of or in the absence of hydrogen gas. If presents, the partial pressure of hydrogen gas may generally account for 0.01 to 99% (preferably 0.01 to 50%) of the polymerization pressure, but without any limitation thereto.

According to the olefin homopolymerization/copolymerization process of this invention, the ratio by molar of the co-catalyst (based on Al or B) to the supported nonmetallocene catalyst (based on the central metal atom M) is generally 1 to 1000:1, preferably 10 to 500:1, more preferably 15 to 300:1, but without any limitation thereto.

Example

The present invention is further illustrated by using the following examples, not limiting to same.

The bulk density of the polymer was measured according to the Chinese Standard GB 1636-79 (unit: g/cm$^3$).

The content of the Group IVB metal (for example Ti) and the content of the Mg element in the supported nonmetallocene catalyst were determined by the ICP-AES method, while the content of the nonmetallocene ligand was determined by the element analysis method.

The polymerization activity of the catalyst was calculated as follows.

Upon completion of the polymerization, the polymer product in the reactor was filtered and dried, and then weighed for its weight (by mass). Then, the polymerization activity of the catalyst was expressed by a value obtained by dividing the weight of the polymer product by the weight (by mass) of the supported nonmetallocene catalyst used (unit: kg polymer per 1 g Cat).

The molecular weights Mw, Mn and the molecular weight distribution (Mw/Mn) of the polymer were determined at a temperature of 150° C. by using the GPC V2000 type gel permeation chromatographer (from WATERS Co., USA), with o-trichlorobenzene as the solvent.

The viscosity averaged molecular weight of the polymer was calculated as follows.

The intrinsic viscosity of the polymer was determined according to the standard ASTM D4020-00 by using a high temperature dilution type Ubbelohde viscometer (with a capillary inner diameter of 0.44 mm, a thermostatic bath media of 300# silicon oil, the solvent for dilution of decalin and a temperature of 135° C.), and then the viscosity averaged molecular weight Mv of the polymer was calculated in line with the following formula.

$$Mv = 5.37 \times 10^4 \times [\eta]^{1.37}$$

wherein, $\eta$ is the intrinsic viscosity.

Example I

Corresponding to the First Embodiment

Example I-1

2.5 g of anhydrous magnesium chloride as the magnesium compound was weighted, a predetermined amount of butanol and hexane were added thereto, after heated to 60° C. to dissolve same, a predetermined amount of the nonmetallocene ligand was added thereto and then stirred at 60° C. to completely dissolve same. Then, the resultant was directly vacuum dried at 60° C., to obtain the modified carrier.

Then, to the modified carrier, 25 ml hexane as the solvent was added, and then titanium tetrachloride as the chemical treating agent was dropwise added thereto under stirring over a period of 15 minutes. The reaction continued at 30° C. for 4 hours, then filtered, washed with hexane for 3 times (25 ml each time), and finally vacuum dried to obtain the supported nonmetallocene catalyst.

A compound represented by

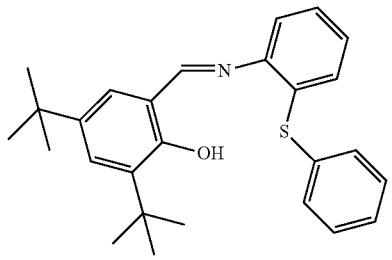 [SMILES: CC(C)(C)c1cc(/C=N/c2ccccc2Sc2ccccc2)c(O)c(C(C)(C)C)c1]

was used as the nonmetallocene ligand.

In this example, the ratio by molar of the magnesium compound to butanol was 1:0.5, the ratio of the magnesium compound to hexane as the solvent for dissolving the magnesium compound was 1 mol:200 ml, the ratio by molar of the magnesium compound to the nonmetallocene ligand was 1:0.004, and the ratio by molar of the magnesium compound to titanium tetrachloride was 1:0.2.

The thus obtained supported nonmetallocene catalyst was named as CAT-I-1.

Example I-1-1

Substantially the same as the Example I-1, except for the following changes:

The solvent for dissolving the magnesium compound was changed to tetrahydrofuran.

In this example, the ratio by molar of the magnesium compound to butanol was 1:0.5, the ratio of the magnesium compound to the solvent for dissolving the magnesium compound was 1 mol:240 ml, the ratio by molar of the magnesium compound to the nonmetallocene ligand was 1:0.006, and the ratio by molar of the magnesium compound to the chemical treating agent was 1:0.25.

The thus obtained supported nonmetallocene catalyst was named as CAT-I-1-1.

Example I-1-2

Substantially the same as the Example I-1, except for the following changes:

The alcohol was changed to ethanol, the solvent for dissolving the magnesium compound was changed to ethyl benzene.

In this example, the ratio by molar of the magnesium compound to the alcohol was 1:1.64, the ratio of the magnesium compound to the solvent for dissolving the magnesium compound was 1 mol:160 ml, the ratio by molar of the magnesium compound to the nonmetallocene ligand was 1:0.004, and the ratio by molar of the magnesium compound to the chemical treating agent was 1:0.4.

The thus obtained supported nonmetallocene catalyst was named as CAT-I-1-2.

Example I-1-3

Substantially the same as the Example I-1, except for the following changes:

The alcohol was changed to propanol, the magnesium compound was changed to magnesium bromide (MgBr$_2$), the nonmetallocene ligand was changed to

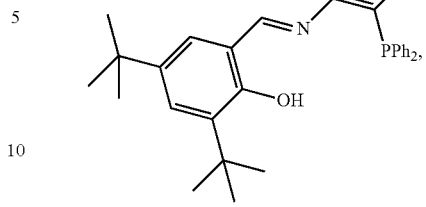

the solvent for dissolving the magnesium compound was changed to toluene, and the chemical treating agent was changed to zirconium tetrachloride (ZrCl$_4$).

The modified carrier was obtained by directly drying under a N$_2$ atmosphere at 120° C.

The chemical treating agent was dissolved in 25 ml toluene, and then the resultant solution was dropwise added to the modified carrier over a period of 15 minutes. Washing was conducted with toluene for 3 times (25 ml each time), and then heated to 120° C. and vacuum dried In this example, the ratio by molar of the magnesium compound to the alcohol was 1:1, the ratio of the magnesium compound to the solvent for dissolving the magnesium compound was 1 mol:100 ml, the ratio by molar of the magnesium compound to the nonmetallocene ligand was 1:0.003, and the ratio by molar of the magnesium compound to the chemical treating agent was 1:0.5.

The thus obtained supported nonmetallocene catalyst was named as CAT-I-1-3.

Example I-1-4

Substantially the same as the Example I-1, except for the following changes:

The alcohol was changed to iso-octanol, the magnesium compound was changed to ethoxy magnesium chloride (MgCl(OC$_2$H$_5$)), the nonmetallocene ligand was changed to

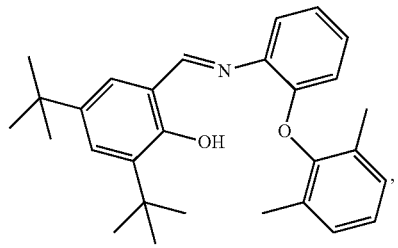 [SMILES: Cc1cccc(C)c1Oc1ccccc1/N=C/c1cc(C(C)(C)C)cc(C(C)(C)C)c1O]

the solvent for dissolving the magnesium compound was changed to chloro cyclohexane, and the chemical treating agent was changed to tetraethyl titanium (Ti(CH$_3$CH$_2$)$_4$).

The modified carrier was obtained by directly drying under a N$_2$ atmosphere at 80° C.

In this example, the ratio by molar of the magnesium compound to the alcohol was 1:0.1, the ratio of the magnesium compound to the solvent for dissolving the magnesium compound was 1 mol:300 ml, the ratio by molar of the magnesium compound to the nonmetallocene ligand was 1:0.010, and the ratio by molar of the magnesium compound to the chemical treating agent was 1:0.15.

The thus obtained supported nonmetallocene catalyst was named as CAT-I-1-4.

Example I-1-5

Substantially the same as the Example I-1, except for the following changes:

The magnesium compound was changed to ethyl magnesium (Mg(C$_2$H$_5$)$_2$), the nonmetallocene ligand was changed to

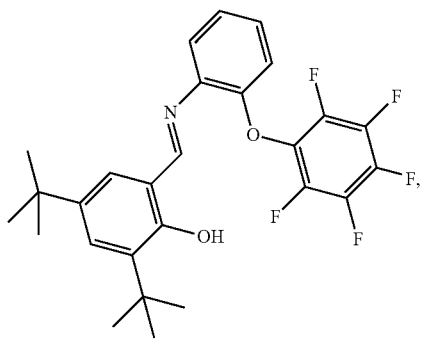 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, and the chemical treating agent was changed to triisobutyl chloro titanium (TiCl(i-C$_4$H$_9$)$_3$).

In this example, the ratio by molar of the magnesium compound to the alcohol was 1:2.5, the ratio by molar of the magnesium compound to the nonmetallocene ligand was 1:0.16.

Example I-1-6

Substantially the same as the Example I-1, except for the following changes:

The magnesium compound was changed to ethoxy magnesium (Mg(OC$_2$H$_5$)$_2$), the nonmetallocene ligand was changed to

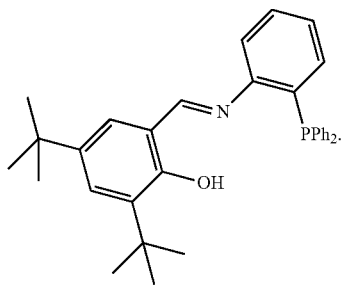

Example I-1-7

Substantially the same as the Example I-1, except for the following changes:

The magnesium compound was changed to isobutyl magnesium (Mg(i-C$_4$H$_9$)$_2$), the nonmetallocene ligand was changed to

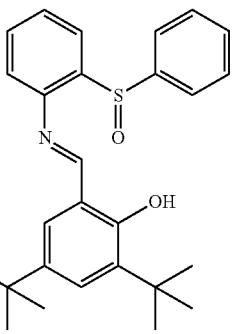

Example I-1-8

Substantially the same as the Example I-1, except for the following changes:

The nonmetallocene ligand was changed to

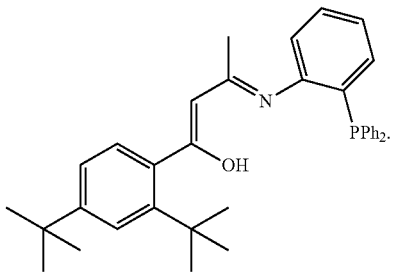

Example I-2

2.5 g of anhydrous magnesium chloride as the magnesium compound was weighted, a predetermined amount of butanol and hexane were added thereto, after heated to 60° C. to dissolve same, a predetermined amount of the nonmetallocene ligand was added thereto and then stirred at 60° C. to completely dissolve same. Then, the resultant was directly vacuum dried at 60° C., to obtain the modified carrier.

Then, to the modified carrier, 25 ml hexane was added, and then triethyl aluminum as the assistant chemical treating agent was dropwise added thereto under stirring over a period of 15 minutes. The reaction continued under stirring for 1 hour, then filtered, washed with hexane for 2 times (25 ml each time). Then, 25 ml hexane was added thereto, and then titanium tetrachloride as the chemical treating agent was dropwise added thereto over a period of 15 minutes. The reaction continued at 60° C. for 4 hours, then filtered, washed with hexane for 3 times (25 ml each time), and finally vacuum dried to obtain the supported nonmetallocene catalyst.

A compound represented by

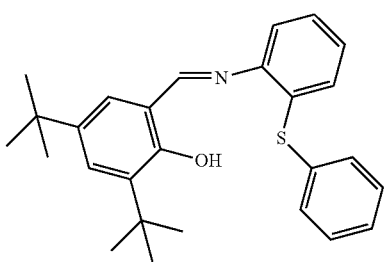 [SMILES: CC(C)(C)c1cc(/C=N/c2ccccc2Sc2ccccc2)c(O)c(C(C)(C)C)c1]

was used as the nonmetallocene ligand.

In this example, the ratio by molar of the magnesium compound to butanol was 1:0.5, the ratio of the magnesium compound to the solvent for dissolving the magnesium compound was 1 mol:200 ml, the ratio by molar of the magnesium compound to the nonmetallocene ligand was 1:0.004, the ratio by molar of the magnesium compound to titanium tetrachloride was 1:0.2, and the ratio by molar of the magnesium compound to the assistant chemical treating agent was 1:0.35.

The thus obtained supported nonmetallocene catalyst was named as CAT-I-2.

Example I-2-1

Substantially the same as the Example I-2, except for the following changes:

The solvent for dissolving the magnesium compound was changed to tetrahydrofuran.

In this example, the ratio by molar of the magnesium compound to butanol was 1:0.5, the ratio of the magnesium compound to the solvent for dissolving the magnesium compound was 1 mol:240 ml, the ratio by molar of the magnesium compound to the nonmetallocene ligand was 1:0.006, and the ratio by molar of the magnesium compound to the chemical treating agent was 1:0.25, and the ratio by molar of the magnesium compound to the assistant chemical treating agent was 1:0.25.

The thus obtained supported nonmetallocene catalyst was named as CAT-I-2-1.

Example I-2-2

Substantially the same as the Example I-2, except for the following changes:

The alcohol was changed to ethanol, the solvent for dissolving the magnesium compound was changed to ethyl benzene, the assistant chemical treating agent was changed to methyl aluminoxane (MAO).

In this example, the ratio by molar of the magnesium compound to the alcohol was 1:1.64, the ratio of the magnesium compound to the solvent for dissolving the magnesium compound was 1 mol:160 ml, the ratio by molar of the magnesium compound to the nonmetallocene ligand was 1:0.004, and the ratio by molar of the magnesium compound to the chemical treating agent was 1:0.4, and the ratio by molar of the magnesium compound to the assistant chemical treating agent was 1:0.5.

The thus obtained supported nonmetallocene catalyst was named as CAT-I-2-2.

Example I-2-3

Substantially the same as the Example I-2, except for the following changes:

The alcohol was changed to propanol, the magnesium compound was changed to magnesium bromide (MgBr$_2$), the nonmetallocene ligand was changed to

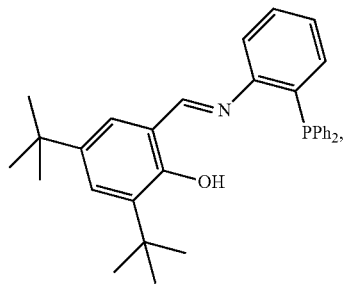

the solvent for dissolving the magnesium compound was changed to toluene, the chemical treating agent was changed to zirconium tetrachloride (ZrCl$_4$), the assistant chemical treating agent was changed to triisobutyl aluminum.

The modified carrier was obtained by directly drying under a N$_2$ atmosphere at 120° C.

The chemical treating agent was dissolved in 25 ml toluene, and then the resultant solution was dropwise added to the modified carrier over a period of 15 minutes. Washing was conducted with toluene for 3 times (25 ml each time), and then heated to 120° C. and vacuum dried In this example, the ratio by molar of the magnesium compound to the alcohol was 1:1, the ratio of the magnesium compound to the solvent for dissolving the magnesium compound was 1 mol:100 ml, the ratio by molar of the magnesium compound to the nonmetallocene ligand was 1:0.003, and the ratio by molar of the magnesium compound to the chemical treating agent was 1:0.5, and the ratio by molar of the magnesium compound to the assistant chemical treating agent was 1:0.75.

The thus obtained supported nonmetallocene catalyst was named as CAT-I-2-3.

Example I-2-4

Substantially the same as the Example I-2, except for the following changes:

The alcohol was changed to iso-octanol, the magnesium compound was changed to ethoxy magnesium chloride (MgCl(OC$_2$H$_5$)), the nonmetallocene ligand was changed to

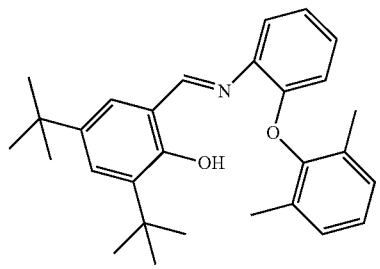

the solvent for dissolving the magnesium compound was changed to chloro cyclohexane, the chemical treating agent was changed to tetraethyl titanium (Ti(CH$_3$CH$_2$)$_4$), the assistant chemical treating agent was changed to isobutyl aluminoxane.

The modified carrier was obtained by directly drying under a N$_2$ atmosphere at 80° C.

In this example, the ratio by molar of the magnesium compound to the alcohol was 1:0.1, the ratio of the magnesium compound to the solvent for dissolving the magnesium compound was 1 mol:300 ml, the ratio by molar of the magnesium compound to the nonmetallocene ligand was 1:0.010, the ratio by molar of the magnesium compound to the chemical treating agent was 1:0.15, and the ratio by molar of the magnesium compound to the assistant chemical treating agent was 1:1.0.

The thus obtained supported nonmetallocene catalyst was named as CAT-I-2-4.

Example I-2-5

Substantially the same as the Example I-2, except for the following changes:

The magnesium compound was changed to ethyl magnesium ($Mg(C_2H_5)_2$), the nonmetallocene ligand was changed to

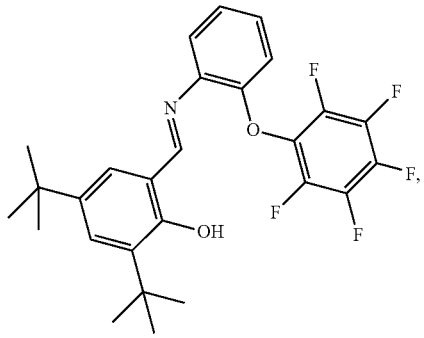 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, the chemical treating agent was changed to triisobutyl chloro titanium ($TiCl(i-C_4H_9)_3$), the assistant chemical treating agent was changed to ethyl aluminoxane.

In this example, the ratio by molar of the magnesium compound to the alcohol was 1:2.5, the ratio by molar of the magnesium compound to the nonmetallocene ligand was 1:0.16.

Example I-2-6

Substantially the same as the Example I-2, except for the following changes:

The magnesium compound was changed to ethoxy magnesium ($Mg(OC_2H_5)_2$), the nonmetallocene ligand was changed to

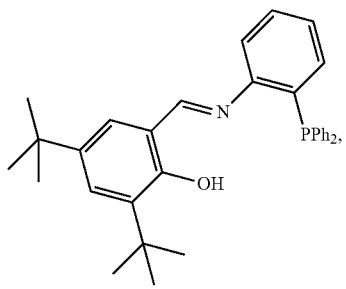

the assistant chemical treating agent was changed to trimethyl aluminum.

Example I-2-7

Substantially the same as the Example I-2, except for the following changes:

The magnesium compound was changed to isobutyl magnesium ($Mg(i-C_4H_9)_2$), the nonmetallocene ligand was changed to

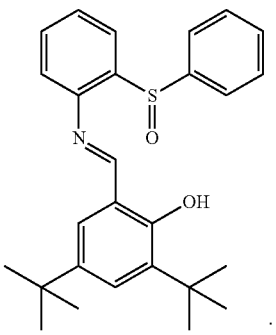 [SMILES: CC(C)(C)c1cc(/C=N/c2ccccc2S(=O)c2ccccc2)c(O)c(C(C)(C)C)c1]

Example I-2-8

Substantially the same as the Example I-2, except for the following changes:

The nonmetallocene ligand was changed to

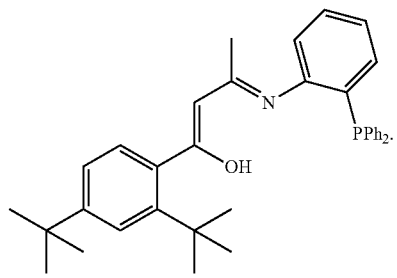

Example I-3

Application Example I 10 mg of the catalysts CAT-I-1, CAT-I-2, CAT-I-1-1 to CAT-I-1-4, CAT-I-2-1 to CAT-I-2-4 were respectively weighted, and added to an autoclave (5 L) together with a co-catalyst (methyl aluminoxane or triethyl aluminum), then 2.5 L hexane was added thereto, and the stirring means (at 300 rpm) was started. After heated to 85° C., hydrogen gas was supplied thereto all at once till 0.2 MPa, and finally ethylene was continuously supplied thereto to keep the total pressure in the autoclave constant at 0.8 MPa. After reacted for 2 hours, the inside of the autoclave was vented to the atmosphere, and the resultant polymer product was discharged from the autoclave, and weighed for its weight (by mass) after drying. The particulars of the polymerization reaction was listed in the following Table I-1.

Example I-3-1

Substantially the same as the Example I-3, except for the following changes:

The reaction temperature was kept at 70° C., in the absence of hydrogen gas, and the total pressure in the autoclave was kept at 0.5 MPa. The particulars of the polymerization reaction was listed in the following Table I-1.

Example I-3-2

Substantially the same as the Example I-3, except for the following changes:

2 minutes after continuously supplying ethylene, 60 g hexene-1 was added all at once. The particulars of the polymerization reaction was listed in the following Table I-1.

Reference Example I-1-1

Substantially the same as the Example I-1, except for the following changes:

The ratio by molar of the magnesium compound to the nonmetallocene ligand was changed to 1:0.008.

The thus obtained catalyst was named as CAT-I-A.

The polymerization was conducted in line with the Example I-3-2.

Reference Example I-1-2

Substantially the same as the Example I-1, except for the following changes:

The ratio by molar of the magnesium compound to the nonmetallocene ligand was changed to 1:0.002.

The thus obtained catalyst was named as CAT-I-B.

The polymerization was conducted in line with the Example I-3-2.

The particulars of the polymerization reaction was listed in the following Table I-1.

Reference Example I-1-3

Substantially the same as the Example I-1, except for the following changes:

No nonmetallocene ligand was used.

The thus obtained catalyst was named as CAT-I-C.

The polymerization was conducted in line with the Example I-3-1 and the Example I-3-2 respectively.

The particulars of the polymerization reaction was listed in the following Table I-1.

Reference Example I-1-4

Substantially the same as the Example I-1, except for the following changes:

The modified carrier was not treated by titanium tetrachloride.

The thus obtained catalyst was named as CAT-I-D.

The polymerization was conducted in line with the Example I-3-1 and the Example I-3-2 respectively.

The particulars of the polymerization reaction was listed in the following Table I-1.

TABLE I-1

The results of the olefin polymerization obtained with the supported nonmetallocene catalysts

| Experiment No. | Catalyst No. | Co-catalyst | $H_2$ pressure (MPa) | comonomer | Poly activity (kgPE/gCat) | Bulk density (g/cm$^3$) | Content of comonomer (mol %) | Mv ($10^4$ g/mol) | Molecular weight distribution (Mw/Mn) |
|---|---|---|---|---|---|---|---|---|---|
| 1 | CAT-I-1 | triethylaluminum | 0.2 | — | 74.4 | 0.337 | — | — | 3.23 |
| 2 | CAT-I-1 | triethylaluminum | 0 | — | 111.0 | 0.328 | — | 323 | |
| 3 | CAT-I-1 | triethylaluminum | 0.2 | 1-hexene | 87.7 | 0.341 | 0.67 | — | 3.34 |
| 4 | CAT-I-1 | methylaluminoxane | 0.2 | 1-hexene | 101.3 | 0.350 | 1.07 | — | 2.87 |
| 5 | CAT-I-1-1 | triethylaluminum | 0.2 | — | 37.6 | 0.323 | — | — | |
| 6 | CAT-I-1-2 | triethylaluminum | 0.2 | — | 91.1 | 0.302 | — | — | |
| 7 | CAT-I-1-3 | triethylaluminum | 0.2 | — | 63.8 | 0.297 | — | — | |
| 8 | CAT-I-1-4 | triethylaluminum | 0.2 | — | 40.6 | 0.284 | — | — | |
| 9 | CAT-I-2 | triethylaluminum | 0.2 | — | 58.5 | 0.304 | — | — | 3.11 |
| 10 | CAT-I-2 | triethylaluminum | 0 | — | 123.7 | 0.319 | — | 436 | |
| 11 | CAT-I-2 | triethylaluminum | 0.2 | 1-hexene | 79.2 | 0.325 | 0.83 | — | 3.28 |
| 12 | CAT-I-2 | methylaluminoxane | 0.2 | 1-hexene | 94.4 | 0.344 | 1.22 | — | 2.69 |
| 13 | CAT-I-2-1 | triethylaluminum | 0.2 | — | 35.6 | 0.300 | — | — | |
| 14 | CAT-I-2-2 | triethylaluminum | 0.2 | — | 95.4 | 0.293 | — | — | |
| 15 | CAT-I-2-3 | triethylaluminum | 0.2 | — | 76.0 | 0.280 | — | — | |
| 16 | CAT-I-2-4 | triethylaluminum | 0.2 | — | 47.2 | 0.275 | — | — | |
| 17 | CAT-I-A | methylaluminoxane | 0.2 | 1-hexene | 127.4 | 0.356 | 1.24 | — | 2.62 |
| 18 | CAT-I-B | methylaluminoxane | 0.2 | 1-hexene | 86.7 | 0.335 | 0.86 | — | 2.93 |
| 19 | CAT-I-C | triethylaluminum | 0 | — | 4.42 | 0.283 | — | 184 | |
| 20 | CAT-I-C | methylaluminoxane | 0.2 | 1-hexene | 52.5 | 0.252 | 0.57 | — | 4.74 |
| 21 | CAT-I-D | triethylaluminum | 0 | — | no activity | — | — | — | — |

Upon comparison of the results of the experiment No. 1 and those of the experiment No. 3, the results of the experiment No. 9 and those of the experiment No. 11, in the Table I-1, it is clear that the present catalyst shows a significant comonomer effect, i.e. the activity in copolymerization is significantly higher than that in homopolymerization. Further, by the copolymerization, the bulk density of the polymer can be increased, i.e. the polymer morphology can be improved. However, there is limited influence on the molecular weight distribution of the polymer.

Upon comparison of the results of the experiment No. 3 and those of the experiment No. 4, the results of the experiment No. 11 and those of the experiment No. 12, it is clear that the activity of the catalyst in copolymerization and the content of the comonomer can be further increased, and the bulk density of the polymer can be further improved, by using MAO as the co-catalyst.

Upon comparison of the results of the experiment Nos. 4, 17 and 18 in the Table I-1, it is clear that by increasing or reducing the ratio by molar of the nonmetallocene ligand to the magnesium compound, the activity in ethylene polymerization of the catalyst and the content of the comonomer in the polymer can be increased or decreased, and the molecular weight distribution of the polymer can be somewhat broadened or narrowed.

Upon comparison of the results of the experiment No. 2 and those of the experiment No. 19 in the Table I-1, it is clear that if the polymerization was conducted in the absence of hydrogen gas, the catalyst CAT-C which contains no nonmetallocene ligand is inferior to the catalyst CAT-1 which contains a nonmetallocene ligand in polymerization activity, bulk density and molecular weight.

Upon comparison of the results of the experiment Nos. 1 to 8 and those of the experiment Nos. 9 to 16 in the Table I-1, it is clear that the supported nonmetallocene catalyst obtained by a process wherein the modified carrier was firstly subject to the treatment with an assistant chemical treating agent and then to that with a chemical treating agent shows increased activity and polymer bulk density, somewhat increased comonomer content, narrowed polymer molecular weight distribution, as compared with the supported nonmetallocene catalyst obtained by a process wherein the modified carrier is subject only to the treatment with a chemical treating agent.

As can be seen from these facts, in the process according to this invention, the ligand shows a function of improving catalyst activity, polymer bulk density, and copolymerization performance, and in the polymerization involving no hydrogen gas, of increasing the molecular weight of the polymer. Therefore, it is possible to freely adjust the polymerization activity and the copolymerization performance of the resultant supported nonmetallocene catalyst and the molecular weight distribution of the polymer resulted from the polymerization by altering the amount of the nonmetallocene ligand to be used.

As can be seen from the results of the experiment No. 21 in the Table I-1, it is clear that the catalyst containing merely the nonmetallocene ligand shows no polymerization activity, and will be given same after reacting with the Group IVB metal compound.

Example II

Corresponding to the Second Embodiment

Example II-1

2.5 g of anhydrous magnesium chloride as the magnesium compound was weighted, a predetermined amount of butanol and tetrahydrofuran were added thereto, after heated to 60° C. to dissolve same, a predetermined amount of the nonmetallocene ligand was added thereto and then stirred at 60° C. to completely dissolve same. After stirring for 2 hours, hexane (as the precipitating agent) was added thereto to precipitate same. The resultant solid was then filtered, washed by a solvent for washing (which is the same as the precipitating agent) for 2 times (by using the same amount as that of the precipitating agent each time) and then uniformly heated to 90° C. and vacuum dried, to obtain the modified carrier.

Then, to the modified carrier, 25 ml hexane as the solvent was added, and then titanium tetrachloride as the chemical treating agent was dropwise added thereto under stirring over a period of 15 minutes. The reaction continued at 30° C. for 4 hours, then filtered, washed with hexane for 3 times (25 ml each time), and finally vacuum dried to obtain the supported nonmetallocene catalyst.

The compound represented by

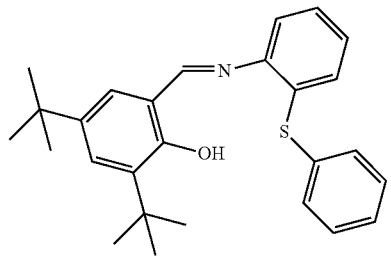 [SMILES: CC(C)(C)c1cc(/C=N/c2ccccc2Sc2ccccc2)c(O)c(C(C)(C)C)c1]

was used as the nonmetallocene ligand.

In this example, the ratio by molar of the magnesium compound to butanol was 1:0.5, the ratio of the magnesium compound to the solvent for dissolving the magnesium compound was 1 mol:200 ml, the ratio by molar of the magnesium compound to the nonmetallocene ligand was 1:0.004, the ratio by volume of the precipitating agent to the solvent for dissolving the magnesium compound was 1:1, and the ratio by molar of the magnesium compound to titanium tetrachloride was 1:0.2.

The thus obtained supported nonmetallocene catalyst was named as CAT-II-1.

Example II-1-1

Substantially the same as the Example II-1, except for the following changes:

The alcohol was changed to ethanol, the nonmetallocene ligand was changed to

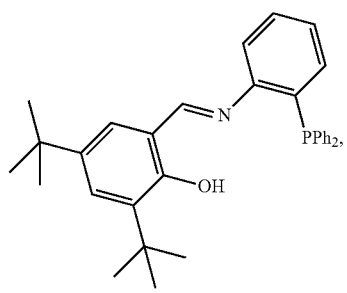

the precipitating agent was changed to cyclohexane.

In this example, the ratio by molar of the magnesium compound to the alcohol was 1:1, the ratio of the magnesium compound to the solvent for dissolving the magnesium compound was 1 mol:240 ml, the ratio by molar of the magnesium compound to the nonmetallocene ligand was 1:0.006, the ratio by volume of the precipitating agent to the solvent for dissolving the magnesium compound was 1:0.5, and the ratio by molar of the magnesium compound to the chemical treating agent was 1:0.5.

The thus obtained supported nonmetallocene catalyst was named as CAT-II-1-1.

Example II-1-2

Substantially the same as the Example II-1, except for the following changes:

The alcohol was changed to propanol, the magnesium compound was changed to magnesium bromide (MgBr$_2$), the nonmetallocene ligand was changed to

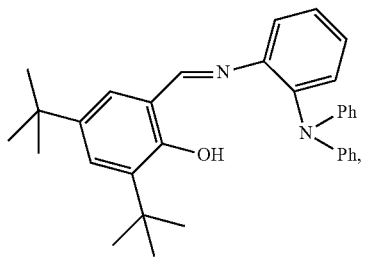 [SMILES: CC(C)(C)c1cc(/C=N/c2ccccc2N(c2ccccc2)c2ccccc2)c(O)c(C(C)(C)C)c1]

the solvent for dissolving the magnesium compound was changed to toluene, the precipitating agent was changed to cycloheptane, and the chemical treating agent was changed to zirconium tetrachloride (ZrCl$_4$).

The chemical treating agent was dissolved in 25 ml toluene, and then the resultant solution was dropwise added to the modified carrier over a period of 15 minutes. Washing was conducted with toluene for 3 times (25 ml each time), and then heated to 120° C. and vacuum dried.

In this example, the ratio by molar of the magnesium compound to the alcohol was 1:2, the ratio of the magnesium compound to the solvent for dissolving the magnesium compound was 1 mol:100 ml, the ratio by molar of the magnesium compound to the nonmetallocene ligand was 1:0.003, the ratio by volume of the precipitating agent to the solvent for dissolving the magnesium compound was 1:2, and the ratio by molar of the magnesium compound to the chemical treating agent was 1:1.

The thus obtained supported nonmetallocene catalyst was named as CAT-II-1-2.

Example II-1-3

Substantially the same as the Example II-1, except for the following changes:

The alcohol was changed to iso-octanol, the magnesium compound was changed to ethoxy magnesium chloride (MgCl(OC$_2$H$_5$)), the nonmetallocene ligand was changed to

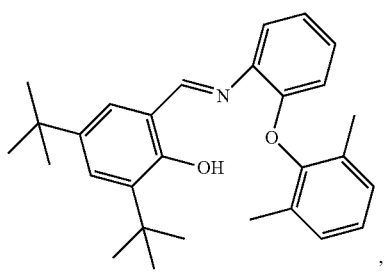 [SMILES: Cc1cccc(C)c1Oc1ccccc1/N=C/c1cc(C(C)(C)C)cc(C(C)(C)C)c1O]

the solvent for dissolving the magnesium compound was changed to ethyl benzene, the precipitating agent was changed to decane, and the chemical treating agent was changed to tetraethyl titanium (Ti(CH$_3$CH$_2$)$_4$).

In this example, the ratio by molar of the magnesium compound to the alcohol was 1:0.2, the ratio of the magnesium compound to the solvent for dissolving the magnesium compound was 1 mol:300 ml, the ratio by molar of the magnesium compound to the nonmetallocene ligand was 1:0.10, the ratio by volume of the precipitating agent to the solvent for dissolving the magnesium compound was 1:0.8, and the ratio by molar of the magnesium compound to the chemical treating agent was 1:0.15.

The thus obtained supported nonmetallocene catalyst was named as CAT-II-1-3.

Example II-1-4

Substantially the same as the Example II-1, except for the following changes:

The alcohol was changed to pentanol, the magnesium compound was changed to ethyl magnesium (Mg(C$_2$H$_5$)$_2$), the nonmetallocene ligand was changed to

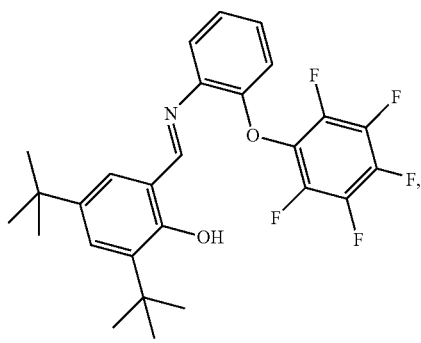 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, and the chemical treating agent was changed to triisobutyl chloro titanium (TiCl(i-C$_4$H$_9$)$_3$).

In this example, the ratio by molar of the magnesium compound to the alcohol was 1:3, the ratio of the magnesium compound to the solvent for dissolving the magnesium compound was 1 mol:350 ml, the ratio by molar of the magnesium compound to the nonmetallocene ligand was 1:0.001, the ratio by volume of the precipitating agent to the solvent for dissolving the magnesium compound was 1:0.25, and the ratio by molar of the magnesium compound to the chemical treating agent was 1:0.30.

The thus obtained supported nonmetallocene catalyst was named as CAT-II-1-4.

Example II-1-5

Substantially the same as the Example II-1, except for the following changes:

The magnesium compound was changed to ethoxy magnesium (Mg(OC$_2$H$_5$)$_2$), the nonmetallocene ligand was changed to

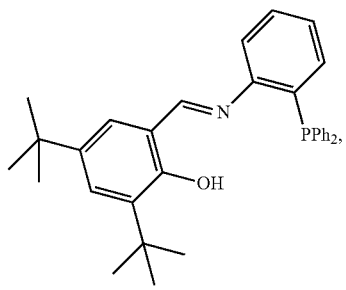

the solvent for dissolving the magnesium compound was changed to p-chloro toluene, and the chemical treating agent was changed to tetraethoxy titanium (Ti(OCH$_3$CH$_2$)$_4$).

Example II-1-6

Substantially the same as the Example II-1, except for the following changes:

The magnesium compound was changed to isobutyl magnesium (Mg(i-C$_4$H$_9$)$_2$), the nonmetallocene ligand was changed to

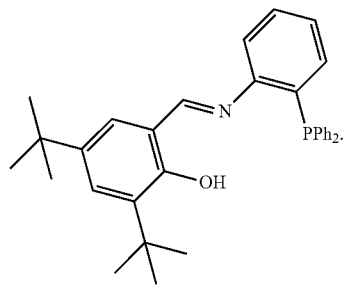

Example II-2

2.5 g of anhydrous magnesium chloride as the magnesium compound was weighted, a predetermined amount of butanol and tetrahydrofuran were added thereto, after heated to 60° C. to dissolve same, a predetermined amount of the nonmetallocene ligand was added thereto and then stirred at 60° C. to completely dissolve same. After stirring for 2 hours, hexane (as the precipitating agent) was added thereto to precipitate same. The resultant solid was then filtered, washed by a solvent for washing (which is the same as the precipitating agent) for 2 times (by using the same amount as that of the precipitating agent each time) and then uniformly heated to 90° C. and vacuum dried, to obtain the modified carrier.

Then, to the modified carrier, 25 ml hexane was added, and then triethyl aluminum as the assistant chemical treating agent was dropwise added thereto under stirring over a period of 15 minutes. The reaction continued under stirring for 1 hour, then filtered, washed with hexane for 2 times (25 ml each time). Then, 25 ml hexane was added thereto, and then titanium tetrachloride as the chemical treating agent was dropwise added thereto over a period of 15 minutes. The reaction continued at 60° C. for 4 hours, then filtered, washed with hexane for 3 times (25 ml each time), and finally vacuum dried to obtain the supported nonmetallocene catalyst.

The compound represented by

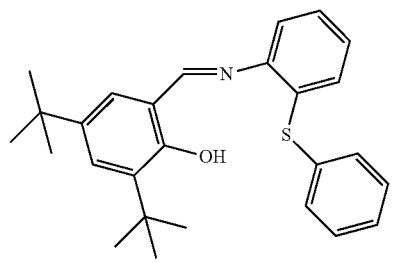 [SMILES: CC(C)(C)c1cc(/C=N/c2ccccc2Sc2ccccc2)c(O)c(C(C)(C)C)c1]

was used as the nonmetallocene ligand.

In this example, the ratio by molar of the magnesium compound to butanol was 1:0.5, the ratio of the magnesium compound to the solvent for dissolving the magnesium compound was 1 mol:200 ml, the ratio by molar of the magnesium compound to the nonmetallocene ligand was 1:0.004, the ratio by volume of the precipitating agent to the solvent for dissolving the magnesium compound was 1:1, the ratio by molar of the magnesium compound to the assistant chemical treating agent was 1:0.35, and the ratio by molar of the magnesium compound to titanium tetrachloride was 1:0.2.

The thus obtained supported nonmetallocene catalyst was named as CAT-II-2.

Example II-2-1

Substantially the same as the Example II-2, except for the following changes:

The alcohol was changed to ethanol, the nonmetallocene ligand was changed to

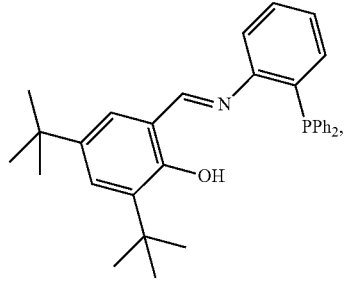

the precipitating agent was changed to cyclohexane, the assistant chemical treating agent was changed to methyl aluminoxane.

In this example, the ratio by molar of the magnesium compound to the alcohol was 1:1, the ratio of the magnesium compound to the solvent for dissolving the magnesium compound was 1 mol:240 ml, the ratio by molar of the magnesium compound to the nonmetallocene ligand was 1:0.006, the ratio by volume of the precipitating agent to the solvent for dissolving the magnesium compound was 1:0.5, the ratio by molar of the magnesium compound to the assistant chemical treating agent was 1:0.5, and the ratio by molar of the magnesium compound to the chemical treating agent was 1:0.5.

The thus obtained supported nonmetallocene catalyst was named as CAT-II-2-1.

Example II-2-2

Substantially the same as the Example II-2, except for the following changes:

The alcohol was changed to propanol, the magnesium compound was changed to magnesium bromide (MgBr$_2$), the nonmetallocene ligand was changed to

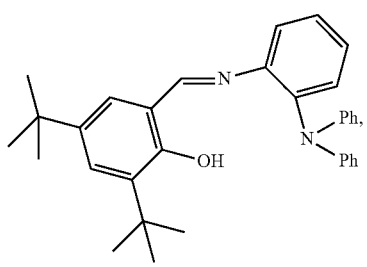 [SMILES: CC(C)(C)c1cc(/C=N/c2ccccc2N(c2ccccc2)c2ccccc2)c(O)c(C(C)(C)C)c1]

the solvent for dissolving the magnesium compound was changed to toluene, the precipitating agent was changed to cycloheptane, the assistant chemical treating agent was changed to isobutyl aluminoxane, the chemical treating agent was changed to zirconium tetrachloride ($ZrCl_4$).

The chemical treating agent was dissolved in 25 ml toluene, and then the resultant solution was dropwise added to the modified carrier over a period of 15 minutes. Washing was conducted with toluene for 3 times (25 ml each time), and then heated to 120° C. and vacuum dried.

In this example, the ratio by molar of the magnesium compound to the alcohol was 1:2, the ratio of the magnesium compound to the solvent for dissolving the magnesium compound was 1 mol:100 ml, the ratio by molar of the magnesium compound to the nonmetallocene ligand was 1:0.003, the ratio by volume of the precipitating agent to the solvent for dissolving the magnesium compound was 1:2, the ratio by molar of the magnesium compound to the assistant chemical treating agent was 1:0.4, and the ratio by molar of the magnesium compound to the chemical treating agent was 1:1.

The thus obtained supported nonmetallocene catalyst was named as CAT-II-2-2.

Example II-2-3

Substantially the same as the Example II-2, except for the following changes:

The alcohol was changed to iso-octanol, the magnesium compound was changed to ethoxy magnesium chloride ($MgCl(OC_2H_5)$), the nonmetallocene ligand was changed to

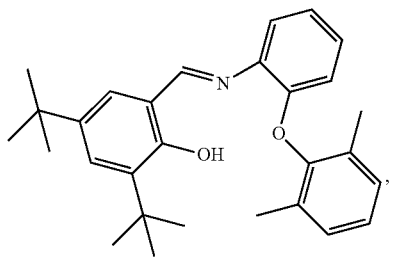 [SMILES: Cc1cccc(C)c1Oc1ccccc1/N=C/c1cc(C(C)(C)C)cc(C(C)(C)C)c1O]

the solvent for dissolving the magnesium compound was changed to ethyl benzene, the precipitating agent was changed to decane, the assistant chemical treating agent was changed to triisobutyl aluminum, and the chemical treating agent was changed to tetraethyl titanium ($Ti(CH_3CH_2)_4$).

In this example, the ratio by molar of the magnesium compound to the alcohol was 1:0.2, the ratio of the magnesium compound to the solvent for dissolving the magnesium compound was 1 mol:300 ml, the ratio by molar of the magnesium compound to the nonmetallocene ligand was 1:0.10, the ratio by volume of the precipitating agent to the solvent for dissolving the magnesium compound was 1:0.8, the ratio by molar of the magnesium compound to the assistant chemical treating agent was 1:1.0, and the ratio by molar of the magnesium compound to the chemical treating agent was 1:0.15.

The thus obtained supported nonmetallocene catalyst was named as CAT-II-2-3.

Example II-2-4

Substantially the same as the Example II-2, except for the following changes:

The alcohol was changed to pentanol, the magnesium compound was changed to ethyl magnesium ($Mg(C_2H_5)_2$), the nonmetallocene ligand was changed to

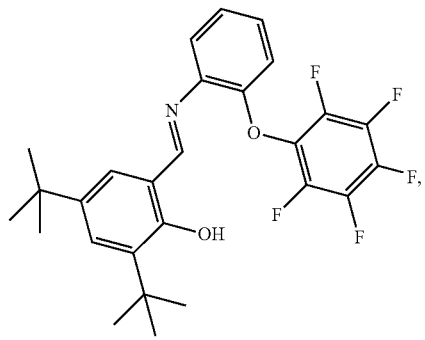 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, the assistant chemical treating agent was changed to trimethyl aluminum, and the chemical treating agent was changed to triisobutyl chloro titanium ($TiCl(i-C_4H_9)_3$).

In this example, the ratio by molar of the magnesium compound to the alcohol was 1:3, the ratio of the magnesium compound to the solvent for dissolving the magnesium compound was 1 mol:350 ml, the ratio by molar of the magnesium compound to the nonmetallocene ligand was 1:0.001, the ratio by volume of the precipitating agent to the solvent for dissolving the magnesium compound was 1:0.25, the ratio by molar of the magnesium compound to the assistant chemical treating agent was 1:0.20, and the ratio by molar of the magnesium compound to the chemical treating agent was 1:0.30.

The thus obtained supported nonmetallocene catalyst was named as CAT-II-2-4.

Example II-2-5

Substantially the same as the Example II-2, except for the following changes:

The magnesium compound was changed to ethoxy magnesium ($Mg(OC_2H_5)_2$), the nonmetallocene ligand was changed to

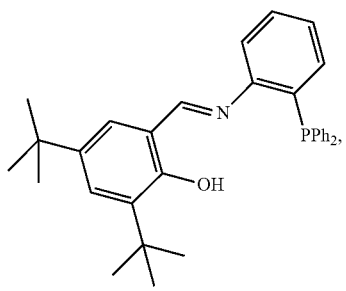

the solvent for dissolving the magnesium compound was changed to p-chloro toluene, and the chemical treating agent was changed to tetraethoxy titanium (Ti(OCH$_3$CH$_2$)$_4$).

Example II-2-6

Substantially the same as the Example II-2, except for the following changes:
The magnesium compound was changed to isobutyl magnesium (Mg(i-C$_4$H$_9$)$_2$), the nonmetallocene ligand was changed to

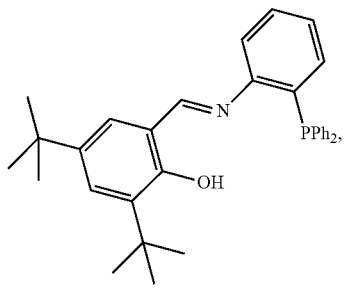

Reference Example II-1-A

Substantially the same as the Example II-1, except for the following changes:
No nonmetallocene ligand was used.
The thus obtained catalyst was named as CAT-II-1-A.

Reference Example II-1-B

Substantially the same as the Example II-1, except for the following changes:
The ratio by molar of the magnesium compound to the nonmetallocene ligand was changed to 1:0.008.
The thus obtained catalyst was named as CAT-II-1-B.

Reference Example II-1-C

Substantially the same as the Example II-1, except for the following changes:
The ratio by molar of the magnesium compound to the nonmetallocene ligand was changed to 1:0.002.
The thus obtained catalyst was named as CAT-II-1-C.

Reference Example II-1-D

Substantially the same as the Example II-1, except for the following changes:
The modified carrier was not treated by titanium tetrachloride.
The thus obtained catalyst was named as CAT-II-1-D.

Reference Example II-1-E

Substantially the same as the Example II-1, except for the following changes:
The modified carrier was not subjected to the treatment of the precipitating agent, but was obtained by directly vacuum dried at 90° C.
The thus obtained catalyst was named as CAT-II-1-E.

Example II-3

Application Example II

The catalysts CAT-II-1, CAT-II-2, CAT-II-1-1 to CAT-II-1-4, CAT-II-2-1 to CAT-II-2-4, CAT-II-1-A to CAT-II-1-E were respectively weighted, and used in combination with a co-catalyst (methyl aluminoxane or triethyl aluminum), for ethylene homopolymerization/copolymerization and ultra high molecular weight polyethylene preparation under the following conditions according to the following processes respectively.

Homopolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table II-1.

Copolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto. Hexene-1 (50 g) was added thereto all at once as the comonomer, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table II-1.

Preparation of ultra high molecular weight polyethylene: an autoclave for polymerization (5 L), a slurry polymerization process, hexane (2.5 L) as the solvent, a total polymerization pressure of 0.5 MPa, a polymerization temperature of 70° C., a ratio by molar of the co-catalyst to the active metal in the catalyst of 100, a polymerization time of 6 hours.

Specifically, 2.5 L hexane was added to the autoclave for polymerization, and the stirring means was started. Then, 20 mg of a mixture of the supported nonmetallocene catalyst and the co-catalyst was added thereto, and finally ethylene was continuously supplied thereto to keep the total polymerization pressure constant at 0.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table II-2.

Upon comparison of the results of the experiment No. 1 and those of the experiment No. 3, the results of the experiment No. 10 and those of the experiment No. 11, in the Table II-1, it is clear that the present catalyst shows a significant comonomer effect, i.e. the activity in copolymerization is higher than that in homopolymerization. Further, by the copolymerization, the bulk density of the polymer can be increased, i.e. the polymer morphology can be improved. However, there is limited influence on the molecular weight distribution of the polymer.

Upon comparison of the results of the experiment No. 1 and those of the experiment No. 2, the results of the experiment No. 9 and those of the experiment No. 10, it is clear that the activity of the catalyst in polymerization in the presence of

TABLE II-1

The results of the olefin polymerization obtained with the supported nonmetallocene catalysts

| Experiment No. | Catalyst No. | Co-catalyst | ratio by molar of co-catalyst to active metal | type | Poly activity (kgPE/gCat) | Bulk density (g/cm³) | Molecular weight distribution |
|---|---|---|---|---|---|---|---|
| 1 | CAT-II-1 | triethylaluminum | 100 | homopolymerization | 63.7 | 0.34 | 3.10 |
| 2 | CAT-II-1 | methylaluminoxane | 100 | homopolymerization | 72.5 | 0.35 | 2.64 |
| 3 | CAT-II-1 | triethylaluminum | 100 | copolymerization | 80.1 | 0.35 | 3.35 |
| 4 | CAT-II-1 | triethylaluminum | 500 | copolymerization | 82.4 | 0.35 | 3.22 |
| 5 | CAT-II-1-1 | triethylaluminum | 100 | homopolymerization | 83.8 | 0.34 | — |
| 6 | CAT-II-1-2 | triethylaluminum | 100 | homopolymerization | 60.4 | 0.33 | — |
| 7 | CAT-II-1-3 | triethylaluminum | 100 | homopolymerization | 74.7 | 0.33 | — |
| 8 | CAT-II-1-4 | triethylaluminum | 100 | homopolymerization | 55.9 | 0.33 | — |
| 9 | CAT-II-2 | triethylaluminum | 100 | homopolymerization | 70.5 | 0.34 | 3.02 |
| 10 | CAT-II-2 | methylaluminoxane | 100 | homopolymerization | 78.4 | 0.35 | 2.59 |
| 11 | CAT-II-2 | triethylaluminum | 100 | copolymerization | 90.2 | 0.35 | 3.17 |
| 12 | CAT-II-2-1 | triethylaluminum | 100 | homopolymerization | 87.6 | 0.35 | — |
| 13 | CAT-II-2-2 | triethylaluminum | 100 | homopolymerization | 65.9 | 0.34 | — |
| 14 | CAT-II-2-3 | triethylaluminum | 100 | homopolymerization | 80.3 | 0.33 | — |
| 15 | CAT-II-2-4 | triethylaluminum | 100 | homopolymerization | 60.1 | 0.33 | — |
| 16 | CAT-II-1-A | triethylaluminum | 100 | homopolymerization | 44.6 | 0.28 | 4.83 |
| 17 | CAT-II-1-B | triethylaluminum | 100 | homopolymerization | 70.9 | 0.34 | 2.77 |
| 18 | CAT-II-1-C | triethylaluminum | 100 | homopolymerization | 58.5 | 0.32 | 3.45 |
| 19 | CAT-II-1-D | triethylaluminum | 100 | homopolymerization | no activity | — | — |
| 20 | CAT-II-1-E | triethylaluminum | 100 | homopolymerization | 72.5 | 0.31 | 3.04 |

TABLE II-2

The results of the ultra high molecular weight polyethylene preparation obtained with the supported nonmetallocene catalysts

| Experiment No. | Catalyst No. | Co-catalyst | Poly activity (kgPE/gCat) | Bulk density (g/cm³) | Mv (10⁴ g/mol) |
|---|---|---|---|---|---|
| 1 | CAT-II-1 | triethyl aluminum | 80.4 | 0.37 | 446 |
| 2 | CAT-II-1 | methyl aluminoxane | 78.3 | 0.39 | 482 |
| 3 | CAT-II-2 | triethyl aluminum | 85.6 | 0.38 | 475 |
| 4 | CAT-II-2 | methyl aluminoxane | 81.7 | 0.40 | 550 |
| 5 | CAT-II-1-A | triethyl aluminum | 56.9 | 0.35 | 314 |
| 6 | CAT-II-1-B | triethyl aluminum | 92.6 | 0.36 | 540 |
| 7 | CAT-II-1-C | triethyl aluminum | 62.7 | 0.36 | 365 |
| 8 | CAT-II-1-D | triethyl aluminum | no activity | — | — |
| 9 | CAT-II-1-E | triethyl aluminum | 91.6 | 0.35 | 432 | hydrogen gas can be further increased, the bulk density of the polymer can be further improved, and the molecular weight distribution of the polymer can be further narrowed, if using MAO as the co-catalyst.

Upon comparison of the results of the experiment Nos. 1, 17 and 18 in the Table II-1, it is clear that by increasing or reducing the ratio by molar of the nonmetallocene ligand to the magnesium compound, the activity for ethylene polymerization of the catalyst was increased or decreased, and the molecular weight distribution of the polymer was somewhat narrowed or broadened. This effect was further supported by a comparison of the results of the experiment Nos. 16 and 1, i.e. no addition of the nonmetallocene ligand will lower the activity of the catalyst and broaden the molecular weight distribution of the polymer.

Upon comparison of the results of the experiment Nos. 1 to 8 and those of the experiment Nos. 9 to 15 in the Table II-1, it is clear that the supported nonmetallocene catalyst obtained by a process wherein the modified carrier was firstly subject to the treatment with an assistant chemical treating agent and then to that with a chemical treating agent shows increased catalyst activity and polymer bulk density, and narrowed polymer molecular weight distribution, as compared with the supported nonmetallocene catalyst obtained by a process wherein the modified carrier is subject only to the treatment with a chemical treating agent.

As can be seen from the Table II-2, it is possible to prepare an ultra high molecular weight polyethylene (with to some degree increased bulk density) by using the catalyst according to this invention. Upon comparison of the results from the experiment No. 1 and those from the experiment No. 2, the results from the experiment No. 3 and those from the experiment No. 4, it is clear that the viscosity averaged molecular weight of the polymer can be increased by using MAO as the co-catalyst. Upon comparison of the results from the experiment No. 1 and those from the reference example experiment Nos. 5 to 8 in the Table II-2, it is clear that the viscosity averaged molecular weight of the polymer increases or decreases as the amount of the nonmetallocene ligand to be introduced into the catalyst increases or decreases. This fact indicates that the nonmetallocene ligand further shows a function of increasing the viscosity averaged molecular weight of the polymer.

Upon comparison of the results of the experiment No. 1 and those of the experiment No. 14 in the Table II-1, or the results of the experiment No. 1 and those of the experiment No. 9 in the Table II-2, it is clear that the polymer produced by using the catalyst obtained in line with the present process shows a higher bulk density than that produced by using a catalyst obtained by a directly drying process.

As can be seen from the results of the experiment No. 19 in the Table II-1 and the results of the experiment No. 8 in the Table II-2, it is clear that the catalyst containing merely the nonmetallocene ligand shows no polymerization activity, and will be given same after reacting with the Group IVB metal compound.

Example III

Corresponding to the Third Embodiment

Example III-1

Anhydrous magnesium chloride was used as the magnesium compound, butanol was used as the alcohol, tetrahydrofuran was used as the solvent for dissolving the magnesium compound, titanium tetrachloride was used as the chemical treating agent, silica gel (ES757, from the Ineos Company) was used as the porous carrier, the compound represented by

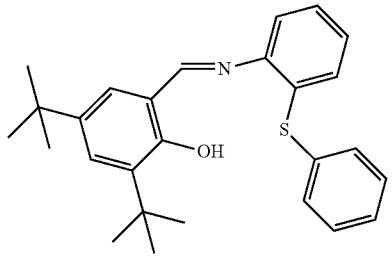 [SMILES: CC(C)(C)c1cc(/C=N/c2ccccc2Sc2ccccc2)c(O)c(C(C)(C)C)c1]

was used as the nonmetallocene ligand.

The silica gel was thermally activated by continuously calcinating at 600° C. under a $N_2$ atmosphere for 4 hours before use.

2.5 g of anhydrous magnesium chloride as the magnesium compound was weighted, a predetermined amount of butanol and tetrahydrofuran were added thereto, after heated to 60° C. to dissolve same, a predetermined amount of the nonmetallocene ligand was added thereto and continuously stirred at 60° C. to completely dissolve same. Then, the thermally activated silica gel was added thereto to form a slurry. After stirring for 2 hours, the resultant was uniformly heated to 90° C. and directly vacuum dried, to obtain the composite carrier.

Then, to the modified carrier, 25 ml hexane as the solvent was added, and then titanium tetrachloride as the chemical treating agent was dropwise added thereto under stirring over a period of 15 minutes. The reaction continued at 30° C. for 4 hours, then filtered, washed with hexane for 3 times (25 ml each time), and finally vacuum dried to obtain the supported nonmetallocene catalyst.

In this example, the ratio by molar of the magnesium compound to butanol was 1:0.5, the ratio of the magnesium compound to the solvent for dissolving the magnesium compound was 1 mol:200 ml, the ratio by molar of the magnesium compound to the nonmetallocene ligand was 1:0.004, the ratio by weight of the magnesium compound to the porous carrier was 1:2, and the ratio by molar of the magnesium compound to titanium tetrachloride was 1:0.2.

The thus obtained supported nonmetallocene catalyst was named as CAT-III-1.

Example III-1-1

Substantially the same as the Example III-1, except for the following changes:

The alcohol was changed to ethanol, the porous carrier was changed to silica gel (955, from the Grace Company), which has been thermally activated by continuously calcinating at 400° C. under a $N_2$ gas atmosphere for 8 hours.

The nonmetallocene ligand was changed to

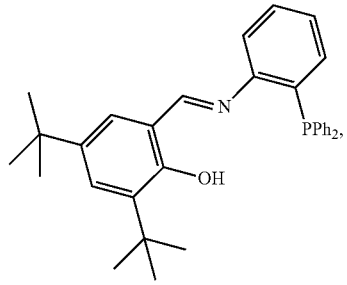

The slurry was vacuum dried at 80° C.

In this example, the ratio by molar of the magnesium compound to the alcohol was 1:1, the ratio of the magnesium compound to the solvent for dissolving the magnesium compound was 1 mol:240 ml, the ratio by molar of the magnesium compound to the nonmetallocene ligand was 1:0.006, the ratio by weight of the magnesium compound to the porous carrier was 1:1, and the ratio by molar of the magnesium compound to the chemical treating agent was 1:0.5.

The thus obtained supported nonmetallocene catalyst was named as CAT-III-1-1.

Example III-1-2

Substantially the same as the Example III-1, except for the following changes:

The porous carrier was changed to $Al_2C_3$, which has been thermally activated by continuously calcinating at 700° C. under a $N_2$ gas atmosphere for 6 hours.

The alcohol was changed to propanol, the magnesium compound was changed to magnesium bromide ($MgBr_2$), the nonmetallocene ligand was changed to

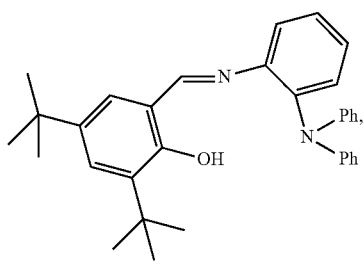 [SMILES: CC(C)(C)c1cc(/C=N/c2ccccc2N(c2ccccc2)c2ccccc2)c(O)c(C(C)(C)C)c1]

the solvent for dissolving the magnesium compound was changed to toluene, and the chemical treating agent was changed to zirconium tetrachloride (ZrCl$_4$).

The slurry was vacuum dried at 100° C.

The chemical treating agent was dissolved in 25 ml toluene, and then the resultant solution was dropwise added to the composite carrier over a period of 15 minutes. Washing was conducted with toluene for 3 times (25 ml each time), and then heated to 120° C. and vacuum dried.

In this example, the ratio by molar of the magnesium compound to the alcohol was 1:2, the ratio of the magnesium compound to the solvent for dissolving the magnesium compound was 1 mol:100 ml, the ratio by molar of the magnesium compound to the nonmetallocene ligand was 1:0.003, the ratio by weight of the magnesium compound to the porous carrier was 1:3, and the ratio by molar of the magnesium compound to the chemical treating agent was 1:1.

The thus obtained supported nonmetallocene catalyst was named as CAT-III-1-2.

Example III-1-3

Substantially the same as the Example III-1, except for the following changes:

The porous carrier was changed to montmorillonite, which has been thermally activated by continuously calcinating at 400° C. under a N$_2$ gas atmosphere for 8 hours.

The alcohol was changed to iso-octanol, the magnesium compound was changed to ethoxy magnesium chloride (MgCl(OC$_2$H$_5$)), the nonmetallocene ligand was changed to

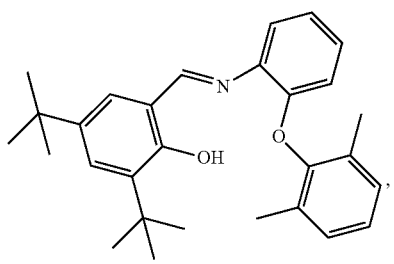 [SMILES: Cc1cccc(C)c1Oc1ccccc1/N=C/c1cc(C(C)(C)C)cc(C(C)(C)C)c1O]

the solvent for dissolving the magnesium compound was changed to ethyl benzene, and the chemical treating agent was changed to tetraethyl titanium (Ti(CH$_3$CH$_2$)$_4$).

The slurry was dried at 130° C. under a N$_2$ purge.

In this example, the ratio by molar of the magnesium compound to the alcohol was 1:0.25, the ratio of the magnesium compound to the solvent for dissolving the magnesium compound was 1 mol:300 ml, the ratio by molar of the magnesium compound to the nonmetallocene ligand was 1:0.010, the ratio by weight of the magnesium compound to the porous carrier was 1:0.5, and the ratio by molar of the magnesium compound to the chemical treating agent was 1:0.15.

The thus obtained supported nonmetallocene catalyst was named as CAT-III-1-3.

Example III-1-4

Substantially the same as the Example III-1, except for the following changes:

The porous carrier was changed to polystyrene, which has been thermally activated by continuously drying at 100° C. under a N$_2$ gas atmosphere for 12 hours.

The alcohol was changed to pentanol, the magnesium compound was changed to ethyl magnesium (Mg(C$_2$H$_5$)$_2$), the nonmetallocene ligand was changed to

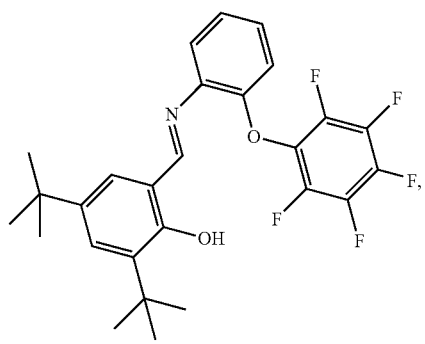 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, and the chemical treating agent was changed to triisobutyl chloro titanium (TiCl(i-C$_4$H$_9$)$_3$).

The slurry was vacuum dried at 60° C.

In this example, the ratio by molar of the magnesium compound to the alcohol was 1:3, the ratio of the magnesium compound to the solvent for dissolving the magnesium compound was 1 mol:350 ml, the ratio by molar of the magnesium compound to the nonmetallocene ligand was 1:0.001, the ratio by weight of the magnesium compound to the porous carrier was 1:10, and the ratio by molar of the magnesium compound to the chemical treating agent was 1:0.3.

The thus obtained supported nonmetallocene catalyst was named as CAT-III-1-4.

Example III-1-5

Substantially the same as the Example III-1, except for the following changes:

The porous carrier was changed to kieselguhr, which has been thermally activated by continuously calcinating at 500° C. under a N$_2$ gas atmosphere for 8 hours.

The magnesium compound was changed to ethoxy magnesium (Mg(OC$_2$H$_5$)$_2$), the nonmetallocene ligand was changed to

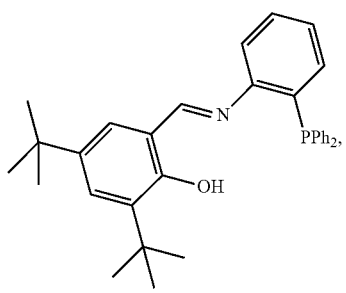

the solvent for dissolving the magnesium compound was changed to p-chloro toluene, and the chemical treating agent was changed to tetraethoxy titanium (Ti(OCH$_3$CH$_2$)$_4$).

Example III-1-6

Substantially the same as the Example III-1, except for the following changes:

The magnesium compound was changed to isobutyl magnesium (Mg(i-C$_4$H$_9$)$_2$), the nonmetallocene ligand was changed to

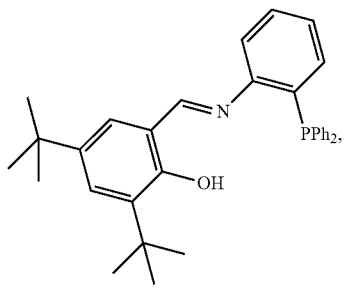

The porous carrier was changed to a mixed oxide of silica and MgO (at a ratio by weight of 1:1), which has been thermally activated by continuously calcinating at 600° C. under an Ar gas atmosphere for 4 hours.

Example III-2

Anhydrous magnesium chloride was used as the magnesium compound, butanol was used as the alcohol, tetrahydrofuran was used as the solvent for dissolving the magnesium compound, titanium tetrachloride was used as the chemical treating agent, silica gel (ES757, from the Ineos Company) was used as the porous carrier, the compound represented by

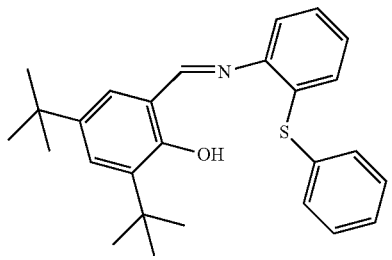 [SMILES: CC(C)(C)c1cc(/C=N/c2ccccc2Sc2ccccc2)c(O)c(C(C)(C)C)c1]

was used as the nonmetallocene ligand.

The silica gel was thermally activated by continuously calcinating at 600° C. under a N$_2$ atmosphere for 4 hours before use.

2.5 g of anhydrous magnesium chloride as the magnesium compound was weighted, a predetermined amount of butanol and tetrahydrofuran were added thereto, after heated to 60° C. to dissolve same, a predetermined amount of the nonmetallocene ligand was added thereto and continuously stirred at 60° C. to completely dissolve same. Then, the thermally activated silica gel was added thereto to form a slurry. After stirring for 2 hours, the resultant was uniformly heated to 90° C. and directly vacuum dried, to obtain the composite carrier.

Then, to the composite carrier, 25 ml hexane was added, and then triethyl aluminum as the assistant chemical treating agent was dropwise added thereto under stirring over a period of 15 minutes. The reaction continued under stirring for 1 hour, then filtered, washed with hexane for 2 times (25 ml each time). Then, 25 ml hexane was added thereto, and then titanium tetrachloride was dropwise added thereto over a period of 15 minutes. The reaction continued at 60° C. for 4 hours, then filtered, washed with hexane for 3 times (25 ml each time), and finally vacuum dried to obtain the supported nonmetallocene catalyst.

In this example, the ratio by molar of the magnesium compound to butanol was 1:0.5, the ratio of the magnesium compound to the solvent for dissolving the magnesium compound was 1 mol:200 ml, the ratio by molar of the magnesium compound to the nonmetallocene ligand was 1:0.004, the ratio by weight of the magnesium compound to the porous carrier was 1:2, the ratio by molar of the magnesium compound to the assistant chemical treating agent was 1:0.35, and the ratio by molar of the magnesium compound to titanium tetrachloride was 1:0.2.

The thus obtained supported nonmetallocene catalyst was named as CAT-III-2.

Example III-2-1

Substantially the same as the Example III-2, except for the following changes:

The alcohol was changed to ethanol, the porous carrier was changed to silica gel (955, from the Grace Company), which has been thermally activated by continuously calcinating at 400° C. under a N$_2$ gas atmosphere for 8 hours.

The nonmetallocene ligand was changed to

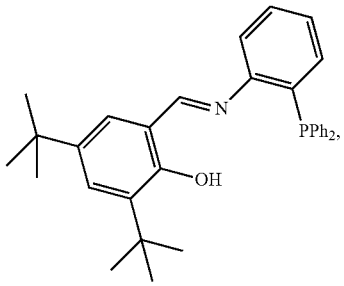

the assistant chemical treating agent was changed to methyl aluminoxane.

The slurry was vacuum dried at 80° C.

In this example, the ratio by molar of the magnesium compound to the alcohol was 1:1, the ratio of the magnesium compound to the solvent for dissolving the magnesium compound was 1 mol:240 ml, the ratio by molar of the magnesium compound to the nonmetallocene ligand was 1:0.006, the ratio by weight of the magnesium compound to the porous carrier was 1:1, the ratio by molar of the magnesium compound to the assistant chemical treating agent was 1:0.5, and the ratio by molar of the magnesium compound to the chemical treating agent was 1:0.5.

The thus obtained supported nonmetallocene catalyst was named as CAT-III-2-1.

Example III-2-2

Substantially the same as the Example III-2, except for the following changes:

The porous carrier was changed to $Al_2O_3$, which has been thermally activated by continuously calcinating at 700° C. under a $N_2$ gas atmosphere for 6 hours.

The alcohol was changed to propanol, the magnesium compound was changed to magnesium bromide ($MgBr_2$), the nonmetallocene ligand was changed to

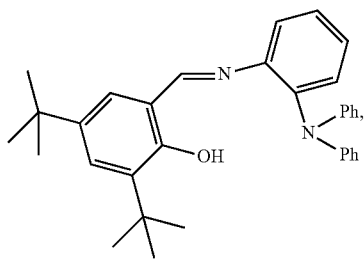 [SMILES: CC(C)(C)c1cc(/C=N/c2ccccc2N(c2ccccc2)c2ccccc2)c(O)c(C(C)(C)C)c1]

the solvent for dissolving the magnesium compound was changed to toluene, the assistant chemical treating agent was changed to isobutyl aluminoxane, and the chemical treating agent was changed to zirconium tetrachloride ($ZrCl_4$).

The slurry was vacuum dried at 100° C.

The chemical treating agent was dissolved in 25 ml toluene, and then the resultant solution was dropwise added to the composite carrier over a period of 15 minutes. Washing was conducted with toluene for 3 times (25 ml each time), and then heated to 120° C. and vacuum dried.

In this example, the ratio by molar of the magnesium compound to the alcohol was 1:2, the ratio of the magnesium compound to the solvent for dissolving the magnesium compound was 1 mol:100 ml, the ratio by molar of the magnesium compound to the nonmetallocene ligand was 1:0.003, the ratio by weight of the magnesium compound to the porous carrier was 1:3, the ratio by molar of the magnesium compound to the assistant chemical treating agent was 1:0.6, and the ratio by molar of the magnesium compound to the chemical treating agent was 1:1.

The thus obtained supported nonmetallocene catalyst was named as CAT-III-2-2.

Example III-2-3

Substantially the same as the Example III-2, except for the following changes:

The porous carrier was changed to montmorillonite, which has been thermally activated by continuously calcinating at 400° C. under a $N_2$ gas atmosphere for 8 hours.

The alcohol was changed to iso-octanol, the magnesium compound was changed to ethoxy magnesium chloride ($MgCl(OC_2H_5)$), the nonmetallocene ligand was changed to

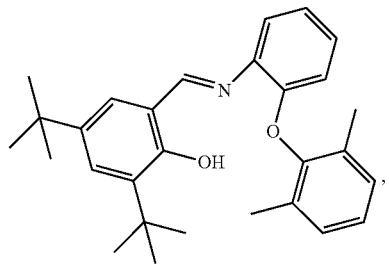 [SMILES: Cc1cccc(C)c1Oc1ccccc1/N=C/c1cc(C(C)(C)C)cc(C(C)(C)C)c1O]

the solvent for dissolving the magnesium compound was changed to ethyl benzene, the assistant chemical treating agent was changed to triisobutyl aluminum, and the chemical treating agent was changed to tetraethyl titanium (Ti($CH_3CH_2$)$_4$).

The slurry was dried at 130° C. under a $N_2$ purge.

In this example, the ratio by molar of the magnesium compound to the alcohol was 1:0.25, the ratio of the magnesium compound to the solvent for dissolving the magnesium compound was 1 mol:300 ml, the ratio by molar of the magnesium compound to the nonmetallocene ligand was 1:0.010, the ratio by weight of the magnesium compound to the porous carrier was 1:0.5, the ratio by molar of the magnesium compound to the assistant chemical treating agent was 1:1.0, and the ratio by molar of the magnesium compound to the chemical treating agent was 1:0.15.

The thus obtained supported nonmetallocene catalyst was named as CAT-III-2-3.

Example III-2-4

Substantially the same as the Example III-2, except for the following changes:

The porous carrier was changed to polystyrene, which has been thermally activated by continuously drying at 100° C. under a $N_2$ gas atmosphere for 12 hours.

The alcohol was changed to pentanol, the magnesium compound was changed to ethyl magnesium ($Mg(C_2H_5)_2$), the nonmetallocene ligand was changed to

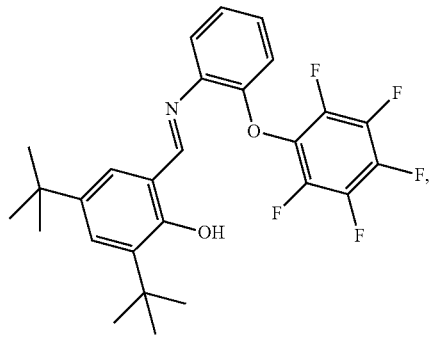 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, the assistant chemical treating agent was changed to trimethyl aluminum, and the chemical treating agent was changed to triisobutyl chloro titanium (TiCl(i-$C_4H_9$)$_3$).

The slurry was vacuum dried at 60° C.

In this example, the ratio by molar of the magnesium compound to the alcohol was 1:3, the ratio of the magnesium compound to the solvent for dissolving the magnesium compound was 1 mol:350 ml, the ratio by molar of the magnesium compound to the nonmetallocene ligand was 1:0.001, the ratio by weight of the magnesium compound to the porous carrier was 1:10, the ratio by molar of the magnesium compound to the assistant chemical treating agent was 1:0.75, and the ratio by molar of the magnesium compound to the chemical treating agent was 1:0.3.

The thus obtained supported nonmetallocene catalyst was named as CAT-III-2-4.

Example III-2-5

Substantially the same as the Example III-2, except for the following changes:

The porous carrier was changed to kieselguhr, which has been thermally activated by continuously calcinating at 500° C. under a $N_2$ gas atmosphere for 8 hours.

The magnesium compound was changed to ethoxy magnesium ($Mg(OC_2H_5)_2$), the nonmetallocene ligand was changed to

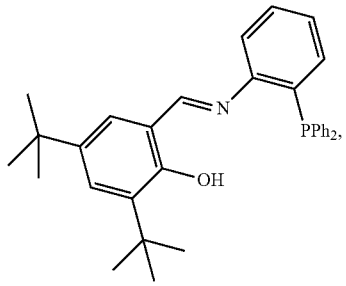

the solvent for dissolving the magnesium compound was changed to p-chloro toluene, and the chemical treating agent was changed to tetraethoxy titanium ($Ti(OCH_3CH_2)_4$).

Example III-2-6

Substantially the same as the Example III-2, except for the following changes:

The magnesium compound was changed to isobutyl magnesium ($Mg(i-C_4H_9)_2$), the nonmetallocene ligand was changed to

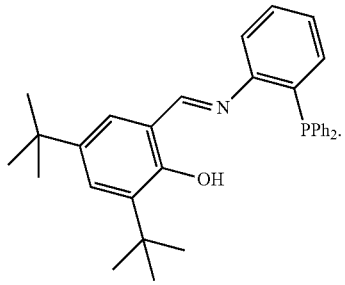

The porous carrier was changed to a mixed oxide of silica and MgO (at a ratio by weight of 1:1), which has been thermally activated by continuously calcinating at 600° C. under an Ar gas atmosphere for 4 hours.

Reference Example III-1-A

Substantially the same as the Example III-1, except for the following changes:

No nonmetallocene ligand was used.

The thus obtained catalyst was named as CAT-III-1-A.

Reference Example III-1-B

Substantially the same as the Example III-1, except for the following changes:

The ratio by molar of the magnesium compound to the nonmetallocene ligand was changed to 1:0.008.

The thus obtained catalyst was named as CAT-III-1-B.

Reference Example III-1-C

Substantially the same as the Example III-1, except for the following changes:

The ratio by molar of the magnesium compound to the nonmetallocene ligand was changed to 1:0.002.

The thus obtained catalyst was named as CAT-III-1-C.

Reference Example III-1-D

Substantially the same as the Example III-1, except for the following changes:

The composite carrier was not treated by titanium tetrachloride.

The thus obtained catalyst was named as CAT-III-1-D.

Reference Example III-1-E

Substantially the same as the Example III-1, except for the following changes:

60 ml hexane was added to the slurry to precipitate same, which was then filtered, washed with hexane for 3 times (60 ml per time), and finally vacuum dried at 90° C.

The thus obtained catalyst was named as CAT-III-1-E.

Example III-3

Application Example III

The catalysts CAT-III-1, CAT-III-2, CAT-III-1-1 to CAT-III-1-4, CAT-III-2-1 to CAT-III-2-4, CAT-III-1-A to CAT-III-1-E were respectively weighted, and used in combination of a co-catalyst (methyl aluminoxane or triethyl aluminum), for ethylene homopolymerization/copolymerization and ultra high molecular weight polyethylene preparation under the following conditions according to the following processes respectively.

Homopolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table III-1.

Copolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto. Hexene-1 (50 g) was added thereto all at once as the comonomer, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table III-1.

Preparation of ultra high molecular weight polyethylene: an autoclave for polymerization (5 L), a slurry polymerization process, hexane (2.5 L) as the solvent, a total polymerization pressure of 0.5 MPa, a polymerization temperature of 70° C., a ratio by molar of the co-catalyst to the active metal in the catalyst of 100, a polymerization time of 6 hours.

Specifically, 2.5 L hexane was added to the autoclave for polymerization, and the stirring means was started. Then, 20 mg of a mixture of the supported nonmetallocene catalyst and the co-catalyst was added thereto, and finally ethylene was continuously supplied thereto to keep the total polymerization pressure constant at 0.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table III-2.

TABLE III-2

The results of the ultra high molecular weight polyethylene preparation obtained with the supported nonmetallocene catalysts

| Experiment No. | Catalyst No. | Co-catalyst | Poly activity (kgPE/gCat) | Bulk density (g/cm$^3$) | Mv ($10^4$ g/mol) |
|---|---|---|---|---|---|
| 1 | CAT-III-1 | triethyl aluminum | 11.1 | 0.38 | 450 |
| 2 | CAT-III-1 | methyl aluminoxane | 10.5 | 0.40 | 475 |
| 3 | CAT-III-2 | triethyl aluminum | 11.8 | 0.39 | 460 |
| 4 | CAT-III-2 | methyl aluminoxane | 11.2 | 0.39 | 560 |
| 5 | CAT-III-1-A | triethyl aluminum | 7.8 | 0.36 | 210 |
| 6 | CAT-III-1-B | triethyl aluminum | 12.7 | 0.37 | 550 |
| 7 | CAT-III-1-C | triethyl aluminum | 8.5 | 0.37 | 370 |
| 8 | CAT-III-1-D | triethyl aluminum | no activity | — | — |
| 9 | CAT-III-1-E | triethyl aluminum | 9.8 | 0.40 | 430 |

Upon comparison of the results of the experiment No. 1 and those of the experiment No. 3, the results of the experiment No. 10 and those of the experiment No. 11, in the Table III-1, it is clear that the present catalyst shows a significant comonomer effect, i.e. the activity in copolymerization is higher than that in homopolymerization. Further, by the copolymerization, the bulk density of the polymer can be increased, i.e. the polymer morphology can be improved. However, there is limited influence on the molecular weight distribution of the polymer.

Upon comparison of the results of the experiment No. 1 and those of the experiment No. 2, the results of the experiment No. 9 and those of the experiment No. 10, it is clear that

TABLE III-1

The results of the olefin polymerization obtained with the supported nonmetallocene catalysts

| Experiment No. | Catalyst No. | Co-catalyst | ratio by molar of co-catalyst to active metal | type | Poly activity (kgPE/gCat) | Bulk density (g/cm$^3$) | Molecular weight distribution |
|---|---|---|---|---|---|---|---|
| 1 | CAT-III-1 | triethylaluminum | 100 | homopolymerization | 8.2 | 0.34 | 2.98 |
| 2 | CAT-III-1 | methylaluminoxane | 100 | homopolymerization | 8.9 | 0.36 | 2.61 |
| 3 | CAT-III-1 | triethylaluminum | 100 | copolymerization | 9.7 | 0.36 | 3.25 |
| 4 | CAT-III-1 | triethylaluminum | 500 | copolymerization | 10.1 | 0.36 | 3.10 |
| 5 | CAT-III-1-1 | triethylaluminum | 100 | homopolymerization | 10.3 | 0.35 | — |
| 6 | CAT-III-1-2 | triethylaluminum | 100 | homopolymerization | 7.8 | 0.34 | — |
| 7 | CAT-III-1-3 | triethylaluminum | 100 | homopolymerization | 9.6 | 0.34 | — |
| 8 | CAT-III-1-4 | triethylaluminum | 100 | homopolymerization | 7.3 | 0.34 | — |
| 9 | CAT-III-2 | triethylaluminum | 100 | homopolymerization | 9.0 | 0.35 | 3.00 |
| 10 | CAT-III-2 | methylaluminoxane | 100 | homopolymerization | 10.0 | 0.36 | 2.55 |
| 11 | CAT-III-2 | triethylaluminum | 100 | copolymerization | 11.1 | 0.36 | 3.13 |
| 12 | CAT-III-2-1 | triethylaluminum | 100 | homopolymerization | 10.8 | 0.36 | — |
| 13 | CAT-III-2-2 | triethylaluminum | 100 | homopolymerization | 8.5 | 0.35 | — |
| 14 | CAT-III-2-3 | triethylaluminum | 100 | homopolymerization | 9.9 | 0.34 | — |
| 15 | CAT-III-2-4 | triethylaluminum | 100 | homopolymerization | 7.7 | 0.34 | — |
| 16 | CAT-III-1-A | triethylaluminum | 100 | homopolymerization | 5.8 | 0.29 | 4.74 |
| 17 | CAT-III-1-B | triethylaluminum | 100 | homopolymerization | 9.1 | 0.35 | 2.73 |
| 18 | CAT-III-1-C | triethylaluminum | 100 | homopolymerization | 7.6 | 0.33 | 3.40 |
| 19 | CAT-III-1-D | triethylaluminum | 100 | homopolymerization | no activity | — | — |
| 20 | CAT-III-1-E | triethylaluminum | 100 | homopolymerization | 7.2 | 0.37 | 3.04 | the activity of the catalyst for polymerization in the presence of hydrogen gas can be further increased, the bulk density of the polymer can be further improved, and the molecular weight distribution of the polymer can be further narrowed, if using MAO as the co-catalyst.

Upon comparison of the results of the experiment Nos. 1, 17 and 18 in the Table III-1, it is clear that by increasing or reducing the ratio by molar of the nonmetallocene ligand to the magnesium compound, the activity for ethylene polymerization of the catalyst was increased or decreased, and the molecular weight distribution of the polymer was somewhat narrowed or broadened. This effect was further supported by a comparison of the results of the experiment Nos. 16 and 1, i.e. no addition of the nonmetallocene ligand will lower the activity of the catalyst and broaden the molecular weight distribution of the polymer.

Upon comparison of the results of the experiment Nos. 1 to 8 and those of the experiment Nos. 9 to 15 in the Table III-1, or the results of the experiment Nos. 1 to 2 and those of the experiment Nos. 3 to 4 in the Table III-2, it is clear that the supported nonmetallocene catalyst obtained by a process wherein the composite carrier was firstly subject to the treatment with an assistant chemical treating agent and then to that with a chemical treating agent shows increased catalyst activity and polymer bulk density, narrowed polymer molecular weight distribution and increased viscosity averaged molecular weight of the ultra high molecular weight polyethylene, as compared with the supported nonmetallocene catalyst obtained by a process wherein the composite carrier is subject only to the treatment with a chemical treating agent.

As can be seen from the Table III-2, it is possible to prepare an ultra high molecular weight polyethylene (with to some degree increased bulk density) by using the catalyst according to this invention. Upon comparison of the results from the experiment No. 1 and those from the experiment No. 2, the results from the experiment No. 3 and those from the experiment No. 4, it is clear that the viscosity averaged molecular weight of the polymer can be increased by using MAO as the co-catalyst. Upon comparison of the results from the experiment No. 1 and those from the reference example experiment Nos. 5 to 8 in the Table III-2, it is clear that the viscosity averaged molecular weight of the polymer increases or decreases as the amount of the nonmetallocene ligand to be introduced into the catalyst increases or decreases. This fact indicates that the nonmetallocene ligand further shows a function of increasing the viscosity averaged molecular weight of the polymer.

As can be seen from the results of the experiment No. 19 in the Table III-1 and the results of the experiment No. 8 in the Table III-2, it is clear that the catalyst containing merely the nonmetallocene ligand shows no polymerization activity, and will be given same after reacting with the Group IVB metal compound.

Upon comparison of the results of the experiment Nos. 1 and 14 in the Table III-1, and the results of the experiment Nos. 1 and 9 in the Table III-2, it is clear that the catalyst obtained by a directly drying process exhibits a higher activity in polymerization than that obtained by a filtering, washing and drying process.

Example IV

Corresponding to the Fourth Embodiment

Example IV-1

Anhydrous magnesium chloride was used as the magnesium compound, butanol was used as the alcohol, tetrahydrofuran was used as the solvent for dissolving the magnesium compound, titanium tetrachloride was used as the chemical treating agent, silica gel (ES757, from the Ineos Company) was used as the porous carrier, hexane was used as the precipitating agent, the compound represented by

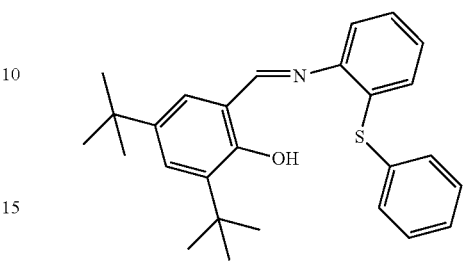

was used as the nonmetallocene ligand.

The silica gel was thermally activated by continuously calcinating at 600° C. under a $N_2$ atmosphere for 4 hours before use.

2.5 g of anhydrous magnesium chloride as the magnesium compound was weighted, a predetermined amount of butanol and tetrahydrofuran were added thereto, after heated to 60° C. to dissolve same, a predetermined amount of the nonmetallocene ligand was added thereto and continuously stirred at 60° C. to completely dissolve same. Then, the thermally activated silica gel was added thereto to form a slurry. After stirring for 2 hours, hexane (as the precipitating agent) was added thereto to precipitate same. The resultant solid was then filtered, washed by a solvent for washing (which is the same as the precipitating agent) for 2 times (by using the same amount as that of the precipitating agent each time) and then uniformly heated to 90° C. and vacuum dried, to obtain the composite carrier.

Then, to the modified carrier, 25 ml hexane as the solvent was added, and then titanium tetrachloride as the chemical treating agent was dropwise added thereto under stirring over a period of 15 minutes. The reaction continued at 30° C. for 4 hours, then filtered, washed with hexane for 3 times (25 ml each time), and finally vacuum dried to obtain the supported nonmetallocene catalyst.

In this example, the ratio by molar of the magnesium compound to butanol was 1:0.5, the ratio of the magnesium compound to the solvent for dissolving the magnesium compound was 1 mol:200 ml, the ratio by molar of the magnesium compound to the nonmetallocene ligand was 1:0.004, the ratio by weight of the magnesium compound to the porous carrier was 1:2, the ratio by volume of the precipitating agent to the solvent for dissolving the magnesium compound was 1:1, and the ratio by molar of the magnesium compound to titanium tetrachloride was 1:0.2.

The thus obtained supported nonmetallocene catalyst was named as CAT-IV-1.

Example IV-1-1

Substantially the same as the Example IV-1, except for the following changes:

The alcohol was changed to ethanol, the porous carrier was changed to silica gel (955, from the Grace Company), which has been thermally activated by continuously calcinating at 400° C. under a $N_2$ gas atmosphere for 8 hours.

The nonmetallocene ligand was changed to

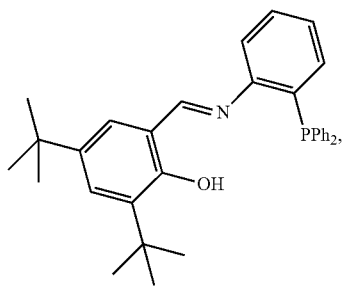

the precipitating agent was changed to cyclohexane.

In this example, the ratio by molar of the magnesium compound to the alcohol was 1:1, the ratio of the magnesium compound to the solvent for dissolving the magnesium compound was 1 mol:240 ml, the ratio by molar of the magnesium compound to the nonmetallocene ligand was 1:0.006, the ratio by weight of the magnesium compound to the porous carrier was 1:1, the ratio by volume of the precipitating agent to the solvent for dissolving the magnesium compound was 1:0.5, and the ratio by molar of the magnesium compound to the chemical treating agent was 1:0.5.

The thus obtained supported nonmetallocene catalyst was named as CAT-IV-1-1.

Example IV-1-2

Substantially the same as the Example IV-1, except for the following changes:

The porous carrier was changed to $Al_2O_3$, which has been thermally activated by continuously calcinating at 700° C. under a $N_2$ gas atmosphere for 6 hours.

The alcohol was changed to propanol, the magnesium compound was changed to magnesium bromide ($MgBr_2$), the nonmetallocene ligand was changed to

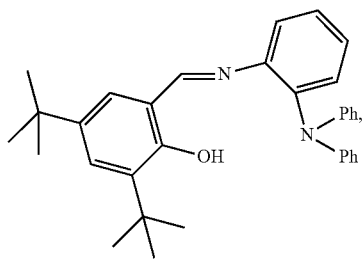 [SMILES: CC(C)(C)c1cc(/C=N/c2ccccc2N(c2ccccc2)c2ccccc2)c(O)c(C(C)(C)C)c1]

the solvent for dissolving the magnesium compound was changed to toluene, the precipitating agent was changed to cycloheptane, and the chemical treating agent was changed to zirconium tetrachloride ($ZrCl_4$).

The chemical treating agent was dissolved in 25 ml toluene, and then the resultant solution was dropwise added to the composite carrier over a period of 15 minutes. Washing was conducted with toluene for 3 times (25 ml each time), and then heated to 120° C. and vacuum dried.

In this example, the ratio by molar of the magnesium compound to the alcohol was 1:2, the ratio of the magnesium compound to the solvent for dissolving the magnesium compound was 1 mol:100 ml, the ratio by molar of the magnesium compound to the nonmetallocene ligand was 1:0.003, the ratio by weight of the magnesium compound to the porous carrier was 1:3, the ratio by volume of the precipitating agent to the solvent for dissolving the magnesium compound was 1:2, and the ratio by molar of the magnesium compound to the chemical treating agent was 1:1.

The thus obtained supported nonmetallocene catalyst was named as CAT-IV-1-2.

Example IV-1-3

Substantially the same as the Example IV-1, except for the following changes:

The porous carrier was changed to montmorillonite, which has been thermally activated by continuously calcinating at 400° C. under a $N_2$ gas atmosphere for 8 hours.

The alcohol was changed to iso-octanol, the magnesium compound was changed to ethoxy magnesium chloride ($MgCl(OC_2H_5)$), the nonmetallocene ligand was changed to

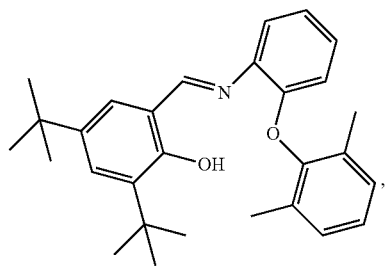 [SMILES: Cc1cccc(C)c1Oc1ccccc1/N=C/c1cc(C(C)(C)C)cc(C(C)(C)C)c1O]

the solvent for dissolving the magnesium compound was changed to ethyl benzene, the precipitating agent was changed to decane, and the chemical treating agent was changed to tetraethyl titanium ($Ti(CH_3CH_2)_4$).

In this example, the ratio by molar of the magnesium compound to the alcohol was 1:0.25, the ratio of the magnesium compound to the solvent for dissolving the magnesium compound was 1 mol:300 ml, the ratio by molar of the magnesium compound to the nonmetallocene ligand was 1:0.010, the ratio by weight of the magnesium compound to the porous carrier was 1:0.5, the ratio by volume of the precipitating agent to the solvent for dissolving the magnesium compound was 3:1, and the ratio by molar of the magnesium compound to the chemical treating agent was 1:0.15.

The thus obtained supported nonmetallocene catalyst was named as CAT-IV-1-3.

Example IV-1-4

Substantially the same as the Example IV-1, except for the following changes:

The porous carrier was changed to polystyrene, which has been thermally activated by continuously drying at 100° C. under a $N_2$ gas atmosphere for 12 hours.

The alcohol was changed to pentanol, the magnesium compound was changed to ethyl magnesium ($Mg(C_2H_5)_2$), the nonmetallocene ligand was changed to

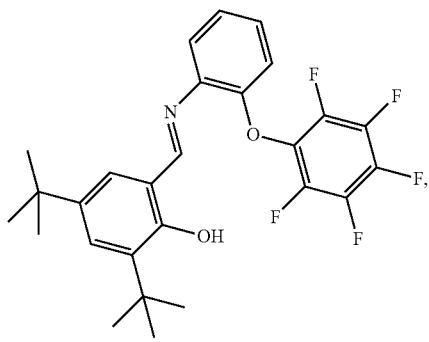 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, and the chemical treating agent was changed to triisobutyl chloro titanium (TiCl(i-C$_4$H$_9$)$_3$).

In this example, the ratio by molar of the magnesium compound to the alcohol was 1:3, the ratio of the magnesium compound to the solvent for dissolving the magnesium compound was 1 mol:350 ml, the ratio by molar of the magnesium compound to the nonmetallocene ligand was 1:0.001, the ratio by weight of the magnesium compound to the porous carrier was 1:10, the ratio by volume of the precipitating agent to the solvent for dissolving the magnesium compound was 4:1, and the ratio by molar of the magnesium compound to the chemical treating agent was 1:0.3.

The thus obtained supported nonmetallocene catalyst was named as CAT-IV-1-4.

Example IV-1-5

Substantially the same as the Example IV-1, except for the following changes:
The porous carrier was changed to kieselguhr, which has been thermally activated by continuously calcinating at 500° C. under a N$_2$ gas atmosphere for 8 hours.
The magnesium compound was changed to ethoxy magnesium (Mg(OC$_2$H$_5$)$_2$), the nonmetallocene ligand was changed to

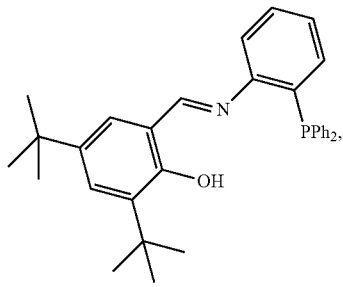

the solvent for dissolving the magnesium compound was changed to p-chloro toluene, and the chemical treating agent was changed to tetraethoxy titanium (Ti(OCH$_3$CH$_2$)$_4$).

Example IV-1-6

Substantially the same as the Example IV-1, except for the following changes:
The magnesium compound was changed to isobutyl magnesium (Mg(i-C$_4$H$_9$)$_2$), the nonmetallocene ligand was changed to

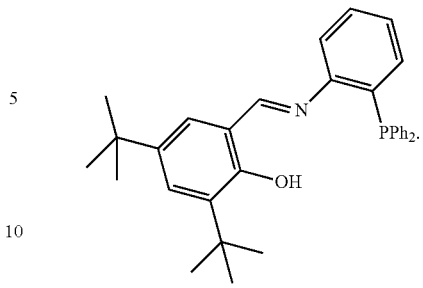

The porous carrier was changed to a mixed oxide of silica and MgO (at a ratio by weight of 1:1), which has been thermally activated by continuously calcinating at 600° C. under an Ar gas atmosphere for 4 hours.

Example IV-2

Anhydrous magnesium chloride was used as the magnesium compound, butanol was used as the alcohol, tetrahydrofuran was used as the solvent for dissolving the magnesium compound, hexane was used as the precipitating agent, titanium tetrachloride was used as the chemical treating agent, silica gel (ES757, from the Ineos Company) was used as the porous carrier, the compound represented by

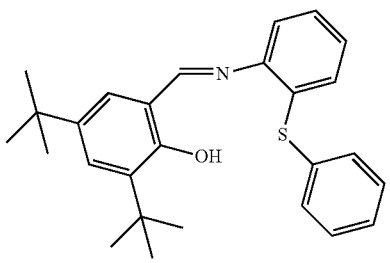 [SMILES: CC(C)(C)c1cc(/C=N/c2ccccc2Sc2ccccc2)c(O)c(C(C)(C)C)c1]

was used as the nonmetallocene ligand.

The silica gel was thermally activated by continuously calcinating at 600° C. under a N$_2$ atmosphere for 4 hours before use.

2.5 g of anhydrous magnesium chloride as the magnesium compound was weighted, a predetermined amount of butanol and tetrahydrofuran were added thereto, after heated to 60° C. to dissolve same, a predetermined amount of the nonmetallocene ligand was added thereto and continuously stirred at 60° C. to completely dissolve same. Then, the thermally activated silica gel was added thereto to form a slurry. After stirring for 2 hours, hexane (as the precipitating agent) was added thereto to precipitate same. The resultant solid was then filtered, washed by a solvent for washing (which is the same as the precipitating agent) for 2 times (by using the same amount as that of the precipitating agent each time) and then uniformly heated to 90° C. and vacuum dried, to obtain the composite carrier.

Then, to the composite carrier, 25 ml hexane was added, and then triethyl aluminum as the assistant chemical treating agent was dropwise added thereto under stirring over a period of 15 minutes. The reaction continued under stirring for 1 hour, then filtered, washed with hexane for 2 times (25 ml each time). Then, 25 ml hexane was added thereto, and then titanium tetrachloride was dropwise added thereto over a period of 15 minutes. The reaction continued at 60° C. for 4 hours, then filtered, washed with hexane for 3 times (25 ml each time), and finally vacuum dried to obtain the supported nonmetallocene catalyst.

In this example, the ratio by molar of the magnesium compound to butanol was 1:0.5, the ratio of the magnesium compound to the solvent for dissolving the magnesium compound was 1 mol:200 ml, the ratio by molar of the magnesium compound to the nonmetallocene ligand was 1:0.004, the ratio by weight of the magnesium compound to the porous carrier was 1:2, the ratio by volume of the precipitating agent to the solvent for dissolving the magnesium compound was 1:1, the ratio by molar of the magnesium compound to the assistant chemical treating agent was 1:0.35, and the ratio by molar of the magnesium compound to titanium tetrachloride was 1:0.2.

The thus obtained supported nonmetallocene catalyst was named as CAT-IV-2.

Example IV-2-1

Substantially the same as the Example IV-2, except for the following changes:

The alcohol was changed to ethanol, the nonmetallocene ligand was changed to

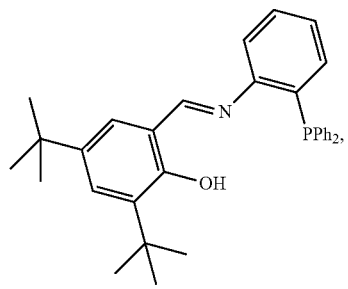

the precipitating agent was changed to cyclohexane, the assistant chemical treating agent was changed to methyl aluminoxane.

In this example, the ratio by molar of the magnesium compound to the alcohol was 1:1, the ratio of the magnesium compound to the solvent for dissolving the magnesium compound was 1 mol:240 ml, the ratio by molar of the magnesium compound to the nonmetallocene ligand was 1:0.006, the ratio by weight of the magnesium compound to the porous carrier was 1:1, the ratio by volume of the precipitating agent to the solvent for dissolving the magnesium compound was 1:0.5, the ratio by molar of the magnesium compound to the assistant chemical treating agent was 1:0.5, and the ratio by molar of the magnesium compound to the chemical treating agent was 1:0.5.

The thus obtained supported nonmetallocene catalyst was named as CAT-IV-2-1.

Example IV-2-2

Substantially the same as the Example IV-2, except for the following changes:

The alcohol was changed to propanol, the magnesium compound was changed to magnesium bromide (MgBr$_2$), the nonmetallocene ligand was changed to

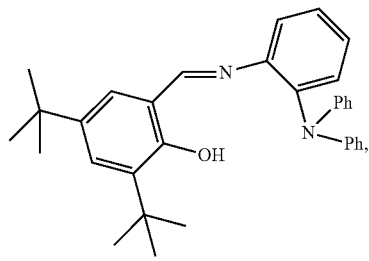 [SMILES: CC(C)(C)c1cc(/C=N/c2ccccc2N(c2ccccc2)c2ccccc2)c(O)c(C(C)(C)C)c1]

the solvent for dissolving the magnesium compound was changed to toluene, the precipitating agent was changed to cycloheptane, the assistant chemical treating agent was changed to isobutyl aluminoxane, and the chemical treating agent was changed to zirconium tetrachloride (ZrCl$_4$).

The chemical treating agent was dissolved in 25 ml toluene, and then the resultant solution was dropwise added to the composite carrier over a period of 15 minutes. Washing was conducted with toluene for 3 times (25 ml each time), and then heated to 120° C. and vacuum dried.

In this example, the ratio by molar of the magnesium compound to the alcohol was 1:2, the ratio of the magnesium compound to the solvent for dissolving the magnesium compound was 1 mol:100 ml, the ratio by molar of the magnesium compound to the nonmetallocene ligand was 1:0.003, the ratio by weight of the magnesium compound to the porous carrier was 1:3, the ratio by volume of the precipitating agent to the solvent for dissolving the magnesium compound was 1:2, the ratio by molar of the magnesium compound to the assistant chemical treating agent was 1:0.6, and the ratio by molar of the magnesium compound to the chemical treating agent was 1:1.

The thus obtained supported nonmetallocene catalyst was named as CAT-IV-2-2.

Example IV-2-3

Substantially the same as the Example IV-2, except for the following changes:

The alcohol was changed to iso-octanol, the magnesium compound was changed to ethoxy magnesium chloride (MgCl(OC$_2$H$_5$)), the nonmetallocene ligand was changed to

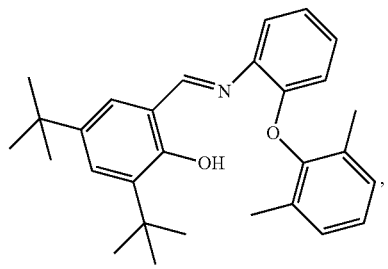 [SMILES: Cc1cccc(C)c1Oc1ccccc1/N=C/c1cc(C(C)(C)C)cc(C(C)(C)C)c1O]

the solvent for dissolving the magnesium compound was changed to ethyl benzene, the precipitating agent was changed to decane, the assistant chemical treating agent was changed to triisobutyl aluminum, and the chemical treating agent was changed to tetraethyl titanium (Ti(CH$_3$CH$_2$)$_4$).

In this example, the ratio by molar of the magnesium compound to the alcohol was 1:0.25, the ratio of the magnesium compound to the solvent for dissolving the magnesium compound was 1 mol:300 ml, the ratio by molar of the magnesium compound to the nonmetallocene ligand was 1:0.010, the ratio by weight of the magnesium compound to the porous carrier was 1:0.5, the ratio by volume of the precipitating agent to the solvent for dissolving the magnesium compound was 3:1, the ratio by molar of the magnesium compound to the assistant chemical treating agent was 1:1.0, and the ratio by molar of the magnesium compound to the chemical treating agent was 1:0.15.

The thus obtained supported nonmetallocene catalyst was named as CAT-IV-2-3.

Example IV-2-4

Substantially the same as the Example IV-2, except for the following changes:

The alcohol was changed to pentanol, the magnesium compound was changed to ethyl magnesium (Mg(C$_2$H$_5$)$_2$), the nonmetallocene ligand was changed to

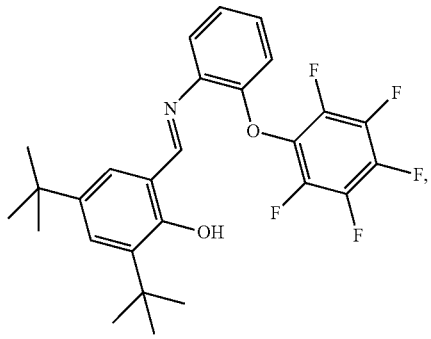 [SMILES: CC(C)(C)c1cc(/C=N/c2ccccc2Oc2c(F)c(F)c(F)c(F)c2F)c(O)c(C(C)(C)C)c1]

the solvent for dissolving the magnesium compound was changed to xylene, the assistant chemical treating agent was changed to trimethyl aluminum, and the chemical treating agent was changed to triisobutyl chloro titanium (TiCl(i-C$_4$H$_9$)$_3$).

In this example, the ratio by molar of the magnesium compound to the alcohol was 1:3, the ratio of the magnesium compound to the solvent for dissolving the magnesium compound was 1 mol:350 ml, the ratio by molar of the magnesium compound to the nonmetallocene ligand was 1:0.001, the ratio by weight of the magnesium compound to the porous carrier was 1:10, the ratio by volume of the precipitating agent to the solvent for dissolving the magnesium compound was 4:1, the ratio by molar of the magnesium compound to the assistant chemical treating agent was 1:0.75, and the ratio by molar of the magnesium compound to the chemical treating agent was 1:0.3

The thus obtained supported nonmetallocene catalyst was named as CAT-IV-2-4.

Example IV-2-5

Substantially the same as the Example IV-2, except for the following changes:

The magnesium compound was changed to ethoxy magnesium (Mg(OC$_2$H$_5$)$_2$), the nonmetallocene ligand was changed to

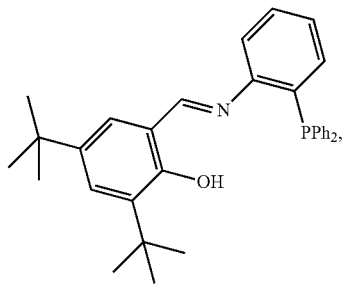

the solvent for dissolving the magnesium compound was changed to p-chloro toluene, and the chemical treating agent was changed to tetraethoxy titanium (Ti(OCH$_3$CH$_2$)$_4$).

Example IV-2-6

Substantially the same as the Example IV-2, except for the following changes:

The magnesium compound was changed to isobutyl magnesium (Mg(i-C$_4$H$_9$)$_2$), the nonmetallocene ligand was changed to

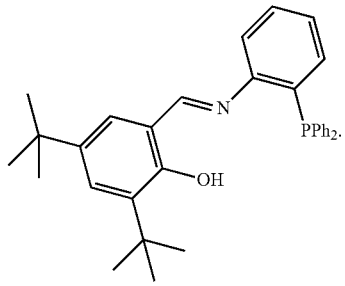

The porous carrier was changed to a mixed oxide of silica and MgO (at a ratio by weight of 1:1), which has been thermally activated by continuously calcinating at 600° C. under an Ar gas atmosphere for 4 hours.

Reference Example IV-1-A

Substantially the same as the Example IV-1, except for the following changes:

No nonmetallocene ligand was used.
The thus obtained catalyst was named as CAT-IV-1-A.

Reference Example IV-1-B

Substantially the same as the Example IV-1, except for the following changes:

The ratio by molar of the magnesium compound to the nonmetallocene ligand was changed to 1:0.008.
The thus obtained catalyst was named as CAT-IV-1-B.

Reference Example IV-1-C

Substantially the same as the Example IV-1, except for the following changes:

The ratio by molar of the magnesium compound to the nonmetallocene ligand was changed to 1:0.002.
The thus obtained catalyst was named as CAT-IV-1-C.

Reference Example IV-1-D

Substantially the same as the Example IV-1, except for the following changes:
The composite carrier was not treated by titanium tetrachloride.
The thus obtained catalyst was named as CAT-IV-1-D.

Reference Example IV-1-E

Substantially the same as the Example IV-1, except for the following changes:
The composite carrier was not subjected to the treatment of the precipitating agent, but was obtained by directly vacuum dried at 90° C.
The thus obtained catalyst was named as CAT-IV-1-E.

Example IV-3

Application Example IV

The catalysts CAT-IV-1, CAT-IV-2, CAT-IV-1-1 to CAT-IV-1-4, CAT-IV-2-1 to CAT-IV-2-4, CAT-IV-1-A to CAT-IV-1-E were respectively weighted, and used in combination of a co-catalyst (methyl aluminoxane or triethyl aluminum), for ethylene homopolymerization/copolymerization and ultra high molecular weight polyethylene preparation under the following conditions according to the following processes respectively.

Homopolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table IV-1.

Copolymerization: an autoclave for polymerization (5 L), a slurry polymerization process, hexane (2.5 L) as the solvent, a total polymerization pressure of 0.8 MPa, a polymerization temperature of 85° C., a partial pressure of hydrogen gas of 0.2 MPa, a polymerization time of 2 hours.

Specifically, 2.5 L hexane was added to the autoclave for polymerization, and the stirring means was started. Then, 20 mg of a mixture of the supported nonmetallocene catalyst and the co-catalyst was added thereto. Hexene-1 (50 g) was added thereto all at once as the comonomer, and then hydrogen gas was supplied thereto till 0.2 MPa, and finally ethylene was continuously supplied thereto to keep the total polymerization pressure constant at 0.8 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table IV-1.

Preparation of ultra high molecular weight polyethylene: an autoclave for polymerization (5 L), a slurry polymerization process, hexane (2.5 L) as the solvent, a total polymerization pressure of 0.5 MPa, a polymerization temperature of 70° C., a ratio by molar of the co-catalyst to the active metal in the catalyst of 100, a polymerization time of 6 hours.

Specifically, 2.5 L hexane was added to the autoclave for polymerization, and the stirring means was started. Then, 20 mg of a mixture of the supported nonmetallocene catalyst and the co-catalyst was added thereto, and finally ethylene was continuously supplied thereto to keep the total polymerization pressure constant at 0.5 MPa. Upon completion of the polymerization, the inside of the autoclave was vented to the atmosphere, and the resultant polymer product was discharged from the autoclave, and weighed for its weight (by mass) after drying. The particulars of the polymerization reaction and the evaluation to the polymerization were listed in the following Table IV-2.

TABLE IV-1

The results of the olefin polymerization obtained with the supported nonmetallocene catalysts

| Experiment No. | Catalyst No. | Co-catalyst | ratio by molar of co-catalyst to active metal | type | Poly activity (kgPE/gCat) | Bulk density (g/cm$^3$) | Molecular weight distribution |
|---|---|---|---|---|---|---|---|
| 1 | CAT-IV-1 | triethylaluminum | 100 | homopolymerization | 7.2 | 0.37 | 3.04 |
| 2 | CAT-IV-1 | methylaluminoxane | 100 | homopolymerization | 7.9 | 0.38 | 2.59 |
| 3 | CAT-IV-1 | triethylaluminum | 100 | copolymerization | 8.6 | 0.38 | 3.28 |
| 4 | CAT-IV-1 | triethylaluminum | 500 | copolymerization | 9.3 | 0.38 | 3.16 |
| 5 | CAT-IV-1-1 | triethylaluminum | 100 | homopolymerization | 9.5 | 0.37 | — |
| 6 | CAT-IV-1-2 | triethylaluminum | 100 | homopolymerization | 6.9 | 0.36 | — |
| 7 | CAT-IV-1-3 | triethylaluminum | 100 | homopolymerization | 8.5 | 0.36 | — |
| 8 | CAT-IV-1-4 | triethylaluminum | 100 | homopolymerization | 6.4 | 0.36 | — |
| 9 | CAT-IV-2 | triethylaluminum | 100 | homopolymerization | 8.0 | 0.37 | 2.96 |
| 10 | CAT-IV-2 | methylaluminoxane | 100 | homopolymerization | 8.9 | 0.38 | 2.54 |
| 11 | CAT-IV-2 | triethylaluminum | 100 | copolymerization | 9.8 | 0.38 | 3.11 |
| 12 | CAT-IV-2-1 | triethylaluminum | 100 | homopolymerization | 9.6 | 0.38 | — |
| 13 | CAT-IV-2-2 | triethylaluminum | 100 | homopolymerization | 7.5 | 0.37 | — |
| 14 | CAT-IV-2-3 | triethylaluminum | 100 | homopolymerization | 8.8 | 0.36 | — |
| 15 | CAT-IV-2-4 | triethylaluminum | 100 | homopolymerization | 6.8 | 0.36 | — |
| 16 | CAT-IV-1-A | triethylaluminum | 100 | homopolymerization | 5.1 | 0.31 | 4.74 |
| 17 | CAT-IV-1-B | triethylaluminum | 100 | homopolymerization | 8.1 | 0.37 | 2.72 |

TABLE IV-1-continued

The results of the olefin polymerization obtained with the supported nonmetallocene catalysts

| Experiment No. | Catalyst No. | Co-catalyst | ratio by molar of co-catalyst to active metal | type | Poly activity (kgPE/gCat) | Bulk density (g/cm$^3$) | Molecular weight distribution |
|---|---|---|---|---|---|---|---|
| 18 | CAT-IV-1-C | triethylaluminum | 100 | homopolymerization | 6.7 | 0.35 | 3.38 |
| 19 | CAT-IV-1-D | triethylaluminum | 100 | homopolymerization | no activity | — | — |
| 20 | CAT-IV-1-E | triethylaluminum | 100 | homopolymerization | 8.2 | 0.34 | 2.98 |

TABLE IV-2

The results of the ultra high molecular weight polyethylene preparation obtained with the supported nonmetallocene catalysts

| Experiment No. | Catalyst No. | Co-catalyst | Poly activity (kgPE/gCat) | Bulk density (g/cm$^3$) | Mv (10$^4$ g/mol) |
|---|---|---|---|---|---|
| 1 | CAT-IV-1 | triethyl aluminum | 9.8 | 0.40 | 430 |
| 2 | CAT-IV-1 | methyl aluminoxane | 9.5 | 0.42 | 475 |
| 3 | CAT-IV-2 | triethyl aluminum | 10.4 | 0.41 | 460 |
| 4 | CAT-IV-2 | methyl aluminoxane | 9.9 | 0.43 | 560 |
| 5 | CAT-IV-1-A | triethyl aluminum | 6.9 | 0.38 | 210 |
| 6 | CAT-IV-1-B | triethyl aluminum | 11.2 | 0.39 | 550 |
| 7 | CAT-IV-1-C | triethyl aluminum | 7.6 | 0.39 | 370 |
| 8 | CAT-IV-1-D | triethyl aluminum | no activity | — | — |
| 9 | CAT-IV-1-E | triethyl aluminum | 11.1 | 0.38 | 450 |

Upon comparison of the results of the experiment No. 1 and those of the experiment No. 3, the results of the experiment No. 10 and those of the experiment No. 11, in the Table IV-1, it is clear that the present catalyst shows a significant comonomer effect, i.e. the activity in copolymerization is higher than that in homopolymerization. Further, by the copolymerization, the bulk density of the polymer can be increased, i.e. the polymer morphology can be improved. However, there is limited influence on the molecular weight distribution of the polymer.

Upon comparison of the results of the experiment No. 1 and those of the experiment No. 2, the results of the experiment No. 9 and those of the experiment No. 10, it is clear that the activity of the catalyst for polymerization in the presence of hydrogen gas can be further increased, the bulk density of the polymer can be further improved, and the molecular weight distribution of the polymer can be further narrowed, if using MAO as the co-catalyst.

Upon comparison of the results of the experiment Nos. 1, 17 and 18 in the Table IV-1, it is clear that by increasing or reducing the ratio by molar of the nonmetallocene ligand to the magnesium compound, the activity for ethylene polymerization of the catalyst was increased or decreased, and the molecular weight distribution of the polymer was somewhat narrowed or broadened. This effect was further supported by a comparison of the results of the experiment Nos. 16 and 1, i.e. no addition of the nonmetallocene ligand will lower the activity of the catalyst and broaden the molecular weight distribution of the polymer.

As can be seen from the Table IV-2, it is possible to prepare an ultra high molecular weight polyethylene (with to some degree increased bulk density) by using the catalyst according to this invention. Upon comparison of the results from the experiment No. 1 and those from the experiment No. 2, the results from the experiment No. 3 and those from the experiment No. 4, it is clear that the viscosity averaged molecular weight of the polymer can be increased by using MAO as the co-catalyst. Upon comparison of the results from the experiment No. 1 and those from the reference example experiment Nos. 5 to 8 in the Table IV-2, it is clear that the viscosity averaged molecular weight of the polymer increases or decreases as the amount of the nonmetallocene ligand to be introduced into the catalyst increases or decreases. This fact indicates that the nonmetallocene ligand further shows a function of increasing the viscosity averaged molecular weight of the polymer.

Upon comparison of the results of the experiment Nos. 1 to 8 and those of the experiment Nos. 9 to 15 in the Table IV-1 and the results of the experiment Nos. 1 to 2 and those of the experiment Nos. 3 to 4 in the Table IV-2, it is clear that the supported nonmetallocene catalyst obtained by a process wherein the composite carrier was firstly subject to the treatment with an assistant chemical treating agent and then to that with a chemical treating agent shows increased catalyst activity and polymer bulk density, narrowed polymer molecular weight distribution and increased viscosity averaged molecular weight of the ultra high molecular weight polyethylene, as compared with the supported nonmetallocene catalyst obtained by a process wherein the composite carrier is subject only to the treatment with a chemical treating agent.

As can be seen from the results of the experiment No. 19 in the Table IV-1 and the results of the experiment No. 8 in the Table IV-2, it is clear that the catalyst containing merely the nonmetallocene ligand shows no polymerization activity, and will be given same after reacting with the Group IVB metal compound.

Upon comparison of the results of the experiment Nos. 1 and 14 in the Table IV-1 and the results of the experiment Nos. 1 and 9 in the Table IV-2, it is clear that the polymer produced by using the catalyst obtained in line with the present process shows a higher polymer bulk density than that produced by using a catalyst obtained by a directly drying process.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A process for producing a supported nonmetallocene catalyst comprising dissolving at least one magnesium compound and at least one nonmetallocene ligand in the presence of at least one alcohol in at least one solvent to obtain a magnesium compound solution;

drying the magnesium compound solution or introducing into the magnesium compound solution at least one precipitating agent to obtain a modified carrier; and treating the modified carrier with at least one chemical treating agent chosen from the group consisting of Group IVB metal compounds to obtain the supported nonmetallocene catalyst, and wherein the at least one nonmetallocene ligand is chosen from the group consisting of compounds having the following formula,

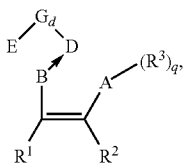

wherein:
q is 0 or 1;
d is 1;
A is chosen from the group consisting of an oxygen atom, a sulfur atom, a selenium atom,

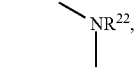

—NR$^{23}$R$^{24}$,

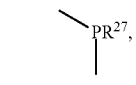

—PR$^{28}$R$^{29}$, —P(O)R$^{30}$OR$^{31}$, sulfone groups, sulfoxide groups and —Se(O)R$^{39}$, wherein N, O, S, Se and P in A each represents a coordination atom;

B is chosen from the group consisting of a nitrogen atom, nitrogen-containing groups, phosphor-containing groups and C$_1$-C$_{30}$ hydrocarbylene groups;

D is chosen from the group consisting of a nitrogen atom, an oxygen atom, a sulfur atom, a selenium atom, a phosphor atom, nitrogen-containing groups, phosphor-containing groups, C$_1$-C$_{30}$ hydrocarbylene groups, sulfone groups, sulfoxide groups,

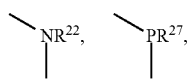

and —P(O)R$^{32}$(OR$^{33}$), wherein N, O, S, Se and P in D each represents a coordination atom;

E is chosen from the group consisting of nitrogen-containing groups, oxygen-containing groups, sulfur-containing groups, selenium-containing groups, phosphor-containing groups and cyano groups, wherein N, O, S, Se and P in E each represents a coordination atom;

G is chosen from the group consisting of C$_1$-C$_{30}$ hydrocarbylene groups, substituted C$_1$-C$_{30}$ hydrocarbylene groups and inert functional groups;

→ represents a single bond or a double bond;

— represents a covalent bond or an ionic bond;

R$^1$ to R$^3$, R$^{22}$ to R$^{33}$, and R$^{39}$ are each independently chosen from the group consisting of a hydrogen atom, C$_1$-C$_{30}$ hydrocarbyl groups, substituted C$_1$-C$_{30}$ hydrocarbyl and inert functional groups, wherein these groups may be identical to or different from one another, and any adjacent groups may form a bond or a ring with one another.

2. A process for producing a supported nonmetallocene catalyst comprising:

dissolving at least one magnesium compound and at least one nonmetallocene ligand in the presence of at least one alcohol in at least one solvent to obtain a magnesium compound solution;

mixing at least one carrier chosen from the group consisting of porous carriers and thermally activated porous carriers with the magnesium compound solution to obtain a slurry;

drying the slurry or introducing into the slurry at least one precipitating agent to obtain a composite carrier; and treating the composite carrier h at least one chemical treating agent chosen from the group consisting of Group IVB metal compounds to obtain the supported nonmetallocene catalyst, and wherein the at least one nonmetallocene ligand is chosen from the group consisting of compounds having the following formula,

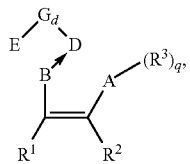

wherein:
q is 0 or 1;
d is 1;
A is chosen from the group consisting of an oxygen atom, a sulfur atom, a selenium atom,

—NR$^{23}$R$^{24}$,

—PR$^{28}$R$^{29}$, —P(O)R$^{30}$OR$^{31}$, sulfone groups, sulfoxide groups and —Se(O)R$^{39}$, wherein N, O, S, Se and P in A each represents a coordination atom;

B is chosen from the group consisting of a nitrogen atom, nitrogen-containing groups, phosphor-containing groups and C$_1$-C$_{30}$ hydrocarbylene groups;

D is chosen from the group consisting of a nitrogen atom, an oxygen atom, a sulfur atom, a selenium atom, a phosphor atom, nitrogen-containing groups, phosphor-containing groups, $C_1$-$C_{30}$ hydrocarbylene groups, sulfone groups, sulfoxide groups,

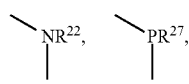

and —P(O)$R^{32}$(O$R^{33}$), wherein N, O, S, Se and P in D each represents a coordination atom;
E is chosen from the group consisting of nitrogen-containing groups, oxygen-containing groups, sulfur-containing groups, selenium-containing groups, phosphor-containing groups and cyano groups, wherein N, O, S, Se and P in E each represents a coordination atom;
G is chosen from the group consisting of $C_1$-$C_{30}$ hydrocarbylene groups, substituted $C_1$-$C_{30}$ hydrocarbylene groups and inert functional groups;
→ represents a single bond or a double bond;
— represents a covalent bond or an ionic bond;
$R^1$ to $R^3$, $R^{22}$ to $R^{33}$, and $R^{39}$ are each independently chosen from the group consisting of a hydrogen atom, $C_1$-$C_{30}$ hydrocarbyl groups, substituted $C_1$-$C_{30}$ hydrocarbyl and inert functional groups, wherein these groups may be identical to or different from one another, and any adjacent groups may form a bond or a ring with one another.

3. The process according to claim 1 or 2, further comprising pre-treating the composite carrier or the modified carrier with at least one assistant chemical treating agent chosen from the group consisting of aluminoxanes and alkylaluminums before treating the composite carrier or the modified carrier with the at least one chemical treating agent.

4. The process according to claim 2, wherein the at least one carrier is chosen from the group consisting of olefin homopolymers or copolymers, vinyl alcohol homopolymers or copolymers, cyclodextrins, polyesters or co-polyesters, polyamides or co-polyamides, vinyl chloride homopolymers or copolymers, acrylic ester homopolymers or copolymers, methacrylic ester homopolymers or copolymers, styrene homopolymers or copolymers, partly crosslinked products of these homopolymers or copolymers, refractory oxides or refractory composite oxides of a Group IIA, IIIA, IVA or IVB metal, clay, molecular sieve, mica, montmorillonite, bentonite and kieselguhr.

5. The process according to claim 4, wherein the at least one carrier is chosen from the group consisting of partly crosslinked styrene polymers, silica, alumina, magnesia, silica-alumina, magnesia-alumina, titanium oxide, molecular sieve and montmorillonite.

6. The process according to claim 1 or 2, wherein the at least one magnesium compound is chosen from the group consisting of magnesium halides, alkoxy magnesium halides, alkoxy magnesiums, alkyl magnesiums, alkyl magnesium halides and alkyl alkoxy magnesiums.

7. The process according to claim 6, wherein the at least one magnesium compound is chosen from the group consisting of magnesium halides.

8. The process according to claim 1 or 2, wherein the at least one solvent is chosen from the group consisting of $C_{6-12}$ aromatic hydrocarbons, halogenated $C_{6-12}$ aromatic hydrocarbons, esters and ethers, and
the at least one alcohol is chosen from the group consisting of aliphatic alcohols, aromatic alcohols and alicyclic alcohols optionally substituted by at least one substituent chosen from the group consisting of halogen atoms and $C_{1-6}$ alkoxy groups.

9. The process according to claim 8, wherein the at least one solvent is chosen from the group consisting of $C_{6-12}$ aromatic hydrocarbons and tetrahydrofuran, and the at least one alcohol is chosen from the group consisting of aliphatic alcohols.

10. The process according to claim 1 or 2, wherein the at least one nonmetallocene ligand is chosen from the group consisting of compound (A) and compound (B),

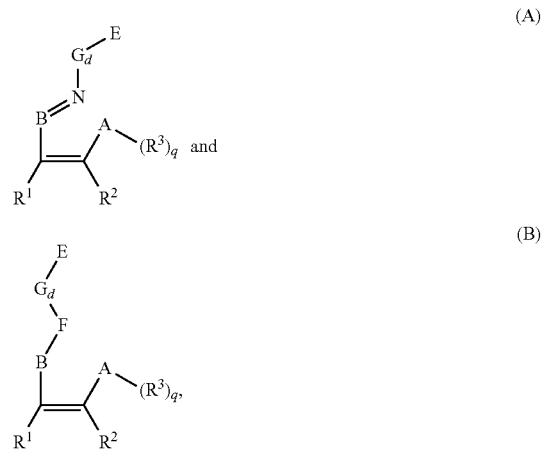

wherein,
F is chosen from the group consisting of a nitrogen atom, nitrogen-containing groups, oxygen-containing groups, sulfur-containing groups, selenium-containing groups and phosphor-containing groups, wherein N, O, S, Se and P in F each represents a coordination atom.

11. The process according to claim 10, wherein the at least one nonmetallocene ligand is chosen from the group consisting of compound (A-1), compound (A-2), compound (A-3), compound (A-4), compound (B-1), compound (B-2), compound (B-3), and compound (B-4), -continued

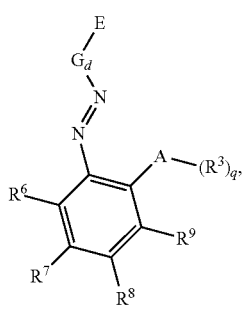

(A-3)

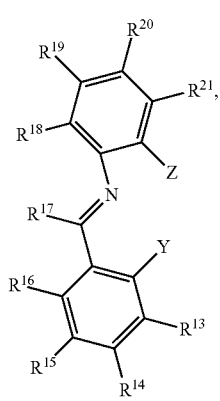

(A-4)

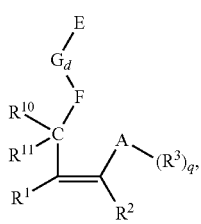

(B-1)

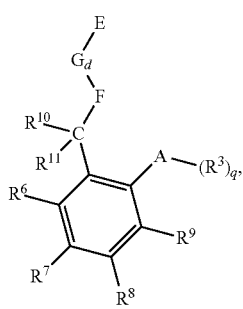

(B-2)

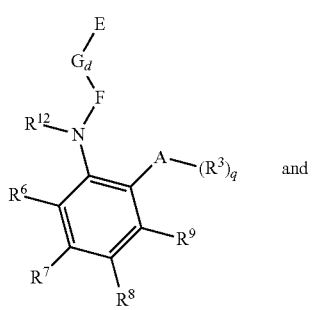

(B-3)

and

-continued

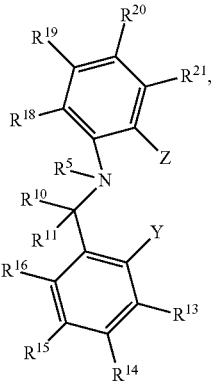

(B-4)

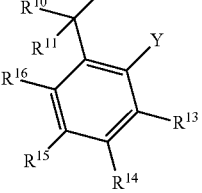

wherein,

Y is chosen from the group consisting of nitrogen-containing groups, oxygen-containing groups, sulfur-containing groups, selenium-containing groups and phosphor-containing groups, wherein N, O, S, Se and P in Y each represents a coordination atom;

Z is chosen from the group consisting of nitrogen-containing groups, oxygen-containing groups, sulfur-containing groups, selenium-containing groups, phosphor-containing groups and cyano groups, wherein N, O, S, Se and P in Z each represents a coordination atom;

$R^4$, and $R^6$ to $R^{21}$ are each independently chosen from the group consisting of a hydrogen atom, $C_1$-$C_{30}$ hydrocarbyl groups, substituted $C_1$-$C_{30}$ hydrocarbyl groups and inert functional groups, wherein these groups may be identical to or different from one another, and any adjacent groups may form a bond or a ring with one another; and $R^5$ is chosen from the group consisting of a lone pair electron on a nitrogen atom, a hydrogen atom, $C_1$-$C_{30}$ hydrocarbyl groups, substituted $C_1$-$C_{30}$ hydrocarbyl groups, oxygen-containing groups, sulfur-containing groups, nitrogen-containing groups, selenium-containing groups, and phosphor-containing groups, with the proviso that when $R^5$ is chosen from the group consisting of oxygen-containing groups, sulfur-containing groups, nitrogen-containing groups, selenium-containing groups and phosphor-containing groups, N, O, S, P and Se in the $R^5$ each can act as a coordination atom.

12. The process according to claim 11, wherein, the halogen atom is chosen from the group consisting of F, Cl, Br and I.

the nitrogen-containing groups are chosen from the group consisting of

 $NR^{22}$,

—$NR^{23}R^{24}$, and -T-$NR^{23}R^{24}$, the phosphor-containing groups are chosen from the group consisting of

\>PR²⁷,

—PR²⁸R²⁹, —P(O)R³⁰R³¹ and —P(O)R³²(OR³³), the oxygen-containing groups are chosen from the group consisting of hydroxy, —OR³⁴ and -T-OR³⁴, the sulfur-containing groups are chosen from the group consisting of —SR³⁵, -T-SR³⁵, —S(O)R³⁶ and -T-SO₂R³⁷, the selenium-containing groups are chosen from the group consisting of —SeR³⁸, -T-SeR³⁸, —Se(O)R³⁹ and -T-Se(O)R³⁹, the group T is chosen from the group consisting of C₁-C₃₀ hydrocarbylene groups, substituted C₁-C₃₀ hydrocarbylene groups and inert functional groups, R³⁷ is chosen from the group consisting of a hydrogen atom, C₁-C₃₀ hydrocarbyl groups, substituted C₁-C₃₀ hydrocarbyl groups and inert functional groups, the C₁-C₃₀ hydrocarbyl groups are chosen from the group consisting of C₁-C₃₀ alkyl groups, C₇-C₅₀ alkylaryl groups, C₇-C₅₀ aralkyl groups, C₃-C₃₀ cyclic alkyl groups, C₂-C₃₀ alkenyl groups, C₂-C₃₀ alkynyl groups, C₆-C₃₀ aryl groups, C₈-C₃₀ fused-ring groups and C₄-C₃₀ heterocycle groups, wherein the C₄-C₃₀ heterocycle group contains 1 to 3 hetero atom(s) chosen from the group consisting of a nitrogen atom, an oxygen atom and a sulfur atom, the substituted C₁-C₃₀ hydrocarbyl groups are chosen from the group consisting of C₁-C₃₀ hydrocarbyl groups having at least one substituent chosen from the group consisting of halogen atoms and C₁-C₃₀ alkyl groups, the inert functional groups are chosen from the group consisting of halogen atoms, oxygen-containing groups, nitrogen-containing groups, silicon-containing groups, germanium-containing groups, sulfur-containing groups, tin-containing groups, C₁-C₁₀ ester groups and nitro groups, the silicon-containing groups are chosen from the group consisting of —siR⁴²R⁴³R⁴⁴, and -T-SiR⁴⁵, the germanium-containing groups are chosen from the group consisting of —GeR⁴⁶R⁴⁷R⁴⁸ and -T-GeR⁴⁹, the tin-containing groups are chosen from the group consisting of —SnR⁵⁰R⁵¹R⁵², -T-SnR⁵³ and -T-Sn(O)R⁵⁴, R³⁴ to R³⁶, R³⁸ and R⁴² to R⁵⁴ are each independently chosen from the group consisting of a hydrogen atom, C₁-C₃₀ hydrocarbyl groups, substituted C₁-C₃₀ hydrocarbyl groups and inert functional groups, wherein these groups may be identical to or different from one another, and any adjacent groups may form a bond or a ring with one another.

13. The process according to claim 1 or 2, wherein the at least one nonmetallocene ligand is chosen from the group consisting of:

14. The process according to claim 2, wherein molar ratio of the at least one magnesium compound (based on Mg) to the at least one nonmetallocene ligand is 1:0.0001-1, ratio of the at least one magnesium compound to the at least one solvent is 1 mol:75-400 ml, molar ratio of the at least one magnesium compound (based on Mg) to the at least one alcohol is 1:0.02-4.00, weight ratio of the at least one magnesium compound (on a solid basis) to the at least one carrier is 1:0.1-20, volume ratio of the at least one precipitating agent to the at least one solvent is 1:0.2-5, and molar ratio of the at least one magnesium compound (based on Mg) to the at least one chemical treating agent (based on the Group IVB metal) is 1:0.01-1.

15. The process according to claim 1 or 2, wherein the at least one precipitating agent is chosen from the group consisting of alkanes, cyclic alkanes, halogenated alkanes and halogenated cyclic alkanes.

16. The process according to claim 15, wherein the at least one precipitating agent is chosen from the group consisting of hexane, heptane, decane and cyclohexane.

17. The process according to claim 1 or 2, wherein the Group IVB metal compounds are chosen from the group consisting of Group IVB metal halides, Group IVB metal alkylates, Group IVB metal alkoxylates, Group IVB metal alkyl halides, and Group IVB metal alkoxy halides.

18. The process according to claim 17, wherein the Group IVB metal compounds are chosen from the group consisting of Group IVB metal halides.

19. The process according to claim 3, wherein the aluminoxanes are chosen from the group consisting of methyl aluminoxane, ethyl aluminoxane, isobutyl aluminoxane and n-butyl aluminoxane, and the alkylaluminums are chosen from the group consisting of trimethyl aluminum, triethyl aluminum, tripropyl aluminum, triisobutyl aluminum, tri-n-butyl aluminum, triisoamyl aluminum, tri-n-amyl aluminum, trihexyl aluminum, tri-iso-hexyl aluminum, diethyl methyl aluminum and ethyl dimethyl aluminum.

20. The process according to claim 3, wherein molar ratio of the at least one magnesium compound (based on Mg) to the at least one assistant chemical treating agent (based on Al) is 1:0-1.0.

21. A supported nonmetallocene catalyst, produced according to the process of claim 1 or 2.

22. An olefin homopolymerization/copolymerization process comprising
polymerizing at least one olefin in the presence of the supported nonmetallocene catalyst according to claim 21 with at least one co-catalyst chosen from the group consisting of aluminoxane, an alkylaluminum, a halogenated alkyl aluminum, a fluoroborane, an alkylboron and an alkylboron ammonium salts.

* * * * *

UNITED STATES PATENT AND TRADEMARK OFFICE
CERTIFICATE OF CORRECTION

Page 1 of 1

PATENT NO. : 8,952,113 B2
APPLICATION NO. : 13/509555
DATED : February 10, 2015
INVENTOR(S) : Chuanfeng Li et al.

It is certified that error appears in the above-identified patent and that said Letters Patent is hereby corrected as shown below:

In the Claims

Claim 2, col. 98, line 25, "composite carrier h at least one chemical" should read -- composite carrier with at least one chemical --.

Signed and Sealed this
Fifteenth Day of September, 2015

Michelle K. Lee
*Director of the United States Patent and Trademark Office*